US012695749B2

(12) United States Patent
Wu

(10) Patent No.: US 12,695,749 B2
(45) Date of Patent: Jul. 28, 2026

(54) COMMUNICATION METHOD AND APPARATUS

(71) Applicant: HUAWEI TECHNOLOGIES CO., LTD., Shenzhen (CN)

(72) Inventor: Yizhuang Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 217 days.

(21) Appl. No.: 18/504,954

(22) Filed: Nov. 8, 2023

(65) Prior Publication Data

US 2024/0073212 A1 Feb. 29, 2024

Related U.S. Application Data

(63) Continuation of application No. PCT/CN2022/091806, filed on May 9, 2022.

(30) Foreign Application Priority Data

May 9, 2021 (CN) .......................... 202110502638.5

(51) Int. Cl.
*H04L 9/40* (2022.01)
*H04L 67/56* (2022.01)

(52) U.S. Cl.
CPC .......... *H04L 63/0884* (2013.01); *H04L 67/56* (2022.05)

(58) Field of Classification Search
CPC ... H04L 63/068; H04L 63/0884; H04L 67/56; H04W 12/069; H04W 12/084; H04W 12/108; H04W 12/61; H04W 12/69
See application file for complete search history.

(56) References Cited

U.S. PATENT DOCUMENTS

| | | | | |
|---|---|---|---|---|
| 2020/0336554 A1* | 10/2020 | Deshpande | ......... | H04L 67/1001 |
| 2021/0250172 A1* | 8/2021 | Choyi | ................... | H04L 9/3239 |
| 2022/0360447 A1* | 11/2022 | Rajput | ................. | H04L 9/3247 |

FOREIGN PATENT DOCUMENTS

| | | |
|---|---|---|
| CN | 114189557 A | 3/2022 |
| WO | 2020053481 A1 | 3/2020 |

(Continued)

OTHER PUBLICATIONS

3GPP TS 33.501 V16.6.0 (Mar. 2021), 3rd Generation Partnership Project; Technical Specification Group Services and System Aspects; Security architecture and procedures for 5G system (Release 16), total 254 pages.

(Continued)

*Primary Examiner* — Gil H. Lee
(74) *Attorney, Agent, or Firm* — HAUPTMAN HAM, LLP

(57) ABSTRACT

A communication method includes sending, by a service consumer network element, a first service request message to a service communication proxy, and receiving, by the service consumer network element, a first response message of the first service request message from the service communication proxy. The first service request message is useable to request a first service from a service producer network element. The first service request message includes a first client credentials assertion. The first client credentials assertion is useable to authenticate the service consumer network element. The first client credentials assertion includes a first network function type of the service producer network element and a second network function type of a network element configured to provide a second service. The second service is useable to provide information about the service producer network element.

20 Claims, 22 Drawing Sheets

(56)         References Cited

FOREIGN PATENT DOCUMENTS

WO        2020221219 A1        11/2020
WO        2021027177 A1        2/2021

OTHER PUBLICATIONS

Japanese Office Action issued in corresponding Japanese Application No. 2023-569715, dated Dec. 2, 2024, pp. 1-17.
3GPP TS 33.501 V17.1.0 (Mar. 2021), 3rd Generation Partnership Project; Technical Specification Group Services and System Aspects; Security architecture and procedures for 5G system (Release 17), total 256 pages.
3GPP TSG-SA3 Meeting #101-e S3-203103,"Reference of general SBA/SBI aspect in 33.513", Nokia, Nokia Shanghai Bell, e-meeting, Nov. 9-20, 2020, total 2 pages.
3GPP TSG-SA3 Meeting #99e S3-201081"Client authentications in token-based authorization for indirect communication", CableLabs, Mavenir, Nokia, Nokia Bell Labs, e-meeting, May 11-15, 2020, total 4 pages.
3GPP TS 23.501 V17.0.0 (Mar. 2021),3rd Generation Partnership Project; Technical Specification Group Services and System Aspects; System architecture for the 5G System (5GS); Stage 2 (Release 17), total 482 pages.
3GPP TS 33.501 V16.5.0 (Dec. 2020),3rd Generation Partnership Project; Technical Specification Group Services and System Aspects; Security architecture and procedures for 5G system (Release 16), total 253 pages.

International Search Report issued in corresponding International Application No. PCT/CN2022/091806, dated Aug. 5, 2022, pp. 1-13.
Taiwan Office Action issued in corresponding Taiwan Application No. 111116608, dated Dec. 20, 2022, pp. 1-35.
"3 rd Generation Partnership Project; Technical Specification Group Services and System Aspects; Security architecture and procedures for 5G system (Release 16)", 3GPP Draft; 33501-G60, 3rd Generation Partnership Project (3GPP), Mobile Competence Centre; 650, Route Des Lucioles; F-06921 Sophia-Antipolis Cedex; France No. Mar. 1, 2021 Apr. 6, 2021 (Apr. 6, 2021), XP051992724, total 254 pages.
Nokia et al: "Client credentials assertion and authentication", 3GPP Draft; CP-201030, 3rd Generation Partnership Project (3GPP), Mobile Competence Centre; 650, Route Deslucioles: F-06921 Sophia-Antipolis Ceoex: France vol. CT WG4, No. E-Meeting; Jun. 2, 2020-Jun. 12, 2020 Jun. 19, 2020 (Jun. 19, 2020), XP052302266, total 6 pages, URL:https://ftp.3gpp.org/tsg_ct/TSG_CT/TSGC_88e/Docs/CP-201030.zip29500_CR0135r1_(Rel-16)_C4-203496_29500_Re116_Client credentials assertion.docx.
Extended European Search Report issued in corresponding European Application No. 22806704.7, dated Sep. 12, 2024, pp. 1-12.
Chinese Office Action issued in corresponding Chinese Application No. 202110502638.5, dated May 14, 2024, pp. 1-9.
India Office Action issued in corresponding India Patent Application No. 202337077842, mailed on Jan. 9, 2026, pp. 1-9.

* cited by examiner

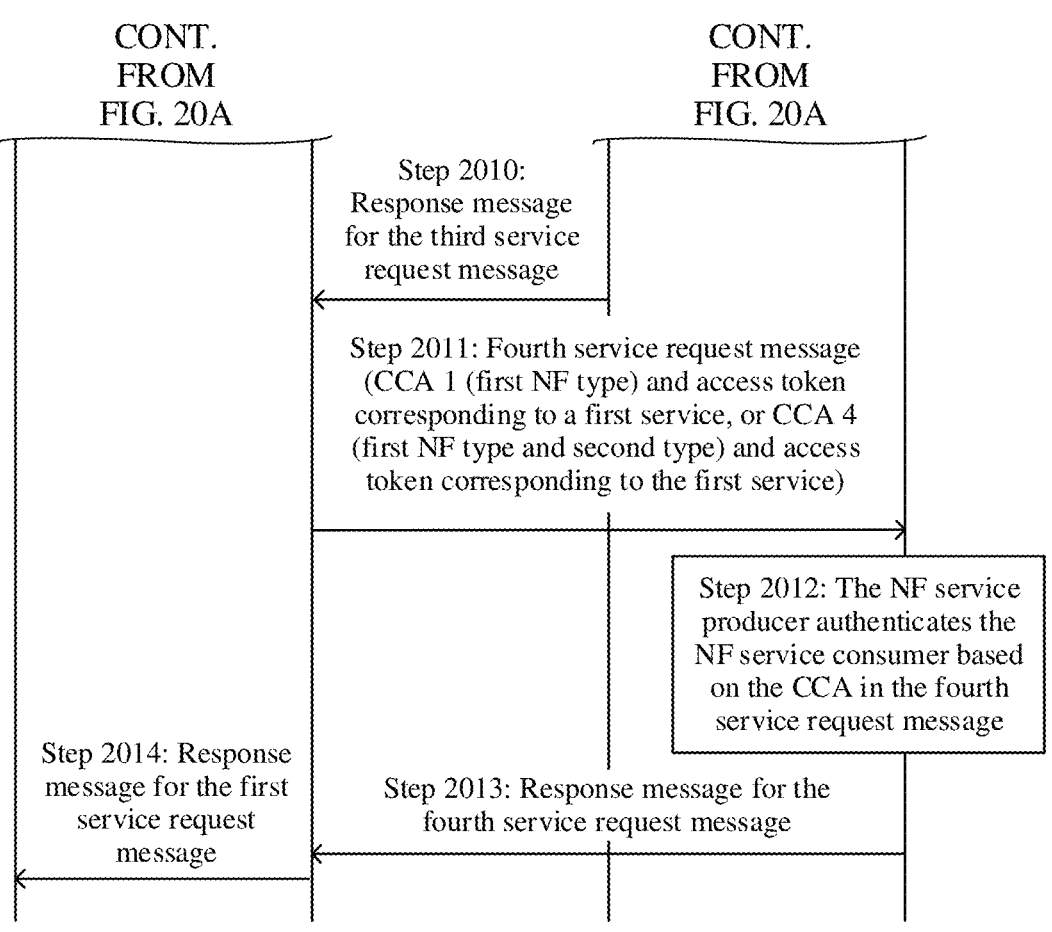

CONT.
FROM
FIG. 20A

CONT.
FROM
FIG. 20A

Step 2010:
Response message
for the third service
request message

Step 2011: Fourth service request message
(CCA 1 (first NF type) and access token
corresponding to a first service, or CCA 4
(first NF type and second type) and access
token corresponding to the first service)

Step 2012: The NF service
producer authenticates the
NF service consumer based
on the CCA in the fourth
service request message Step 2014: Response
message for the first
service request
message Step 2013: Response message for the
fourth service request message

FIG. 20B

COMMUNICATION METHOD AND APPARATUS

CROSS-REFERENCE TO RELATED APPLICATIONS

This application is a continuation of International Application No. PCT/CN2022/091806, filed on May 9, 2022, which claims priority to Chinese Patent Application No. 202110502638.5, filed on May 9, 2021, the disclosures of the aforementioned applications are hereby incorporated by reference in their entireties.

TECHNICAL FIELD

One or more embodiments of this application relate to the wireless communication field, and in particular, to a communication method and apparatus.

BACKGROUND

FIG. 1 shows an enhanced service-based architecture. In the enhanced service-based architecture, network elements may communicate with each other in a direct manner (which is briefly referred to as direct communication), or may communicate with each other in an indirect manner (which may be briefly referred to as indirect communication, and may also be referred to as non-direct communication). In an indirect communication process, two network elements that communicate with each other may exchange messages through a service communication proxy (service communication proxy, SCP). During direct communication and indirect communication, two communication parties are respectively referred to as a service consumer (consumer) and a service producer (producer). A consumer is a service requester or a service caller, and a producer is a service producer. The service consumer is also referred to as a service consumer network element, and the service producer is also referred to as a service producer network element.

In an indirect communication scenario, an authentication scheme based on a client credentials assertion (client credentials assertion, CCA) is introduced. The consumer includes a CCA in a service request, so that a receiver can authenticate the consumer. In different indirect communication scenarios, the consumer (namely, a peer) needs to generate a correct CCA, so that the receiver (namely, an authenticator) can accurately authenticate the consumer and provide, when the authentication succeeds, a service requested by the consumer to the consumer. However, an existing standard does not define how to generate the correct CCA in the different indirect communication scenarios, to avoid a problem that the service consumer network element may fail to request the service.

SUMMARY

One or more embodiments of the present application provide a communication method and apparatus, to avoid a case in which a service consumer network element fails to request a service.

According to a first aspect, an embodiment of this application provides a communication method. In some embodiments, the method includes:

In some embodiments, a service consumer network element sends a first service request message to a service communication proxy, where the first service request message is used to request a first service from a service producer network element, the first service request message includes a first client credentials assertion, the first client credentials assertion is used to authenticate the service consumer network element, the first client credentials assertion includes a first network function type and a second network function type, the first network function type is a network function type of the service producer network element, the second network function type is a network function type of a network element providing a second service, and the second service is associated with the first service. The service consumer network element receives a response message for the first service request message from the service communication proxy.

According to the foregoing method, when the service consumer network element requests the first service from the service producer network element through the service communication proxy, the service consumer network element carries, in the first service request message sent to the service communication proxy, the client credentials assertion including the first network function type and the second network function type. This can ensure that when the service communication proxy requests the second service, the network element providing the second service successfully authenticates the service consumer network element, further ensures that the service consumer network element requests the first service, and resolves a problem, in an indirect communication scenario, that the service consumer network element fails to request the service because the authentication based on the client credentials assertion fails.

In some embodiments, the second service is used to provide an access token corresponding to the first service, and the access token corresponding to the first service indicates that the service consumer network element has permission to obtain the first service.

In some embodiments, the service consumer network element determines that there is no available access token corresponding to the first service.

In some embodiments, the service consumer network element can generate the first client credentials assertion as required, and this prevents the first client credentials assertion from being abused.

In addition, after the service consumer network element determines that there is no available access token corresponding to the first service, the service consumer network element may carry, in the first service request message, a parameter for obtaining the access token corresponding to the first service.

In some embodiments, that the service consumer network element determines that there is no available access token corresponding to the first service may include the following cases: The service consumer network element determines that the access token corresponding to the first service is not stored; or the service consumer network element determines that a stored access token corresponding to the first service expires.

In some embodiments, the service consumer network element deletes the expired access token when the stored access token corresponding to the first service expires.

In some embodiments, storage space can be released in time, and storage load of a system can be reduced.

In some embodiments, the second service is used to provide information about the service producer network element.

In some embodiments, the service consumer network element determines that the first service request message triggers the service communication proxy to request the second service.

In some embodiments, when the service consumer network element determines that the first service request message triggers the service communication proxy to request the second service, the service consumer network element determines, based on one or more of the following cases, that the first service request message triggers the service communication proxy to request the second service: context of a first terminal device is not stored and the first terminal device is associated with the first service; context of the first service is not stored; the service producer network element belongs to a first slice and context corresponding to the first slice is not stored; or the service consumer network element communicates with the service communication proxy for the first time.

In addition, after the service consumer network element determines that the first service request message can trigger the service communication proxy to request the second service, the service consumer network element may carry, in the first service request message, a parameter for discovering the service producer network element.

In some embodiments, the service consumer network element determines to request the first service in an indirect communication mode, namely, a mode D.

For example, it may be agreed on in a standard protocol or configured based on preconfiguration information that, when the service consumer network element communicates with the service communication proxy in the mode D, the first service request message always carries the client credentials assertion including the first network function type and the second network function type; or when the service consumer network element communicates with the service communication proxy in the mode D and determines that the first service request message can trigger the service communication proxy to request the second service, the first service request message carries the client credentials assertion including the first network function type and the second network function type.

In some embodiments, the service consumer network element sends a second service request message to the service communication proxy, where the second service request message is used to request the first service, the second service request message includes a second client credentials assertion, the second client credentials assertion includes the first network function type, and the second client credentials assertion is used to authenticate the service consumer network element. The service consumer network element receives a response message for the second service request message from the service communication proxy, where the response message for the second service request message includes indication information. When the service consumer network element sends the first service request message to the service communication proxy, the service consumer network element sends the first service request message to the service communication proxy based on the indication information.

In some embodiments, the service consumer network element may send the first service request message to the service communication proxy based on the indication information.

In some embodiments, the indication information includes a third client credentials assertion, the third client credentials assertion includes the second network function type, and the third client credentials assertion is used to authenticate the network element providing the second service. When the service consumer network element sends the first service request message to the service communication proxy based on the indication information, the service consumer network element sends the first service request message to the service communication proxy when the authentication, based on the third client credentials assertion, on the network element providing the second service succeeds.

In some embodiments, the service consumer network element may authenticate, based on the third client credentials assertion, the network element providing the second service, and send, when the authentication succeeds, the first service request message based on the second network function type included in the third client credentials assertion.

In some embodiments, the network element providing the second service is a network repository function network element.

In some embodiments, the first client credentials assertion further includes one or more of the following: an identifier of the service consumer network element or validity time information, where the validity time information represents validity time of the first client credentials assertion.

According to a second aspect, this application provides a communication method. The method includes: A first network element receives a first service request message from a service communication proxy, where the first service request message is used to request a first service from the first network element, the first service request message includes a first client credentials assertion, the first client credentials assertion is used to authenticate a service consumer network element, and the first client credentials assertion includes a plurality of network function types. The first network element authenticates the service consumer network element based on the first client credentials assertion. That the first network element authenticates the service consumer network element based on the first client credentials assertion includes: The first network element determines whether a network function type of the first network element matches one or more of the plurality of network function types; and the first network element sends, based on an authentication result, a response message for the first service request message to the service communication proxy.

According to the foregoing method, when the first client credentials assertion includes the plurality of network function types, the first network element determines whether the network function type of the first network element matches one or more of the plurality of network function types, to obtain the authentication result. Therefore, according to the foregoing method, when the client credentials assertion includes the plurality of network function types, it can be determined whether the authentication on the service consumer network element succeeds, so that network elements with different network function types can authenticate the service consumer network element based on a same client credentials assertion.

In some embodiments, when the authentication result is that the authentication succeeds, the first network element sends the response message for the first service request message to the service communication proxy, where the response message for the first service request message is used to provide the first service. Alternatively, when the authentication result is that the authentication fails, the first network element sends the response message for the first service request message to the service communication proxy, where the response message for the first service request message indicates that requesting of the first service fails.

In some embodiments, the plurality of network function types include a first network function type and a second network function type. The first network function type is the network function type of the first network element, the second network function type is a network function type of a network element providing a second service, and the second service is associated with the first service.

In some embodiments, network elements with two different network function types can authenticate the service consumer network element based on a same client credentials assertion.

In some embodiments, the second service is used to provide an access token corresponding to the first service, and the access token corresponding to the first service indicates that the service consumer network element has permission to obtain the first service; or the second service is used to provide information about the first network element.

In some embodiments, the network element providing the second service is a network repository function network element.

In some embodiments, the first service is used to provide an access token corresponding to a second service, and the access token corresponding to the second service indicates that the service consumer network element has permission to obtain the second service; or the first service is used to provide information about a second service network element.

In some embodiments, network elements with two different network function types can authenticate the service consumer network element based on a same client credentials assertion.

In some embodiments, the first network element is a network repository function network element.

In some embodiments, the first network element receives a second service request message from the service communication proxy, where the second service request message is used to request the first service from the first network element, the second service request message includes a second client credentials assertion, and the second client credentials assertion includes a third network function type. When the third network function type does not match the network function type of the first network element, the first network element sends, a response message for the second service request message to the service communication proxy, where the response message for the second service request message includes indication information, and the indication information is used to trigger the first service request message.

In some embodiments, when a network function type in the client credentials assertion does not match the network function type of the first network element, the first network element may carry the indication information in the response message for the second service request message. The indication information may be used to trigger the first service request message, to obtain a client credentials assertion including a network function type that matches the network function type of the first network element, so that the first network element successfully authenticates the service consumer network element.

In some embodiments, the indication information includes a third client credentials assertion used to authenticate the first network element, and the third client credentials assertion includes the network function type of the first network element.

In some embodiments, the network function type of the first network element may be carried in the indication information, to trigger the first client credentials assertion in the first service request message to carry the network function type that matches the network function type of the first network element, so as to successfully authenticate the service consumer network element.

In some embodiments, the first client credentials assertion further includes an identifier of the service consumer network element and validity time information of the first client credentials assertion, and the validity time information of the first client credentials assertion represents validity time of the first client credentials assertion. That the first network element authenticates the service consumer network element based on the first client credentials assertion further includes one or more of the following: The first network element verifies whether a signature of the first client credentials assertion succeeds, verifies, based on the validity time information included in the first client credentials assertion, whether the first client credentials assertion expires, or verifies whether the identifier of the service consumer network element in the first client credentials assertion is the same as an identifier of a network element in a certificate for signing the first client credentials assertion.

According to a third aspect, this application provides a communication method. The method includes: A service consumer network element sends a first service request message to a service communication proxy, where the first service request message is used to request a first service from a service producer network element. The first service request message includes a fourth client credentials assertion and a fifth client credentials assertion, the fourth client credentials assertion is used by the service producer network element to authenticate the service consumer network element, and the fifth client credentials assertion is used by a network element providing a second service, to authenticate the service consumer network element. The fourth client credentials assertion includes a first network function type, and the fifth client credentials assertion includes a second network function type. The first network function type is a network function type of the service producer network element, the second network function type is a network function type of the network element providing the second service, and the second service is associated with the first service. The service consumer network element receives a response message for the first service request message from the service communication proxy.

In the foregoing embodiment, the service consumer network element sends the first service request message to the service communication proxy, where the first service request message includes the fourth client credentials assertion and the fifth client credentials assertion, the fourth client credentials assertion includes the first network function type, and the fifth client credentials assertion includes the second network function type, so that the network element providing the second service can successfully authenticate the service consumer network element. This ensures that the service consumer network element requests the first service, and resolves a problem, in an indirect communication scenario, that the service consumer network element fails to request the service because the authentication based on the client credentials assertion fails.

In some embodiments, the fourth client credentials assertion further includes an identifier of the service consumer network element and validity time information of the fourth client credentials assertion, and the validity time information of the fourth client credentials assertion represents validity time of the fourth client credentials assertion. The fifth client credentials assertion further includes the identifier of the service consumer network element and validity time information of the fifth client credentials assertion, where the validity time information of the fifth client credentials assertion represents validity time of the fifth client credentials assertion.

In some embodiments, the validity time of the fifth client credentials assertion is shorter than the validity time of the fourth client credentials assertion.

In some embodiments, a risk that the fifth client credentials assertion is maliciously used by the service communication proxy can be reduced, to ensure security of a communication process.

In some embodiments, the validity time of the fourth client credentials assertion is associated with first duration, and the first duration is determined based on a transmission delay between the service consumer network element and the service communication proxy and a transmission delay between the service communication proxy and the network element providing the second service.

The foregoing configuration rules for the validity time of the fourth client credentials assertion and the validity time of the fifth client credentials assertion can ensure, as much as possible, that the fourth client credentials assertion and the fifth client credentials assertion are not maliciously used by the service communication proxy, to ensure security of a communication process.

In some embodiments, the second service is used to provide an access token corresponding to the first service, and the access token corresponding to the first service indicates that the service consumer network element has permission to obtain the first service.

In some embodiments, the service consumer network element determines that there is no available access token corresponding to the first service.

In addition, after the service consumer network element determines that there is no available access token corresponding to the first service, the service consumer network element may carry, in the first service request message, a parameter for obtaining the access token corresponding to the first service.

In some embodiments, the service consumer network element can generate the first client credentials assertion as required, and this prevents the first client credentials assertion from being abused.

In some embodiments, that the service consumer network element determines that there is no available access token corresponding to the first service may include the following cases: The service consumer network element determines that the access token corresponding to the first service is not stored; or the service consumer network element determines that a stored access token corresponding to the first service expires.

In some embodiments, the service consumer network element deletes the expired access token when the stored access token corresponding to the first service expires.

In some embodiments, storage space can be released in time, and storage load of a system can be reduced.

In some embodiments, the second service is used to provide information about the service producer network element.

In some embodiments, the service consumer network element determines that the first service request message triggers the service communication proxy to request the second service.

In some embodiments, when the service consumer network element determines that the first service request message triggers the service communication proxy to request the second service, the service consumer network element determines, based on one or more of the following cases, that the first service request message triggers the service communication proxy to request the second service: context of a first terminal device is not stored and the first terminal device is associated with the first service; context of the first service is not stored; the service producer network element belongs to a first slice and context corresponding to the first slice is not stored; or the service consumer network element communicates with the service communication proxy for the first time.

In addition, after the service consumer network element determines that the first service request message can trigger the service communication proxy to request the second service, the service consumer network element may carry, in the first service request message, a parameter for discovering the service producer network element.

In some embodiments, the service consumer network element determines to request the first service in an indirect communication mode, namely, a mode D.

For example, it may be agreed on in a standard protocol or configured based on preconfiguration information that, when the service consumer network element communicates with the service communication proxy in the mode D, the first service request message always carries the client credentials assertion including the first network function type and the second network function type; or when the service consumer network element communicates with the service communication proxy in the mode D and determines that the first service request message can trigger the service communication proxy to request the second service, the first service request message carries the client credentials assertion including the first network function type and the second network function type.

In some embodiments, the service consumer network element sends a second service request message to the service communication proxy, where the second service request message is used to request the first service, the second service request message includes a second client credentials assertion, the second client credentials assertion includes the first network function type, and the second client credentials assertion is used to authenticate the service consumer network element. The service consumer network element receives a response message for the second service request message from the service communication proxy, where the response message for the second service request message includes indication information. When the service consumer network element sends the first service request message to the service communication proxy, the service consumer network element sends the first service request message to the service communication proxy based on the indication information.

In some embodiments, the service consumer network element may send the first service request message to the service communication proxy based on the indication information.

In some embodiments, the indication information includes a third client credentials assertion, the third client credentials assertion includes the second network function type, and the third client credentials assertion is used to authenticate the network element providing the second service. When the service consumer network element sends the first service request message to the service communication proxy based on the indication information, the service consumer network element sends the first service request message to the service communication proxy when the authentication, based on the third client credentials assertion, on the network element providing the second service succeeds.

In some embodiments, the service consumer network element may authenticate, based on the third client credentials assertion, the network element providing the second service, and send, when the authentication succeeds, the first service request message based on the second network function type included in the third client credentials assertion.

In some embodiments, the network element providing the second service is a network repository function network element.

According to a fourth aspect, this application provides a communication method. The method includes: A service communication proxy receives a first service request message from a service consumer network element, where the first service request message is used to request a first service from a service producer network element. The first service request message includes a fourth client credentials assertion and a fifth client credentials assertion. The fourth client credentials assertion is used by the service producer network element to authenticate the service consumer network element, and the fifth client credentials assertion is used by a first network element to authenticate the service consumer network element. The fourth client credentials assertion includes a first network function type, and the fifth client credentials assertion includes a second network function type. The first network function type is a network function type of the service producer network element, and the second network function type is a network function type of the first network element. The service communication proxy sends a second service request message to the first network element in response to the first service request message, where the second service request message is used to request a second service, and the second service request message includes the fifth client credentials assertion. The service communication proxy receives a response message for the second service request message from the first network element. The service communication proxy sends a third service request message to the service producer network element based on the response message for the second service request message, where the third service request message is used to request the first service from the service producer network element, and the third service request message includes the fourth client credentials assertion.

In the foregoing embodiment, the service consumer network element sends the first service request message to the service communication proxy, where the first service request message includes the fourth client credentials assertion and the fifth client credentials assertion, the fourth client credentials assertion includes the first network function type, the fifth client credentials assertion includes the second network function type, and the service communication proxy carries the fifth client credentials assertion when requesting the second service, so that a network element providing the second service can successfully authenticate the service consumer network element, and the service communication proxy carries the fourth client credentials assertion when requesting the first service, so that the service producer network element can successfully authenticate the service consumer network element. This ensures that the service consumer network element requests the first service, and resolves a problem, in an indirect communication scenario, that the service consumer network element fails to request the service because the authentication based on the client credentials assertion fails.

In some embodiments, the service communication proxy determines, based on the first service request message, that the second service needs to be requested from the first network element; and the service communication proxy determines, based on the network function type of the first network element, to carry the fifth client credentials assertion in the second service request message.

In some embodiments, the service communication proxy may parse the first service request message, select the fifth client credentials assertion from the fourth client credentials assertion and the fifth client credentials assertion based on the network function type of the first network element, and add the fifth client credentials assertion to the second service request message.

In some embodiments, the service communication proxy determines, based on the network function type of the service producer network element, to carry the fourth client credentials assertion in the third service request message.

In some embodiments, the service communication proxy may parse the first service request message, select the fourth client credentials assertion from the fourth client credentials assertion and the fifth client credentials assertion based on the network function type of the service producer network element, and add the fourth client credentials assertion to the second service request message.

In some embodiments, before the service communication proxy receives the first service request message from the service consumer network element, the service communication proxy receives a fourth service request message from the service consumer network element, where the fourth service request message is used to request the first service, the third service request message includes a sixth client credentials assertion, and the sixth client credentials assertion includes a third network function type. The service communication proxy sends a fifth service request message to the first network element, where the fifth service request message is used to request the second service, and the fifth service request message includes the sixth client credentials assertion. The service communication proxy receives a response message for the fifth service request message from the first network element, where the response message for the fifth service request message includes indication information. The service communication proxy sends a response message for the fourth service request message to the service consumer network element based on the indication information.

In some embodiments, the service communication proxy may send, based on the indication information, the response message for the fourth service request message to the service consumer network element, to obtain a client credentials assertion that matches the network function type of the first network, so that the first network element successfully authenticates the service consumer network element.

In some embodiments, the indication information includes a seventh client credentials assertion, the seventh client credentials assertion includes the network function type of the first network element, and the response message for the fourth service request message further includes the seventh client credentials assertion.

In some embodiments, the indication information may be used to trigger the service consumer network element to send the first service request message, and the first service request message includes the client credentials assertion that matches the network function type of the first network.

In some embodiments, the second service is used to provide an access token corresponding to the first service, and the access token corresponding to the first service indicates that the service consumer network element has permission to obtain the first service.

In some embodiments, the service communication proxy determines that an available access token corresponding to the first service is not stored and the first service request message does not include the access token corresponding to the first service.

In some embodiments, the second service is used to provide information about the service producer network element.

In some embodiments, the service communication proxy determines that the information about the service producer network element is not stored and the first service request message does not include the information about the service producer network element.

In some embodiments, the fourth client credentials assertion further includes an identifier of the service consumer network element and validity time information of the fourth client credentials assertion, and the validity time information of the fourth client credentials assertion represents validity time of the fourth client credentials assertion. The fifth client credentials assertion further includes the identifier of the service consumer network element and validity time information of the fifth client credentials assertion, where the validity time information of the fifth client credentials assertion represents validity time of the fifth client credentials assertion.

In some embodiments, the validity time of the fifth client credentials assertion is shorter than the validity time of the fourth client credentials assertion.

In some embodiments, a risk that the fifth client credentials assertion is maliciously used by the service communication proxy can be reduced, to ensure security of a communication process.

In some embodiments, the validity time of the fourth client credentials assertion is associated with first duration, and the first duration is determined based on a transmission delay between the service consumer network element and the service communication proxy and a transmission delay between the service communication proxy and the network element providing the second service.

The foregoing configuration rules for the validity time of the fourth client credentials assertion and the validity time of the fifth client credentials assertion can ensure, as much as possible, that the fourth client credentials assertion and the fifth client credentials assertion are not maliciously used by the service communication proxy, to ensure security of a communication process.

In some embodiments, the network element providing the second service is a network repository function network element.

According to a fifth aspect, this application provides a communication method. The method includes: A first network element receives a first service request message from a service communication proxy, where the first service request message is used to request a first service from the first network element, the first service request message includes a plurality of client credentials assertions, and each client credentials assertion includes a network function type. The first network element authenticates the service consumer network element based on the plurality of client credentials assertions. When the first network element authenticates the service consumer network element based on the plurality of client credentials assertions, the first network element determines whether one or more client credentials assertions in the plurality of client credentials assertions successfully authenticate the service consumer network element. The first network element sends, based on an authentication result, a response message for the first service request message to the service communication proxy.

According to the foregoing method, when the first service request message includes a plurality of client credentials assertions, the first network element determines that one or more client credentials assertions successfully authenticate the service consumer network element, and obtains the authentication result. Therefore, in the foregoing method, it can be determined, when there are a plurality of client credentials assertions, whether authentication on the service consumer network element succeeds.

In some embodiments, when the authentication result indicates that one or more client credentials assertions successfully authenticate the service consumer network element, the first network element sends the response message for the first service request message to the service communication proxy, where the response message for the first service request message is used to provide the first service. Alternatively, when the authentication result indicates that any one of the plurality of client credentials assertions fails to authenticate the service consumer network element, the first network element sends the response message for the first service request message to the service communication proxy, where the response message for the first service request message indicates that requesting of the first service fails.

In some embodiments, when one or more client credentials assertions successfully authenticate the service consumer network element, it is determined that the authentication on the service consumer network element succeeds. Alternatively, when any one of the plurality of client credentials assertions fails to authenticate the service consumer network element, that is, all client credentials assertions fail to authenticate the service consumer network element, it is determined that the authentication on the service consumer network element fails.

In some embodiments, the plurality of client credentials assertions include a fourth client credentials assertion and a fifth client credentials assertion. The fourth client credentials assertion includes a first network function type, and the fifth client credentials assertion includes a second network function type. The first network function type is a network function type of the first network element, the second network function type is a network function type of a network element providing a second service, and the second service is associated with the first service.

In some embodiments, the second service is used to provide an access token corresponding to the first service, and the access token corresponding to the first service indicates that the service consumer network element has permission to obtain the first service; or the second service is used to provide information about the first network element.

In some embodiments, the network element providing the second service is a network repository function network element.

In some embodiments, the first service is used to provide an access token corresponding to a second service, and the access token corresponding to the second service indicates that the service consumer network element has permission to obtain the second service; or the first service is used to provide information about a second service network element.

In some embodiments, the first network element is a network repository function network element.

In some embodiments, the first network element receives a second service request message from the service communication proxy, where the second service request message is used to request the first service from the first network element, the second service request message includes a sixth client credentials assertion, and the sixth client credentials assertion includes a third network function type. When the third network function type does not match the network function type of the first network element, the first network element sends, a response message for the third service request message to the service communication proxy, where the response message for the third service request message includes indication information, and the indication information is used to trigger the first service request message.

In some embodiments, when a network function type in the client credentials assertion does not match the network function type of the first network element, the first network element may carry the indication information in the response message for the third service request message. The indication information may be used to trigger the first service request message, to obtain a client credentials assertion including a network function type that matches the network function type of the first network element, so that the first network element successfully authenticates the service consumer network element.

In some embodiments, the indication information includes a seventh client credentials assertion used to authenticate the first network element, and the seventh client credentials assertion includes the network function type of the first network element.

In some embodiments, the network function type of the first network element may be carried in the indication information, to trigger a first client credentials assertion in the first service request message to carry the client credentials assertion including the network function type that matches the network function type of the first network element, so as to successfully authenticate the service consumer network element.

According to a sixth aspect, this application provides a communication method. The method is used in a scenario in which a service consumer network element requests a first service from a service producer network element through a service communication proxy. The method includes: The service communication proxy sends a client credentials assertion request message to the service consumer network element, where the client credentials assertion request message is used to request a first client credentials assertion, the first client credentials assertion is used by a network element providing a second device, to authenticate the service consumer network element, and the second service is associated with the first service. The service communication proxy receives a response message for the client credentials assertion request message from the service consumer network element, where the response message for the client credentials assertion request message includes the first client credentials assertion, and the first client credentials assertion includes a first network function type and a second network function type, or the first client credentials assertion includes a second network function type. The first network function type is a network function type of the service producer network element, and the second network function type is a network function type of the network element providing the second service.

In some embodiments, the service communication proxy may request the client credentials assertion, to ensure that the service communication proxy requests the second service and the service consumer network element requests the first service.

In some embodiments, before the service communication proxy sends the client credentials assertion request message to the service consumer network element, the service communication proxy receives a first service request message from the service consumer network element, where the first service request message is used to request the first service, the first service request message includes a second client credentials assertion, and the second client credentials assertion includes the first network function type. The service communication proxy sends a second service request message to a first network element, where the second service request message is used to request the second service, and the second service request message includes the second client credentials assertion. The service communication proxy receives a response message for the second service request message from the first network element, where the response message for the second service request message includes indication information. When the service communication proxy sends the client credentials assertion request message to the service consumer network element, the service communication proxy sends the client credentials assertion request message to the service consumer network element based on the indication information.

In some embodiments, when a network function type in the client credentials assertion does not match a network function type of the first network element, the first network element may carry the indication information in the response message for the second service request message. The indication information may be used to trigger the client credentials assertion request message, to obtain a client credentials assertion including a network function type that matches the network function type of the first network element, so that the first network element successfully authenticates the service consumer network element.

In some embodiments, the indication information includes a third client credentials assertion, the third client credentials assertion includes the network function type of the first network element, and the client credentials assertion request message includes the third client credentials assertion.

In some embodiments, the network function type of the first network element may be carried in the indication information, to trigger a first client credentials assertion in the first service request message to carry the client credentials assertion including the network function type that matches the network function type of the first network element, so as to successfully authenticate the service consumer network element.

In some embodiments, the first client credentials assertion includes the second network function type. The service communication proxy sends a third service request message to the first network element, where the third service request message is used to request the second service, and the third service request message includes the first client credentials assertion. The service communication proxy receives a response message for the third service request message from the first network element. The service communication proxy sends a fourth service request message to the service producer network element based on the response message for the third service request message, where the fourth service request message is used to request the first service, and the fourth service request message includes the second client credentials assertion.

In some embodiments, the service communication proxy parses a response message for the client credentials assertion, carries the first client credentials assertion in the third service request message based on the network function type of the first network element, and carries the second client credentials assertion in the fourth service request message based on the network function type of the service producer network element.

In some embodiments, the first client credentials assertion includes the first network function type and the second network function type. The service communication proxy sends a third service request message to the first network element, where the third service request message is used to request the second service, and the third service request message includes the first client credentials assertion. The service communication proxy receives a response message for the third service request message from the first network element. The service communication proxy sends a fourth service request message to the service producer network element based on the response message for the third service request message, where the fourth service request message is used to request the first service, and the fourth service request message includes the first client credentials assertion, or the fourth service request message includes the second client credentials assertion.

In some embodiments, the service communication proxy parses a response message for the client credentials assertion, carries the first client credentials assertion in the third service request message based on the network function type of the first network element, and carries the first client credentials assertion or the second client credentials assertion in the fourth service request message based on the network function type of the service producer network element.

In some embodiments, the second service is used to provide an access token corresponding to the first service, and the access token corresponding to the first service indicates that the service consumer network element has permission to obtain the first service.

In some embodiments, the service communication proxy determines that the access token corresponding to the first service is not stored and the first service request message does not include the first access token.

In some embodiments, the second service is used to provide information about the service producer network element.

In some embodiments, the service communication proxy determines that the information about the service producer network element is not stored and the first service request message does not include the information about the service producer network element.

In some embodiments, the network element providing the second service is a network repository function network element.

According to a seventh aspect, this application provides a communication apparatus. The apparatus includes a transceiver unit and a processing unit. The processing unit invokes the transceiver unit to: send a first service request message to a service communication proxy, where the first service request message is used to request a first service from a service producer network element, the first service request message includes a first client credentials assertion, the first client credentials assertion is used to authenticate the apparatus, the first client credentials assertion includes a first network function type and a second network function type, the first network function type is a network function type of the service producer network element, the second network function type is a network function type of a network element providing a second service, and the second service is associated with the first service; and receive a response message for the first service request message from the service communication proxy.

In some embodiments, the second service is used to provide an access token corresponding to the first service, and the access token corresponding to the first service represents that the apparatus has permission to obtain the first service.

In some embodiments, the processing unit is configured to determine that there is no available access token corresponding to the first service.

In some embodiments, the processing unit is configured to: determine, when determining that there is no available access token corresponding to the first service, that the access token corresponding to the first service is not stored; or determine that a stored access token corresponding to the first service expires.

In some embodiments, the processing unit is configured to delete the expired access token when the stored access token corresponding to the first service expires.

In some embodiments, the second service is used to provide information about the service producer network element.

In some embodiments, the processing unit is configured to determine that the first service request message triggers the service communication proxy to request the second service.

In some embodiments, when determining that the first service request message triggers the service communication proxy to request the second service, the processing unit is configured to determine, based on one or more of the following cases, that the first service request message triggers the service communication proxy to request the second service: context of a first terminal device is not stored and the first terminal device is associated with the first service; context of the first service is not stored; the service producer network element belongs to a first slice and context corresponding to the first slice is not stored; or the apparatus communicates with the service communication proxy for the first time.

In some embodiments, the processing unit is configured to determine to request the first service in an indirect communication mode, namely, a mode D.

In some embodiments, the transceiver unit is configured to: send a second service request message to the service communication proxy, where the second service request message is used to request the first service, the second service request message includes a second client credentials assertion, the second client credentials assertion includes the first network function type, and the second client credentials assertion is used to authenticate the apparatus; and receive a response message for the second service request message from the service communication proxy, where the response message for the second service request message includes indication information. When the first service request message is sent to the service communication proxy, the processing unit is configured to send the first service request message to the service communication proxy based on the indication information.

In some embodiments, the indication information includes a third client credentials assertion, the third client credentials assertion includes the second network function type, and the third client credentials assertion is used to authenticate the network element providing the second service. The transceiver unit is configured to: when the first service request message is sent to the service communication proxy based on the indication information, send the first service request message to the service communication proxy when the authentication, based on the third client credentials assertion, on the network element providing the second service succeeds.

In some embodiments, the network element providing the second service is a network repository function network element.

In some embodiments, the first client credentials assertion further includes one or more of the following: an identifier of the apparatus or validity time information, where the validity time information represents validity time of the first client credentials assertion.

According to an eighth aspect, this application provides a communication apparatus. The apparatus includes a transceiver unit and a processing unit. The transceiver unit is configured to receive a first service request message from a service communication proxy, where the first service request message is used to request a first service from the apparatus, the first service request message includes a first client credentials assertion, the first client credentials assertion is used to authenticate a service consumer network element. The first client credentials assertion includes a plurality of network function types. The processing unit is configured to authenticate the service consumer network element based on the first client credentials assertion. When the service consumer network element is authenticated based on the first client credentials assertion, the processing unit determines whether a network function type of the processing unit matches one or more of the plurality of network function types. The processing unit invokes the transceiver unit to send, based on an authentication result, a response message for the first service request message to the service communication proxy.

In some embodiments, when the authentication result is that the authentication succeeds, the transceiver unit is configured to send the response message for the first service request message to the service communication proxy, where the response message for the first service request message is used to provide the first service. Alternatively, when the authentication result is that the authentication fails, the transceiver unit is configured to send the response message for the first service request message to the service communication proxy, where the response message for the first service request message indicates that requesting of the first service fails.

In some embodiments, the plurality of network function types include a first network function type and a second network function type. The first network function type is a network function type of the apparatus, the second network function type is a network function type of a network element providing a second service, and the second service is associated with the first service.

In some embodiments, the second service is used to provide an access token corresponding to the first service, and the access token corresponding to the first service indicates that the service consumer network element has permission to obtain the first service; or the second service is used to provide information about the apparatus.

In some embodiments, the network element providing the second service is a network repository function network element.

In some embodiments, the first service is used to provide an access token corresponding to the second service, and the access token corresponding to the second service indicates that the service consumer network element has permission to obtain the second service; or the first service is used to provide information about a second service network element.

In some embodiments, the apparatus is a network repository function network element.

In some embodiments, the transceiver unit is configured to receive a second service request message from the service communication proxy, where the second service request message is used to request the first service from the apparatus, the second service request message includes a second client credentials assertion, and the second client credentials assertion includes a third network function type.

When the third network function type does not match the network function type of the apparatus, the transceiver unit is configured to send a response message for the second service request message to the service communication proxy, where the response message for the second service request message includes indication information, and the indication information is used to trigger the first service request message.

In some embodiments, the indication information includes a third client credentials assertion used to authenticate the apparatus, and the third client credentials assertion includes the network function type of the apparatus.

In some embodiments, the first client credentials assertion further includes an identifier of the service consumer network element and validity time information of the first client credentials assertion, and the validity time information of the first client credentials assertion represents validity time of the first client credentials assertion. That the processing unit is configured to authenticate the service consumer network element based on the first client credentials assertion further includes one or more of the following: verifying whether a signature of the first client credentials assertion succeeds, verifying, based on the validity time information included in the first client credentials assertion, whether the first client credentials assertion expires, or verifying whether the identifier of the service consumer network element in the first client credentials assertion is the same as an identifier of a network element in a certificate for signing the first client credentials assertion.

According to a ninth aspect, this application provides a communication apparatus. The apparatus includes a transceiver unit and a processing unit. The processing unit invokes the transceiver unit to: send a first service request message to a service communication proxy, where the first service request message is used to request a first service from a service producer network element, the first service request message includes a fourth client credentials assertion and a fifth client credentials assertion, the fourth client credentials assertion is used by the service producer network element to authenticate a service consumer network element, the fifth client credentials assertion is used by a network element providing a second service, to authenticate the service consumer network element, the fourth client credentials assertion includes a first network function type, the fifth client credentials assertion includes a second network function type, the first network function type is a network function type of the service producer network element, the second network function type is a network function type of the network element providing the second service, the second service is associated with the first service; and receive a response message for the first service request message from the service communication proxy.

In some embodiments, the fourth client credentials assertion further includes an identifier of the service consumer network element and validity time information of the fourth client credentials assertion, and the validity time information of the fourth client credentials assertion represents validity time of the fourth client credentials assertion. The fifth client credentials assertion further includes the identifier of the service consumer network element and validity time information of the fifth client credentials assertion, where the validity time information of the fifth client credentials assertion represents validity time of the fifth client credentials assertion.

In some embodiments, the validity time of the fifth client credentials assertion is shorter than the validity time of the fourth client credentials assertion.

In some embodiments, the validity time of the fourth client credentials assertion is associated with first duration, and the first duration is determined based on a transmission delay between the service consumer network element and the service communication proxy and a transmission delay between the service communication proxy and the network element providing the second service.

In some embodiments, the second service is used to provide an access token corresponding to the first service, and the access token corresponding to the first service represents that the apparatus has permission to obtain the first service.

In some embodiments, the processing unit is configured to determine that there is no available access token corresponding to the first service.

In some embodiments, the processing unit is configured to: determine, when determining that there is no available access token corresponding to the first service, that the access token corresponding to the first service is not stored; or determine that a stored access token corresponding to the first service expires.

In some embodiments, the processing unit is configured to delete the expired access token when the stored access token corresponding to the first service expires.

In some embodiments, the second service is used to provide information about the service producer network element.

In some embodiments, the processing unit is configured to determine that the first service request message triggers the service communication proxy to request the second service.

In some embodiments, when determining that the first service request message triggers the service communication proxy to request the second service, the processing unit is configured to determine, based on one or more of the following cases, that the first service request message triggers the service communication proxy to request the second service: context of a first terminal device is not stored and the first terminal device is associated with the first service; context of the first service is not stored; the service producer network element belongs to a first slice and context corresponding to the first slice is not stored; or the apparatus communicates with the service communication proxy for the first time.

In some embodiments, the processing unit is configured to determine to request the first service in an indirect communication mode, namely, a mode D.

In some embodiments, the transceiver unit is configured to: send a second service request message to the service communication proxy, where the second service request message is used to request the first service, the second service request message includes a second client credentials assertion, the second client credentials assertion includes the first network function type, and the second client credentials assertion is used to authenticate the apparatus; and receive a response message for the second service request message from the service communication proxy, where the response message for the second service request message includes indication information. When the first service request message is sent to the service communication proxy, the processing unit is configured to send the first service request message to the service communication proxy based on the indication information.

In some embodiments, the indication information includes a third client credentials assertion, the third client credentials assertion includes the second network function type, and the third client credentials assertion is used to authenticate the network element providing the second service. The transceiver unit is configured to: when the first service request message is sent to the service communication proxy based on the indication information, send the first service request message to the service communication proxy when the authentication, based on the third client credentials assertion, on the network element providing the second service succeeds.

In some embodiments, the network element providing the second service is a network repository function network element.

In some embodiments, the first client credentials assertion further includes one or more of the following: an identifier of the apparatus or validity time information, where the validity time information represents validity time of the first client credentials assertion.

According to a tenth aspect, this application provides a communication apparatus. The apparatus includes a transceiver unit and a processing unit. The processing unit invokes the transceiver unit to: receive a first service request message from a service consumer network element, where the first service request message is used to request a first service from a service producer network element, the first service request message includes a fourth client credentials assertion and a fifth client credentials assertion, the fourth client credentials assertion is used by the service producer network element to authenticate the service consumer network element, the fifth client credentials assertion is used by a first network element to authenticate the service consumer network element, the fourth client credentials assertion includes a first network function type, the fifth client credentials assertion includes a second network function type, the first network function type is a network function type of the service producer network element, the second network function type is a network function type of the first network element; send a second service request message to the first network element in response to the first service request message, where the second service request message is used to request a second service, and the second service request message includes the fifth client credentials assertion; receive a response message for the second service request message from the first network element; and send a third service request message to the service producer network element based on the response message for the second service request message, where the third service request message is used to request the first service from the service producer network element, and the third service request message includes the fourth client credentials assertion.

In some embodiments, the processing unit is configured to: determine, based on the first service request message, that the second service needs to be requested from the first network element; and determine, based on the network function type of the first network element, to carry the fifth client credentials assertion in the second service request message.

In some embodiments, the processing unit is configured to determine, based on the network function type of the service producer network element, to carry the fourth client credentials assertion in the third service request message.

In some embodiments, before the first service request message from the service consumer network element is received, the transceiver unit is configured to: receive a fourth service request message from the service consumer network element, where the fourth service request message is used to request the first service, the third service request message includes a sixth client credentials assertion, and the sixth client credentials assertion includes a third network function type; send a fifth service request message to the first network element, where the fifth service request message is used to request the second service, and the fifth service request message includes the sixth client credentials assertion; receive a response message for the fifth service request message from the first network element, where the response message for the fifth service request message includes indication information; and send a response message for the fourth service request message to the service consumer network element based on the indication information.

In some embodiments, the indication information includes a seventh client credentials assertion, the seventh client credentials assertion includes the network function type of the first network element, and the response message for the fourth service request message further includes the seventh client credentials assertion.

In some embodiments, the second service is used to provide an access token corresponding to the first service, and the access token corresponding to the first service indicates that the service consumer network element has permission to obtain the first service.

In some embodiments, the processing unit is configured to determine that an available access token corresponding to the first service is not stored and the first service request message does not include the access token corresponding to the first service.

In some embodiments, the second service is used to provide information about the service producer network element.

In some embodiments, the processing unit is configured to determine that the information about the service producer network element is not stored and the first service request message does not include the information about the service producer network element.

In some embodiments, the fourth client credentials assertion further includes an identifier of the service consumer network element and validity time information of the fourth client credentials assertion, and the validity time information of the fourth client credentials assertion represents validity time of the fourth client credentials assertion. The fifth client credentials assertion further includes the identifier of the service consumer network element and validity time information of the fifth client credentials assertion, where the validity time information of the fifth client credentials assertion represents validity time of the fifth client credentials assertion.

In some embodiments, the validity time of the fifth client credentials assertion is shorter than the validity time of the fourth client credentials assertion.

In some embodiments, the validity time of the fourth client credentials assertion is associated with first duration, and the first duration is determined based on a transmission delay between the service consumer network element and the service communication proxy and a transmission delay between the service communication proxy and the network element providing the second service.

In some embodiments, the network element providing the second service is a network repository function network element.

According to an eleventh aspect, this application provides a communication apparatus. The apparatus includes a transceiver unit and a processing unit. The processing unit invokes the transceiver unit to: receive a first service request message from a service communication proxy, where the first service request message is used to request a first service from a first network element, the first service request message includes a plurality of client credentials assertions, and each client credentials assertion includes a network function type. The first network element authenticates a service consumer network element based on the plurality of client credentials assertions. That the first network element authenticates the service consumer network element based on the plurality of client credentials assertions includes: The first network element determines whether one or more client credentials assertions in the plurality of client credentials assertions successfully authenticate the service consumer network element. The first network element sends, based on an authentication result, a response message for the first service request message to the service communication proxy.

In some embodiments, when the authentication result indicates that one or more client credentials assertions successfully authenticate the service consumer network element, the first network element sends the response message for the first service request message to the service communication proxy, where the response message for the first service request message is used to provide the first service. Alternatively, when the authentication result indicates that any one of the plurality of client credentials assertions fails to authenticate the service consumer network element, the first network element sends the response message for the first service request message to the service communication proxy, where the response message for the first service request message indicates that requesting of the first service fails.

In some embodiments, the plurality of client credentials assertions include a fourth client credentials assertion and a fifth client credentials assertion. The fourth client credentials assertion includes a first network function type, and the fifth client credentials assertion includes a second network function type. The first network function type is a network function type of the first network element, the second network function type is a network function type of a network element providing a second service, and the second service is associated with the first service.

In some embodiments, the second service is used to provide an access token corresponding to the first service, and the access token corresponding to the first service indicates that the service consumer network element has permission to obtain the first service; or the second service is used to provide information about the first network element.

In some embodiments, the network element providing the second service is a network repository function network element.

In some embodiments, the first service is used to provide an access token corresponding to the second service, and the access token corresponding to the second service indicates that the service consumer network element has permission to obtain the second service; or the first service is used to provide information about a second service network element.

In some embodiments, the first network element is a network repository function network element.

In some embodiments, the transceiver unit is configured to receive a second service request message from the service communication proxy, where the second service request message is used to request the first service from the first network element, the second service request message includes a sixth client credentials assertion, and the sixth client credentials assertion includes a third network function type.

When the third network function type does not match the network function type of the first network element, the transceiver unit is configured to send a response message for the second service request message to the service communication proxy, where the response message for the second service request message includes indication information, and the indication information is used to trigger the first service request message.

In some embodiments, the indication information includes a seventh client credentials assertion used to authenticate the first network element, and the seventh client credentials assertion includes the network function type of the first network element.

According to a twelfth aspect, this application provides a communication apparatus. The apparatus includes a transceiver unit and a processing unit. A service consumer network element requests a first service from a service producer network element by using the apparatus. The processing unit invokes the transceiver unit to: send a client credentials assertion request message to the service consumer network element, where the client credentials assertion request message is used to request a first client credentials assertion, the first client credentials assertion is used by a network element providing a second device, to authenticate the service consumer network element, and the second service is associated with the first service; and receive a response message for the client credentials assertion request message from the service consumer network element, where the response message for the client credentials assertion request message includes the first client credentials assertion, and the first client credentials assertion includes a first network function type and a second network function type, or the first client credentials assertion includes a second network function type. The first network function type is a network function type of the service producer network element, and the second network function type is a network function type of the network element providing the second service.

In some embodiments, before the client credentials assertion request message is sent to the service consumer network element, the transceiver unit is configured to: receive a first service request message from the service consumer network element, where the first service request message is used to request the first service, the first service request message includes a second client credentials assertion, and the second client credentials assertion includes the first network function type; send a second service request message to the network element providing the second service, where the second service request message is used to request the second service, and the second service request message includes the second client credentials assertion; receive a response message for the second service request message from the network element providing the second service, where the response message for the second service request message includes indication information; and send, when the client credentials assertion request message is sent to the service consumer network element, the client credentials assertion request message to the service consumer network element based on the indication information.

In some embodiments, the indication information includes a third client credentials assertion, the third client credentials assertion includes a network function type of a first network element, and the client credentials assertion request message includes the third client credentials assertion.

In some embodiments, the first client credentials assertion includes the second network function type. The service communication proxy sends a third service request message to the first network element, where the third service request message is used to request the second service, and the third service request message includes the first client credentials assertion. The service communication proxy receives a response message for the third service request message from the first network element. The service communication proxy sends a fourth service request message to the service producer network element based on the response message for the third service request message, where the fourth service request message is used to request the first service, and the fourth service request message includes the second client credentials assertion.

In some embodiments, the first client credentials assertion includes the first network function type and the second network function type. The transceiver unit is configured to: send a third service request message to the first network element, where the third service request message is used to request the second service, and the third service request message includes the first client credentials assertion; receive a response message for the third service request message from the first network element; and send a fourth service request message to the service producer network element based on the response message for the third service request message, where the fourth service request message is used to request the first service, and the fourth service request message includes the first client credentials assertion, or the fourth service request message includes the second client credentials assertion.

In some embodiments, the second service is used to provide an access token corresponding to the first service, and the access token corresponding to the first service indicates that the service consumer network element has permission to obtain the first service.

In some embodiments, before the client credentials assertion request message is sent to the service consumer network element, the processing unit is configured to determine that a first access token is not stored and the first service request message does not include the access token corresponding to the first service.

In some embodiments, the second service is used to provide information about the service producer network element.

In some embodiments, before the client credentials assertion request message is sent to the service consumer network element, the processing unit is configured to determine that the information about the service producer network element is not stored and the first service request message does not include the information about the service producer network element.

In some embodiments, the network element providing the second service is a network repository function network element.

According to a thirteenth aspect, this application further provides a communication apparatus. The apparatus may perform the foregoing method design. The apparatus may be a chip or a circuit that can perform a function corresponding to the foregoing method, or a device including the chip or the circuit.

In a possible implementation, the apparatus includes: a memory, configured to store computer-executable program code; and a processor, where the processor is coupled to the memory. The program code stored in the memory includes instructions. When the processor executes the instructions, the apparatus or a device on which the apparatus is installed is enabled to perform the method in any one of possible designs of the first aspect to the sixth aspect.

The apparatus may further include a communication interface. The communication interface may be a transceiver. Alternatively, if the apparatus is a chip or a circuit, the communication interface may be an input/output interface of the chip, for example, an input/output pin.

In some embodiments, the apparatus includes corresponding functional units, which are respectively configured to implement the steps in the foregoing method. The function may be implemented by hardware, or may be implemented by hardware executing corresponding software. The hardware or the software includes one or more units corresponding to the foregoing function.

According to a fourteenth aspect, an embodiment of this application provides a computer-readable storage medium, where the computer-readable storage medium stores a computer program, and when the computer program is run on an apparatus, the method in any one of the possible designs of the first aspect to the sixth aspect is performed.

According to a fifteenth aspect, an embodiment of this application provides a computer program product, where the computer program product includes a computer program, and when the computer program is run on an apparatus, the method in any one of the possible designs of the first aspect to the sixth aspect is performed.

According to a sixteenth aspect, this application provides a communication chip, where the communication chip stores instructions, and when the instructions are run on a communication device, the communication chip is enabled to perform the method in any one of the possible designs of the first aspect to the sixth aspect.

BRIEF DESCRIPTION OF DRAWINGS

FIG. 20A and FIG. 20B are a flowchart in which an NF service consumer obtains a first service when an SCP actively requests a client credentials assertion according to an embodiment of this application;

DETAILED DESCRIPTION

The following describes the technical solutions in embodiments of this application with reference to the accompanying drawings in embodiments of this application. It is clear that the described embodiments are merely some but not all of embodiments of this application. In this specification, claims, and accompanying drawings of this application, the terms "first", "second", corresponding term numbers, and the like are intended to distinguish between similar objects but do not necessarily indicate a specific order or sequence. It should be understood that the terms used in such a way are interchangeable in proper circumstances, which is merely a distinguishing manner that is used when objects having a same attribute are described in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

In descriptions of this application, "/" means "or" unless otherwise specified. For example, A/B may represent A or B. In this application, "and/or" describes only an association relationship for describing associated objects and represents that three relationships may exist. For example, A and/or B may represent the following three cases: Only A exists, both A and B exist, and only B exists. In addition, in the descriptions of this application, "at least one item" means one or more items, and "a plurality of items" means two or more items. "At least one item (piece) of the following" or a "similar expression thereof" means any combination "of these items, including a singular item (piece) or any combination of plural items (pieces). For example, at least one item (piece) of a, b, or c may indicate a, b, c, a and b, a and c, b and c, or a, b, and c, where a, b, and c may be singular or plural.

The technical solutions in embodiments of this application may be applied to various communication systems, for example, a wideband code division multiple access (Wideband Code Division Multiple Access, WCDMA) system, a general packet radio service (general packet radio service, GPRS), a long term evolution (Long Term Evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communication system, a $5^{th}$ generation ($5^{th}$ generation, 5G) system, or a further $6^{th}$ generation communication system.

Figure 1:
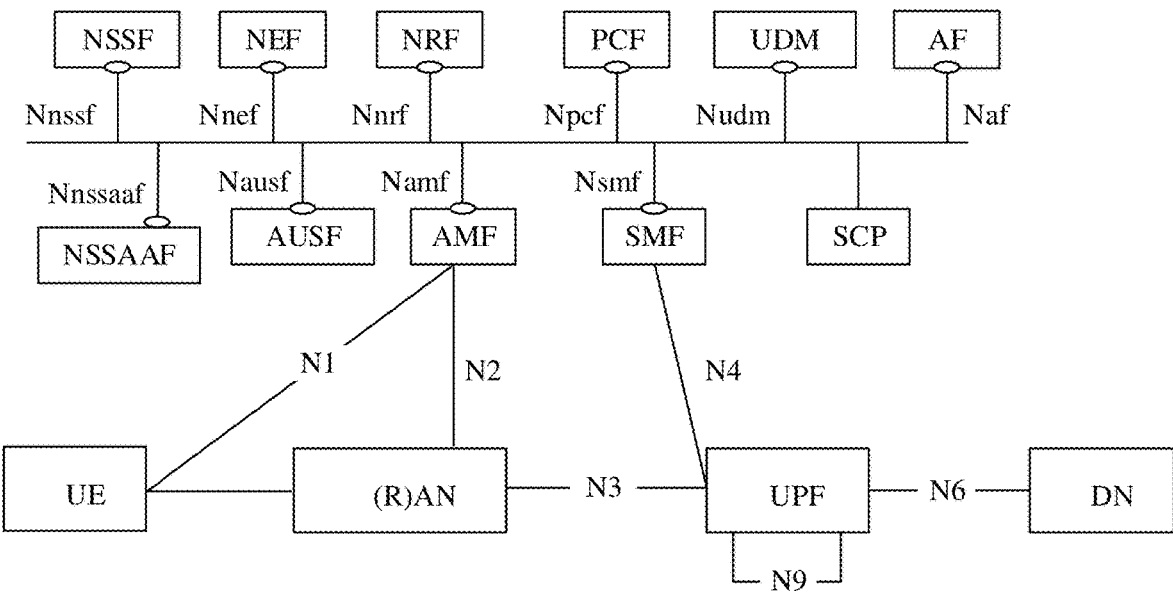
FIG. 1 is a schematic diagram of an architecture of a mobile communication system to which an embodiment of this application is applied.

For ease of understanding embodiments of this application, an application scenario used in this application is described by using an enhanced service-based architecture shown in FIG. 1 as an example. Specifically, the enhanced service-based architecture may specifically include but is not limited to the following devices.

1. Session management network element: is mainly configured to: manage a session, allocate and manage an internet protocol (internet protocol, IP) address of a terminal device, select an endpoint that can manage a user equipment plane function interface and a policy control or charging function interface, perform downlink data notification, and the like. In 5G communication, the session management network element may be a session management function (session management function, SMF) network element. In future communication such as 6G communication, the session management function network element may still be an SMF network element or have another name. This is not limited in this application. Nsmf is a service-based interface provided by an SMF. The SMF may communicate with another network function through the Nsmf.

2. Access management network element: is mainly configured to perform mobility management, access management, and the like. The access management network element may be configured to implement a function, for example, lawful interception or access authorization (or authentication), in mobility management entity (mobility management entity, MME) functions other than session management. In 5G communication, the access management network element may be an access and mobility management function (access and mobility management function, AMF) network element. In future communication such as 6G communication, the access management network element may still be an AMF network element or have another name. This is not limited in this application. Namf is a service-based interface provided by the AMF. The AMF may communicate with another network function through the Namf.

3. Authentication service network element: is mainly configured to perform user authentication and the like. In 5G communication, the authentication service network element may be an authentication server function (authentication server function, AUSF) network element. In future communication such as 6G communication, the authentication service network element may still be an AUSF network element or have another name. This is not limited in this application. Nausf is a service-based interface provided by the AUSF. The AUSF may communicate with another network function through the Nausf.

4. Network exposure network element: is configured to securely expose, to the outside, a service, a capability, and the like that are provided by a $3^{rd}$ generation partnership project ($3^{rd}$ generation partnership project, 3GPP) network function. In 5G communication, the network exposure network element may be a network exposure function (network exposure function, NEF) network element. In future communication such as 6G communication, the network exposure function network element may still be an NEF network element or have another name. This is not limited in this application. Nnef is a service-based interface provided by the NEF. The NEF may communicate with another network function through the Nnef.

5. Network repository network element: is configured to provide service registration, discovery, and authorization, and maintain available network function (network function, NF) instance information. These functions help achieve NF interconnections and on-demand network function and service configurations. The service registration means that an NF network element can provide a service only after being registered with the network repository network element. The service discovery means that when the NF network element needs another NF network element to provide a service for the NF network element, the NF network element needs to perform service discovery by using the network repository network element, to discover an expected NF network element that provides a service for the NF network element. For example, when an NF network element 1 needs an NF network element 2 to provide a service for the NF network element 1, the NF network element 1 needs to perform service discovery by using the network repository network element, to discover the NF network element 2. The service authorization means that when the NF network element needs another NF network element to provide a service, the NF network element needs to obtain authorization information by using the network repository network element, to further obtain, based on the authorization information, the service provided by the another NF network element. For example, before the NF network element 1 requests a service from the NF network element 2, the NF network element 1 first requests, from the network storage network element, authorization information for accessing the NF network element 2, and the NF network element 1 requests the service from the NF network element 2 based on the obtained authorization information. In 5G communication, the network repository network element may be a network repository function (network repository function, NRF) network element. In future communication such as 6G communication, the network repository function network element may still be an NRF network element or have another name. This is not limited in this application. Nnrf is a service-based interface provided by the NRF. The NRF may communicate with another network function through the Nnrf.

6. Policy control network element: is configured to guide a unified policy framework for network behavior, provide policy rule information for a control plane function network element (for example, an AMF or an SMF), and the like. In 5G communication, the policy control network element may be a policy control function (policy control function, PCF) network element. In future communication such as 6G communication, the policy control function network element may still be an NEF network element or have another name. This is not limited in this application. Npcf is a service-based interface provided by the PCF. The PCF may communicate with another network function through the Npcf.

7. Data management network element: is configured to perform user identifier processing, access authentication, registration, mobility management, or the like. In 5G communication, the data management network element may be a unified data management (unified data management, UDM) network element. In future communication such as 6G communication, the data management network element may still be a UDM network element or have another name. This is not limited in this application. Nudm is a service-based interface provided by the UDM. The UDM may communicate with another network function through the Nudm.

8. Application network element: is configured to perform application-affected data routing, access a network exposure function, interact with a policy framework to perform policy control, or the like. In 5G communication, the application network element may be an application function (application function, AF) network element. In future communication such as 6G communication, the application network element may still be an AF network element or have another name. This is not limited in this application. Naf is a service-based interface provided by the AF The AF may communicate with another network function through the Naf.

9. User equipment (user equipment, UE): may include various handheld devices, vehicle-mounted devices, wearable devices, or computing devices having a wireless communication function, or another processing device connected to a wireless modem, and terminals, mobile stations (mobile stations, MSs), terminals (terminals), user equipment (user equipment, UE), software terminals, and the like in various forms, for example, a water meter, an electricity meter, and a sensor.

10. (Radio) access network (radio access network, ®AN) network element: is configured to provide a network access function for authorized user equipment in a specific area, and can use transmission tunnels with different quality based on user equipment levels, service requirements, and the like.

The RAN network element can manage radio resources and provide an access service for a terminal device, to forward a control signal and user equipment data between the terminal and a core network. The RAN network element may also be understood as a base station in a network of some approaches.

11. User plane (user plane function, UPF) network element: is configured to perform packet routing and forwarding, perform quality of service (quality of service, QoS) processing on user plane data, and the like. In 5G communication, the user plane network element may be a user plane function (user plane function, UPF) network element. In future communication such as 6G communication, the user plane network element may still be a UPF network element or have another name. This is not limited in this application.

12. Data network (data network, DN) network element: is configured to provide a network for data transmission, for example, an internet network. The DN network element may be a data network authentication, authorization, and accounting (data network authentication, authorization, accounting) network element, an application server (application function), or the like.

13. SCP: is configured to route and forward a service-oriented interface message. This may also be understood as that the SCP may provide routing and forwarding services for a sender of service-oriented interface signaling. For example, when an AMF requests an SMF to establish a session, the AMF sends a session establishment request message to the SCP, the SCP sends the session establishment request message to the SMF, and the SMF determines whether to respond to the session establishment request message. If the SMF sends a session establishment response message to the SCP, the SCP sends the session establishment response message to the AMF. If the SMF sends a session establishment reject message to the SCP, the SCP sends the session establishment reject message to the AMF. A message exchanged between the AMF and the SMF may pass through a one-hop SCP or multi-hop SCP.

It may be understood that the foregoing functions or network elements may be network elements in a hardware device, software functions running on dedicated hardware, or virtualized functions instantiated on a platform (for example, a cloud platform). An application scenario of embodiments of this application is not limited thereto, and any network architecture that can implement the foregoing network functions is applicable to embodiments of this application.

It should be noted that in the following content, a consumer, a service consumer network element, and an NF service consumer are network elements of a same type, and a producer, a service producer network element, and an NF service producer are network elements of a same type. In the following embodiments of this application, it is assumed that a local operator policy indicates that a service request message sent by an NF service consumer to an SCP needs to carry a CCA. For example, the local operator policy may be configured as that the NF service consumer generates a CCA during indirect communication, to authenticate the NF service consumer based on the CCA.

Based on the foregoing enhanced service-based architecture, the following briefly describes several modes of an indirect communication procedure.

1. Indirect Communication without Delegated Discovery (Indirect Communication Without Delegated Discovery) (which is Briefly Referred to as a Mode C)

A consumer directly communicates with an NRF, to perform a service discovery procedure to select a corresponding service producer network element, and no SCP network element needs to participate in the service discovery procedure.

Figure 2:
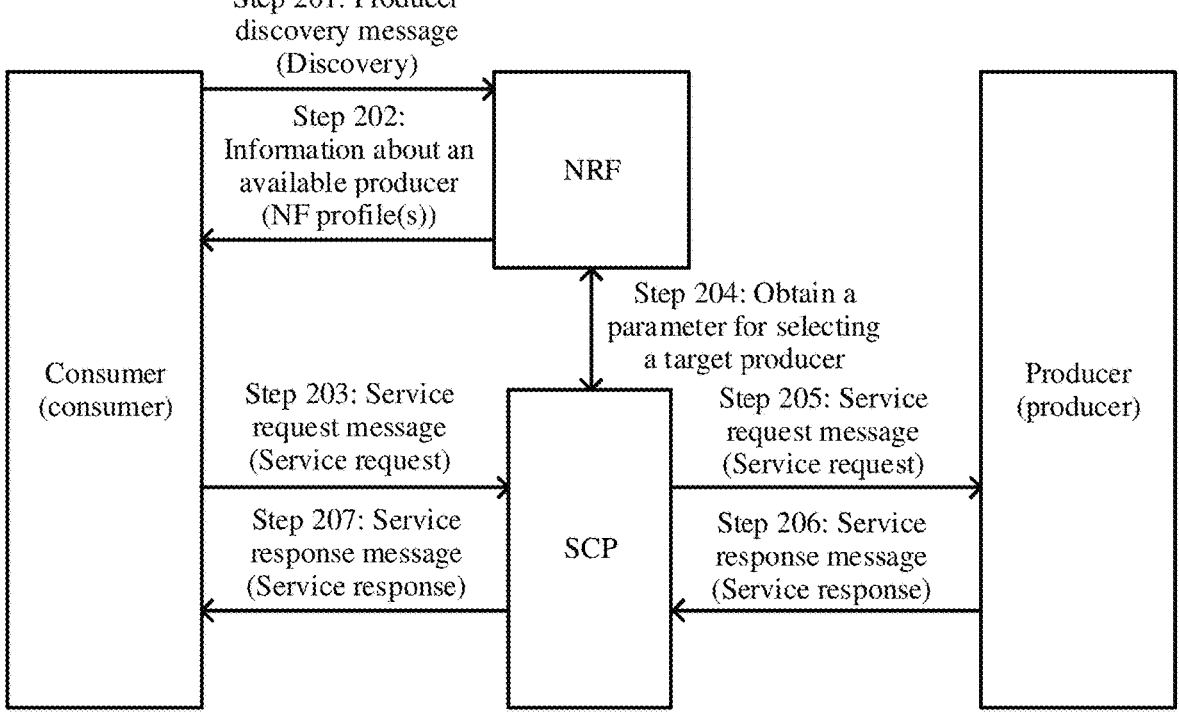
FIG. 2 is a schematic diagram of an indirect communication mode, namely, a mode C according to an embodiment of this application.

The following describes the mode C with reference to FIG. 2.

Step 201: The consumer sends a producer discovery message to the NRF.

Step 202: The NRF sends information about an available producer to the consumer.

\ise, the consumer may select a target producer based on the obtained information about the available producer. The information about the available producer may include an NF set ID, a specific NF instance identifier, or the like. Specifically, the target producer may be any NF instance (namely, any producer in a producer set) corresponding to the NF set ID, a specific NF instance (namely, a specific producer) in an NF instance corresponding to a specific NF set ID, or a specific NF instance (namely, a specific producer).

In some embodiments, an SCP may be responsible for selecting a target producer. For details, refer to the following step 204.

Step 203: The consumer sends a service request message to the SCP, to request a specific service from the target producer through the SCP.

Step 204: The SCP interacts with the NRF to obtain a parameter for selecting the target producer.

For example, the parameter obtained by the SCP may include but is not limited to a location, a capacity, or the like of an NF instance.

It should be noted that step 204 is an optional step. For example, the service request message includes information about the available producer. For example, the information about the available producer includes the NF set ID, in other words, the information about the available producer points to a group of NF instances. The SCP needs to select an NF instance from the group of NF instances as the target producer. Specifically, the SCP may select the target producer based on the parameter obtained from the NRF. For example, the SCP may determine the target producer from a group of NF instances based on the obtained location of the NF instance.

Step 205: The SCP sends a service request message to the target producer, to request the specific service from the target producer.

Step 206: The target producer sends, to the SCP, a service request response message for providing the specific service.

Step 207: The SCP sends, to the consumer, a service request response message for providing the specific service.

2. Indirect Communication with Delegated Discovery (Indirect Communication with Delegated Discovery) (which is Briefly Referred to as a Mode D)

A consumer does not directly communicate with an NRF. An SCP network element serves as a proxy of the consumer to communicate with the NRF, to perform a service discovery procedure to select a corresponding service producer network element.

Figure 3:
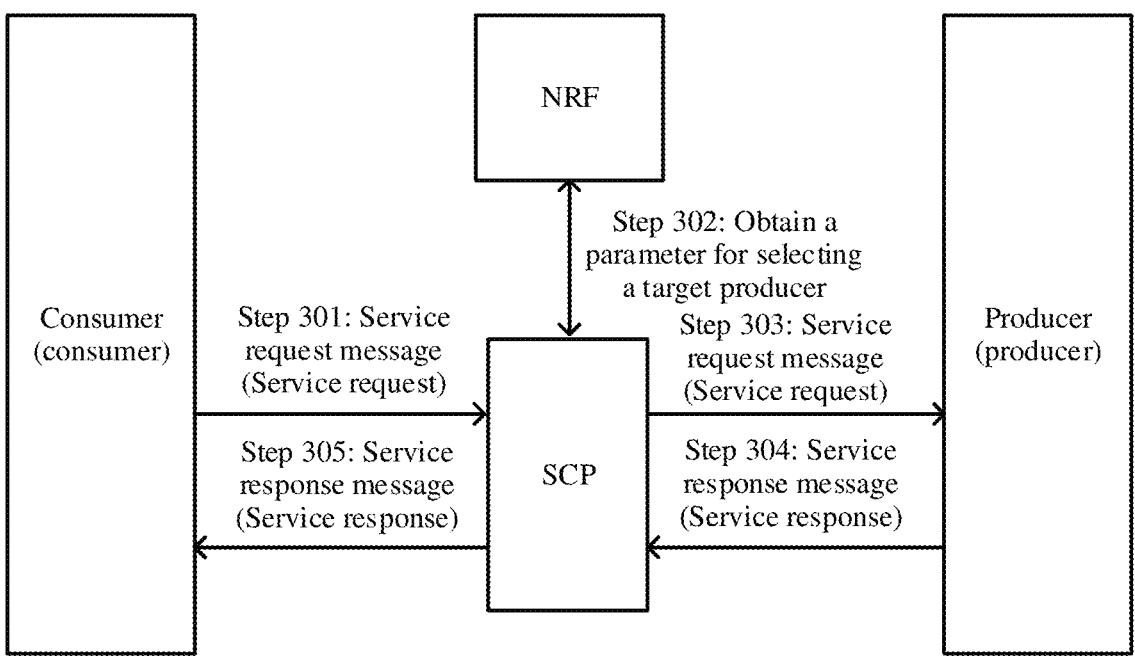
FIG. 3 is a schematic diagram of an indirect communication mode, namely, a mode D according to an embodiment of this application.

The following describes the mode D with reference to FIG. 3.

Step 301: The consumer sends a service request message to the SCP, to request a specific service from a target producer through the SCP.

The service request message includes a parameter used for target producer discovery and selection.

Step 302: The SCP interacts with the NRF to obtain information about an available producer.

The SCP may obtain the information about the available producer based on the parameter that is in the service request message in step 301 and that is used for target producer discovery and selection, and determine a target producer from the information about the available producer.

Step 303: The SCP sends a service request message to the target producer, to request the specific service from the target producer.

Step 304: The target producer sends, to the SCP, a service request response message for providing the specific service.

Step 305: The SCP sends, to the consumer, a service request response message for providing the specific service.

It should be noted that, in embodiments of this application, the service request message received by the SCP from the consumer and the service request message sent by the SCP to the target producer may be the same or different. For example, the SCP may modify the service request message received from the consumer (for example, add, delete, or modify some information) to generate and send the service request message to the target producer. Similarly, the service request response message received by the SCP from the target producer and the service request response message sent by the SCP to the consumer may be the same or different. For example, the SCP may modify the service request response message received from the target producer to generate the service request response message sent to the consumer.

Further, in the indirect communication procedures shown in FIG. 2 and FIG. 3, when the consumer communicates with the producer through the SCP, the producer further needs to authenticate the consumer that initiates a service request. Similarly, when the consumer communicates with the NRF through the SCP, the NRF also needs to authenticate the consumer that initiates the service request.

For an authentication requirement in the foregoing indirect communication scenario, the following describes verification information in embodiments of this application.

1. Client Credentials Assertion (Client Credentials Assertion, CCA)

For example, the CCA may be a token (token) signed by a peer, and is used by an authenticator to authenticate/verify the peer, that is, determine an identity of the peer.

For example, the CCA is a token signed by an NF service consumer. The CCA is included in a message, so that a receiver (namely, the authenticator, for example, an NRF or an NF service producer) of the message authenticates the NF service consumer. For example, the CCA may be included in a message header or a message body of a hypertext transfer protocol (hypertext transfer protocol, HTTP) message.

The CCA may include three parts: a message header (head), a payload (payload), and a signature (signature).

The payload includes claims (claims). For example, the claims include an NF instance ID of the NF service consumer, a timestamp (timestamp), expiration time, and an NF type of an expected audience. The timestamp indicates release time of the CCA, and the expiration time indicates that the CCA is considered to expire after the time. The NF type of the expected audience is an NF type of a network element that authenticates the NF service consumer.

The message header and the payload are signed by the NF service consumer based on a private key of an NF service consumer certificate. The message header includes certificate information, namely, related information of the NF service consumer certificate. For example, the certificate information includes a certificate or a certificate chain that is located to a public key, or the certificate information includes a uniform resource locator (uniform resource locator, URL) of a certificate or a certificate chain that is located to a public key.

When the authenticator (for example, the NRF or the NF service producer) receives a message containing the CCA, the authenticator authenticates the NF service consumer based on the CCA. The authentication process is as follows:

A signature of the CCA is verified. If the signature verification succeeds, whether the CCA expires is verified based on the timestamp and/or the expiration time of the CCA. If the CCA does not expire, the authenticator further verifies whether the NF type of the expected audience matches an NF type of the authenticator. If the NF type of the expected audience matches the NF type of the authenticator, the authenticator verifies whether an NF instance ID of the NF service consumer in the CCA matches an NF instance ID in a certificate for signing the CCA. If the NF instance ID of the NF service consumer matches the NF instance ID in the certificate, all verifications succeed, and the authenticator determines that the authentication on the NF service consumer succeeds. It should be noted that a sequence of the foregoing verification is not limited in this application.

That the authenticator verifies whether the NF type of the expected audience matches the NF type of the authenticator may include that, for example, the authenticator determines whether the NF type of the expected audience is the same as the NF type of the authenticator. For example, when the NF type of the expected audience is an AMF, the authenticator verifies whether the NF type of the authenticator is an AMF. Verifying whether the NF instance ID of the NF service consumer in the CCA matches the NF instance ID in the certificate for signing the CCA may include, for example, determining whether the NF instance ID of the NF service consumer in the CCA is the same as the NF instance ID in the certificate for signing the CCA.

It may be understood that the foregoing authentication process is merely an example, and the authenticator may further verify the CCA in another order. This is not limited in this application.

2. Access Token (Access Token)

The access token represents/indicates that the consumer has permission to obtain a service. A producer provides the corresponding service for the consumer only when the verification of the access token succeeds.

For example, the NRF receives an access token request message from the NF service consumer or the SCP, and the NRF performs authorization check, and determines that the authorization succeeds. In this case, the NRF generates an access token including claims.

There are two types of access tokens: an access token based on an NF type of an NF service producer (which is briefly referred to as a type A) and an access token based on an NF service producer instance or an NF service producer service instance (which is briefly referred to as a type B).

An instance is defined based on a function. An instance may be an NF service consumer instance or an NF service producer instance. An instance is defined based on a service. An instance may also be referred to as a service instance. For example, a service instance may be a service instance providing a service A or a service instance providing a service B.

If the NF service consumer requests an access token of a type A, the requested access token indicates that the NF service consumer has permission to access any NF service producer corresponding to the NF type to obtain a service, or the requested access token indicates that the NF service consumer has permission to access a service of any NF service producer corresponding to the NF type. The access token request message includes an NF instance ID of the NF service consumer, an expected service name, an NF type of the NF service consumer, and an NF type of an expected NF service producer. In some embodiments, the access token request message may further include a single network slice selection assistance information (single network slice selection assistance information, S-NSSAI) list or a network slice instance identifier (network slice instance identifier, NSI ID) list of an expected NF service producer instance, an NF set ID of the expected NF service producer instance, an S-NS-SAI list of an NF service consumer, and the like.

Correspondingly, the claims in the access token generated by the NRF include an NF instance ID of the NRF, the NF instance ID of the NF service consumer, the NF type of the NF service producer, the expected service name, and validity time of the access token. In some embodiments, the claims may further include an additional range (for example, a requested resource and a requested operation for the resource), the S-NSSAI list or NSI ID list of the expected NF service producer instance, and the NF set ID of the expected NF service producer instance.

If the NF service consumer requests an access token of a type B, the requested access token is used to authorize access to a specific NF service producer instance or NF service producer service instance to obtain a service. The access token request message includes an NF instance ID of the NF service consumer, the expected service name, and a requested NF service producer instance ID(s).

Correspondingly, the claims in the access token generated by the NRF include an NF instance ID of the NRF, the NF instance ID of the NF service consumer, the NF instance ID(s) of the NF service producer, the expected service name, and validity time of the access token. In some embodiments, the claims may further include an additional range (for example, a requested resource and a requested operation for the resource).

In addition, generally, validity time of the CCA is shorter than the validity time of the access token.

Further, after the NRF generates the access token, the NRF performs integrity protection on the access token, for example, performs integrity protection on the claims based on a key shared with the NF service producer, for example, generates a message authentication code (message authentication code, MAC) or signs the claims based on a private key of an NRF certificate.

When the producer (for example, the NF service producer) receives a service request message including an access token, the producer performs integrity verification, for example, verifies a MAC of the access token based on a key shared with the NRF or verifies a signature of the access token based on a public key of the NRF certificate. If the integrity verification succeeds, the claims in the access token are further verified.

For Claims in the Access Token of the Type A, the Producer Specifically Verifies the Following Content:

(1) The producer verifies whether an NF type of a requested NF service producer in the claims matches the NF type of the producer.

(2) If the claims include the S-NSSAI list or NSI ID list of the expected NF service producer instance, the producer verifies whether the producer can serve a corresponding slice.

(3) If the claims include the NF set ID of the expected NF service producer instance, the producer verifies whether the NF set ID in the claims matches an NF set ID of the producer.

(4) If the claims include the expected service name, the producer verifies whether a service operation requested by the service request message is matched.

(5) If the claims include additional scope information, the producer verifies whether the additional scope information matches the service operation requested by the service request message.

(6) The producer verifies the validity time in the access token based on current data/time to check whether the access token expires, or the producer verifies the validity time in the access token based on current data/time to check whether the access token falls within a validity period.

For Claims in the Access Token of the Type B, the Producer Specifically Verifies the Following Content:

(1) The producer verifies whether an NF instance ID(s) of a requested NF service producer in the claims includes an ID of the producer.

(2) If the claims include the expected service name, the producer verifies whether a service operation requested by the service request message is matched.

(3) If the claims include additional scope information, the producer verifies whether the additional scope information matches the service operation requested by the service request message.

(4) The producer verifies the validity time in the access token based on current data/time to check whether the access token expires, or the producer verifies the validity time in the access token based on current data/time to check whether the access token falls within a validity period.

The following further describes an indirect communication scenario with reference to the foregoing CCA and access token verification processes.

Scenario 1: Indirect Procedure without Delegated Discovery (Mode C)

Figure 4:
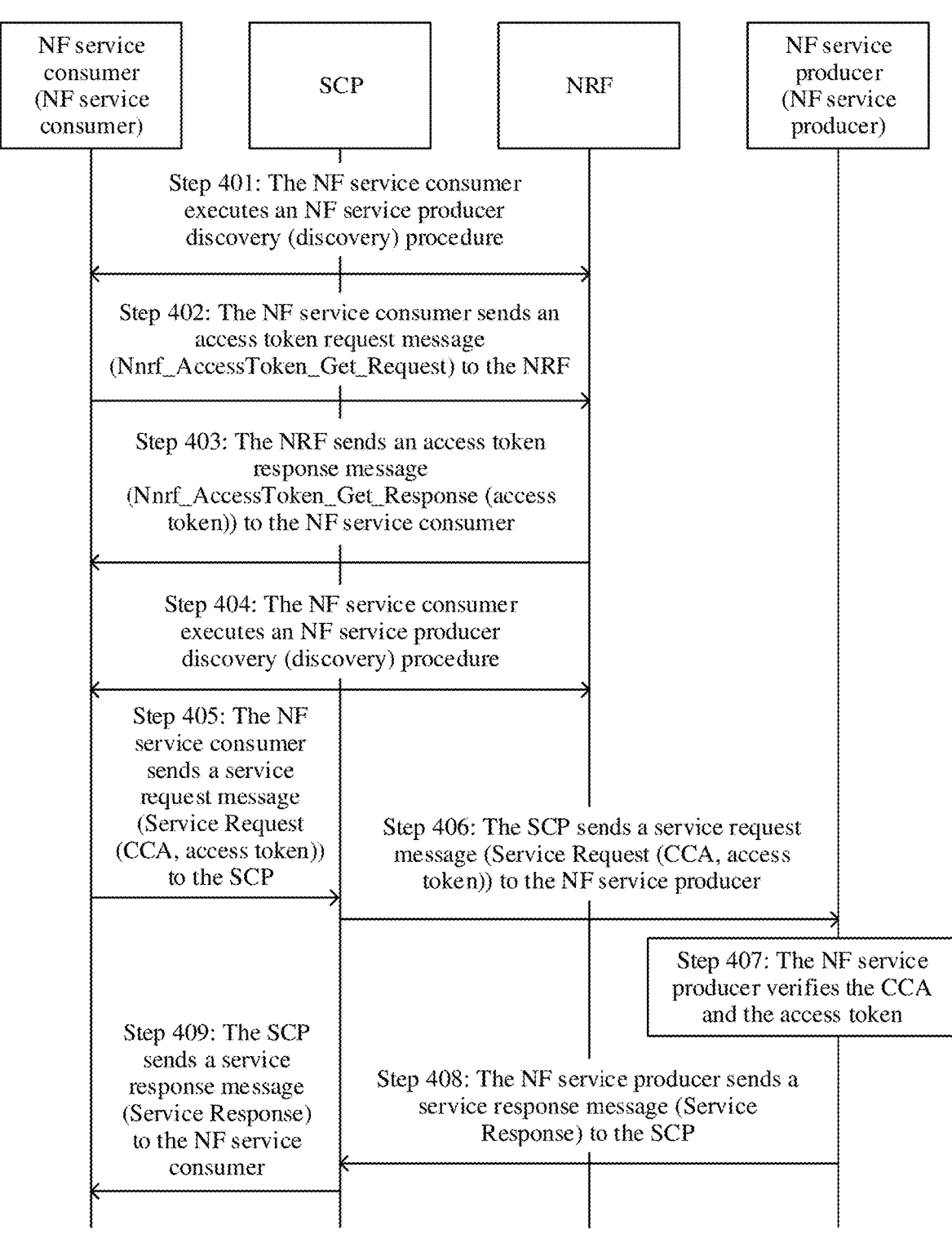
FIG. 4 is a schematic diagram of direct interaction between an NF service consumer and an NRF in an indirect communication mode, namely, a mode C according to an embodiment of this application.

An NF service consumer directly interacts with an NRF, as shown in FIG. 4.

Step 401: The NF service consumer determines that there is no information about an available NF service producer, and the NF service consumer initiates an NF service producer discovery (discovery) procedure.

The discovery procedure is used to discover the available NF service producer.

For example, if an access token of a type B is requested in step 402 and step 403, the discovery procedure needs to be initiated before step 402, and an identifier of a specific NF service producer instance or an identifier of an NF service producer service instance needs to be determined.

For example, if an access token of a type A is requested in step 402 and step 403, an NF service producer discovery procedure may be initiated before step 402 and step 403 (that is, step 401), or an NF service producer discovery procedure may be initiated after step 402 and step 403 (that is, step 404).

It may be understood that the NF service consumer needs to initiate only one NF service producer discovery procedure.

Step 402: The NF service consumer sends an access token request message (for example, Nnrf_AccessToken_Get_Request) to the NRF. It can be learned from the foregoing content that there are two types of access tokens. For different types of access tokens, specific content included in access token request messages is different. For details, refer to the foregoing related description of the access token.

Step 403: The NRF sends an access token response message (for example, Nnrf_AccessToken_Get_Response) to the NF service consumer, where the access token response message includes an access token generated by the NRF.

Specifically, the NRF receives the access token request message from the NF service consumer, and the NRF performs authorization check, to be specific, verifies whether the NF service consumer is authorized to obtain a requested service. If the authorization succeeds, the NRF generates the access token and performs integrity protection on the access token.

Step 404: The NF service consumer determines that there is no information about an available producer (that is, step 401 is not performed), and the NF service consumer initiates a producer discovery procedure.

Step 404 is an optional step, and only one of step 401 and step 404 may be performed.

Step 405: The NF service consumer sends a service request message (for example, a Service Request) to an SCP, where the service request message includes an access token and a CCA.

The CCA is used by the NF service producer to authenticate the NF service consumer. Specifically, claims in the CCA include an NF instance ID of the NF service consumer, a timestamp, expiration time, and an NF type of an expected audience. According to a definition of the CCA, if a receiver of the service request message is an NF service producer, the NF type of the expected audience is an NF type of the NF service producer. For the CCA, refer to the foregoing related content. Details are not described herein again.

For example, when an AMF requests, through the SCP, an SMF to establish a session, the AMF sends a session establishment request message to the SCP, where the session establishment request message includes an access token and a CCA. In this case, the CCA includes an NF instance ID of the AMF, a timestamp, and expiration time, and the NF type of the expected audience is the SMF.

Step 406: The SCP sends a service request message to the NF service producer.

For example, the SCP performs application programming interface (Application Programming interface, API) modification, and sends the received service request message to the NF service producer.

If the service request message includes the identifier of the specific NF service producer instance or the identifier of the NF service producer service instance, the SCP sends the service request message to the specific NF service producer instance or the NF service producer service instance. If the service request message includes an NF set ID, the SCP may select an NF instance from the specific NF service producer instance and the NF service producer service instance and send the service request message to the NF instance.

Step 407: The NF service producer receives the service request message from the SCP. The NF service producer verifies the CCA and the access token.

The NF service producer performs integrity verification on the access token. If the integrity verification succeeds, the NF service producer further verifies claims in the access token. For details, refer to related content of verification on the claims in the access token. The NF service producer further needs to verify the NF service consumer based on the CCA. For a specific process of verifying the CCA, refer to the foregoing related description of CCA verification.

Step 408: If the NF service producer determines that the verification on the access token and the CCA succeeds, the NF service producer sends a service response message (for example, a Service Response) to the SCP.

Step 409: The SCP sends a service response message to the NF service consumer.

For example, the SCP receives the service response message from the NF service producer, performs API modification, and sends a service response message to the NF service consumer.

Figure 5:
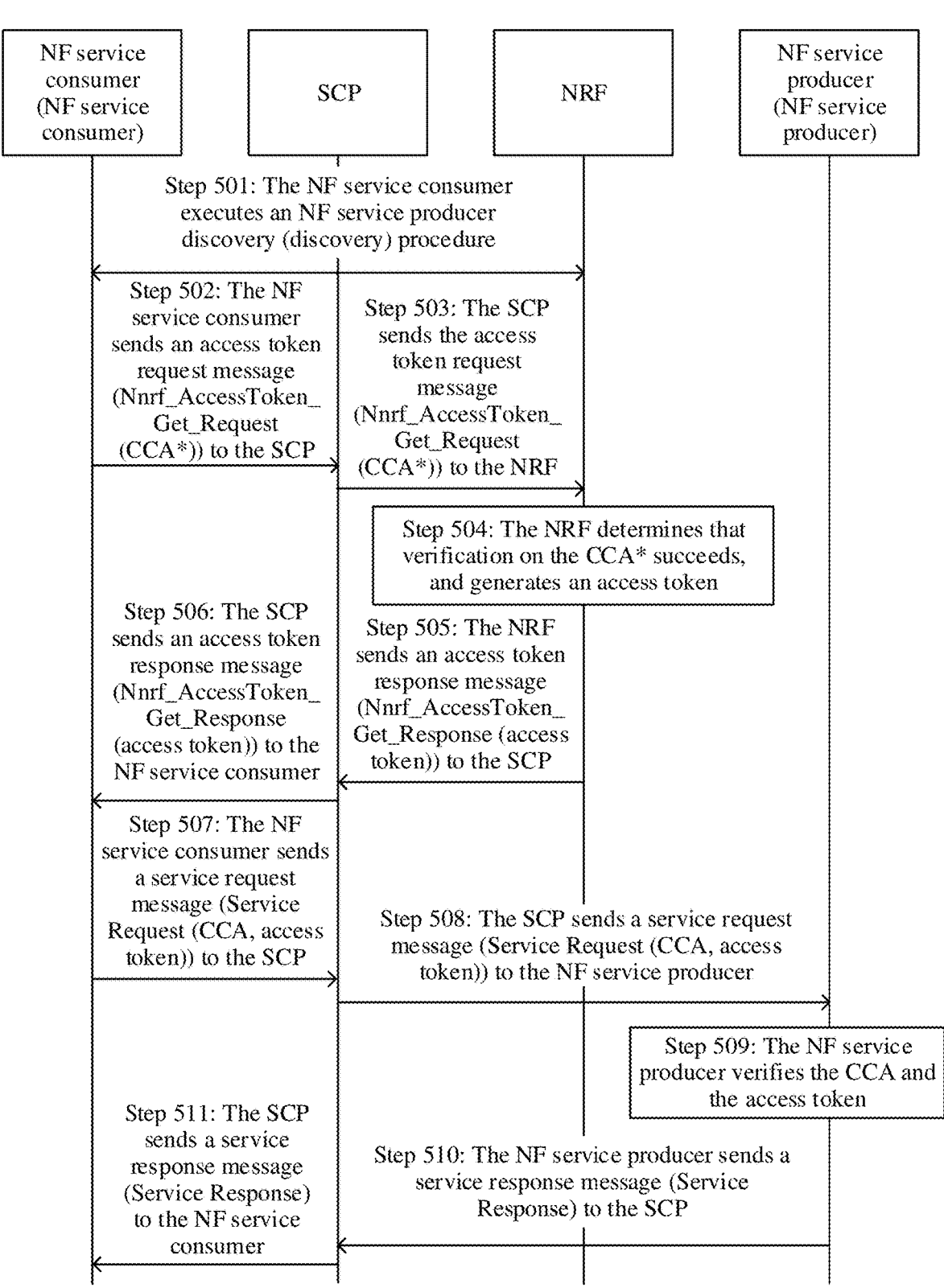
FIG. 5 is a schematic diagram of interaction between an NF service consumer and an NRF through an SCP in an indirect communication mode, namely, a mode C according to an embodiment of this application.

Scenario 2: Indirect Procedure without Delegated Discovery (Mode C): An NF Service Consumer Interacts with an NRF Through an SCP, as Shown in FIG. 5.

Step 501: An NF service consumer determines that there is no information about an available NF service producer, and the NF service consumer initiates an NF service producer discovery procedure.

The discovery procedure is used to discover the available NF service producer.

For example, if an access token of a type B is requested in step 502 and step 503, the discovery procedure needs to be initiated before step 502, and an identifier of a specific NF service producer instance or an identifier of an NF service producer service instance needs to be determined.

For example, if an access token of a type A is requested in step 502 and step 503, an NF service producer discovery procedure may be initiated before step 502 and step 503 (that is, step 501), or an NF service producer discovery procedure may be initiated after step 502 and step 503 (that is, step 504).

It may be understood that the NF service producer needs to initiate only one discovery procedure.

Step 502: The NF service consumer sends an access token request message to the SCP.

A specific parameter included in the access token request message may be determined based on a type of a requested access token. For details, refer to related descriptions of the access token. In addition, the access token request message may further include a CCA*, and the CCA* is used by the NRF to authenticate the NF service consumer. Specifically, claims in the CCA* include an NF instance ID of the NF service consumer, a timestamp, expiration time, and an NF type of an expected audience. According to a definition of the CCA, if a receiver of the access token request message is an NF service producer, the NF type of the expected audience is an NFR.

Step 503: The SCP sends, to the NRF, the access token request message received in step 502.

Step 504: The NRF determines that verification on the CCA* succeeds, and generates an access token.

Specifically, the NRF authenticates the NF service consumer based on the CCA*. If the authentication succeeds, the NRF further performs authorization check. If the authorization succeeds, the NRF generates the access token and performs integrity protection on the access token.

Step 505: The NRF sends an access token response message to the SCP, where the access token response message includes the access token generated by the NRF.

Step 506: The SCP sends the access token response message to the NF service consumer, where the access token response message includes the access token generated by the NRF.

For specific content of step 507 to step 511, refer to step 505 to step 509 in the embodiment shown in FIG. 5.

Figure 6:
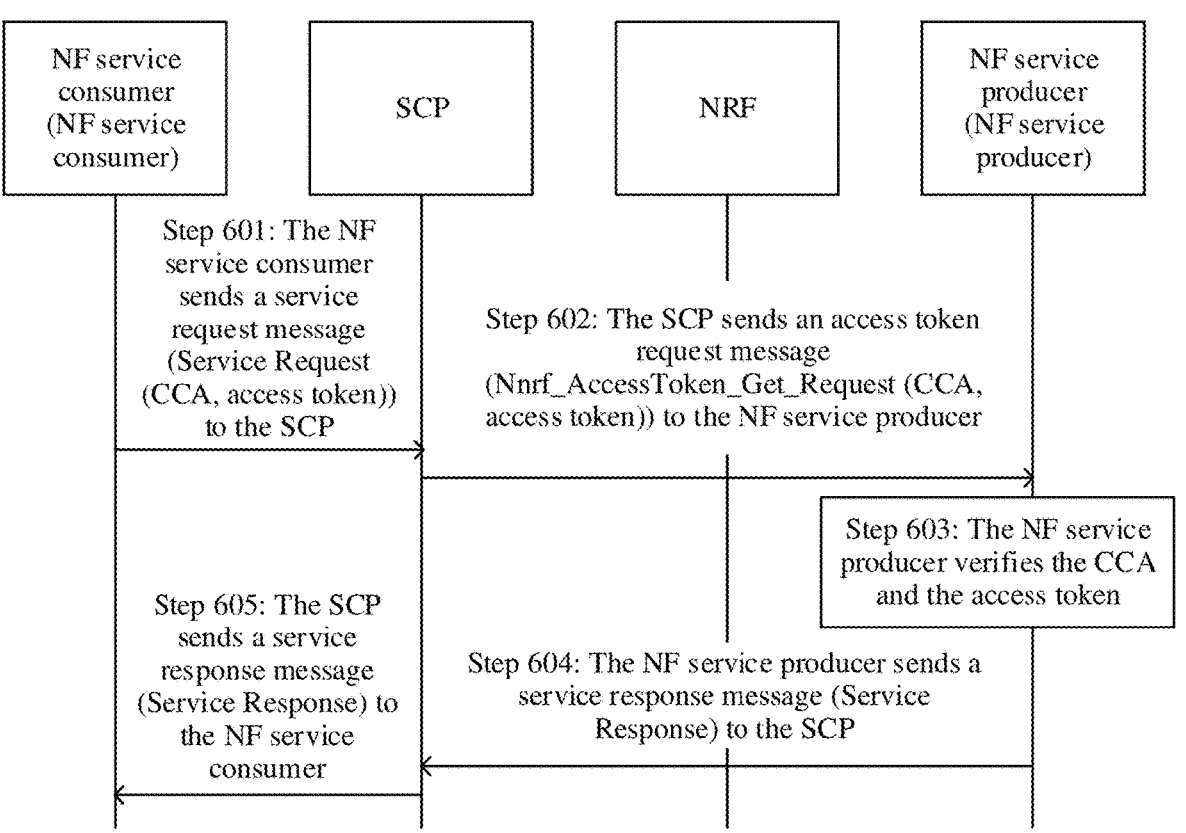
FIG. 6 is a schematic diagram 1 of interaction between an NF service consumer and an NRF through an SCP in an indirect communication mode, namely, a mode D according to an embodiment of this application.

Scenario 3: Communication Authorization in a Delegated Discovery Procedure (Mode D): An NF Service Consumer Interacts with an NRF Through an SCP, as Shown in FIG. 6.

Step 601: The NF service consumer sends a service request message to the SCP. The service request message includes a CCA and an access token. The CCA and the access token do not expire. Claims in the CCA include an NF instance ID of the NF service consumer, a timestamp, expiration time, and an NF type of an expected audience. According to a definition of the CCA, if a receiver of the service request message is an NF service producer, the NF type of the expected audience is an NF type of the NF service producer.

Step 602: The SCP sends the service request message to the NF service producer, where the service request message includes the CCA and the access token.

For specific content of step 603 to step 605, refer to step 509 to step 511 in the embodiment shown in FIG. 5.

Figure 7:
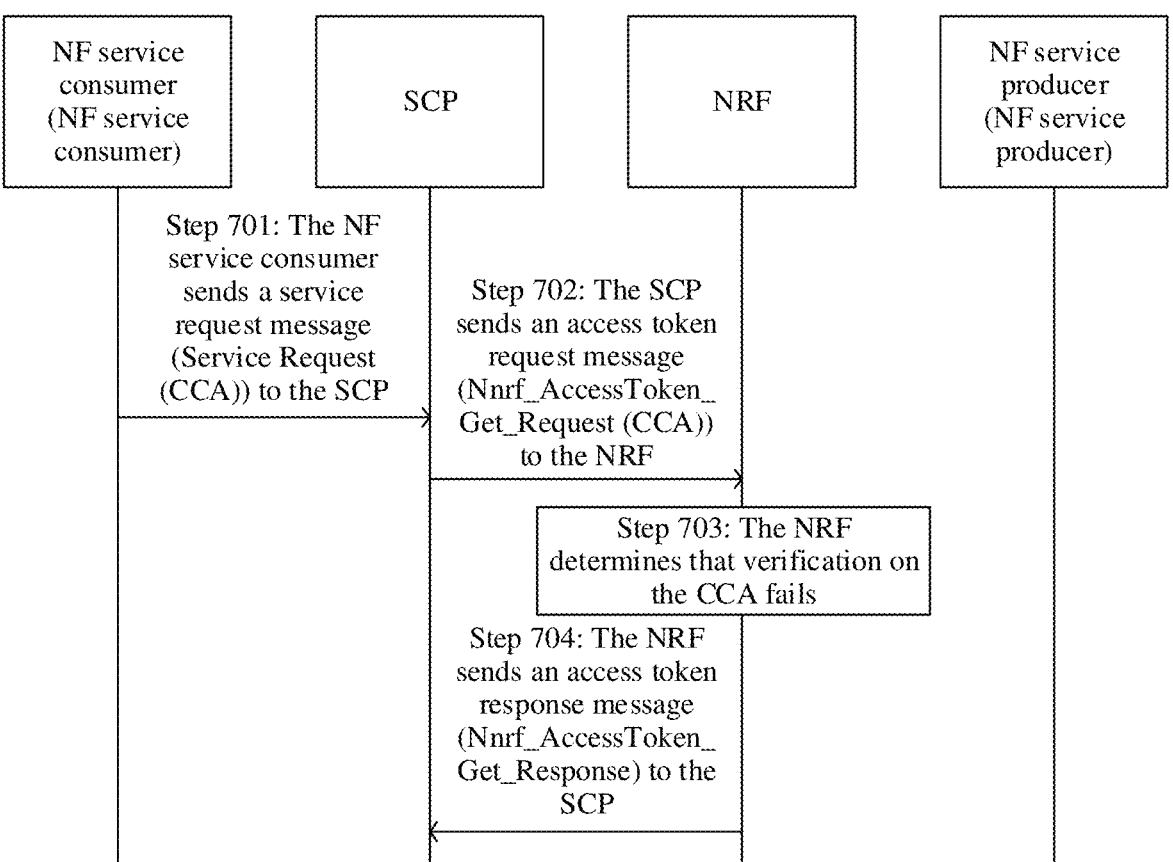
FIG. 7 is a schematic diagram 2 of interaction between an NF service consumer and an NRF through an SCP in an indirect communication mode, namely, a mode D according to an embodiment of this application.

Scenario 4: Communication Authorization in a Delegated Discovery Procedure (Mode D): An NF Service Consumer Interacts with an NRF Through an SCP, as Shown in FIG. 7.

Step 701: The NF service consumer sends a service request message to the SCP, where the service request message includes a CCA. Claims in the CCA include an NF instance ID of the NF service consumer, a timestamp, expiration time, and an NF type of an expected audience. If a receiver of the service request message is an NF service producer, the NF type of the expected audience is an NF type of the NF service producer.

Step 702: The SCP sends an access token request message to the NRF.

For example, the SCP may determine, based on the service request message, whether to initiate an access token request procedure to the NRF. For example, if the SCP determines that the received service request message does not include an access token and there is no access token corresponding to the service request message locally, the SCP sends the access token request message to the NRF.

The access token request message includes the CCA in step 701.

Step 703: The NRF determines that CCA verification fails.

The NF type of the expected audience in the CCA is the NF type of the NF service producer. Because the NF type in the CCA is inconsistent with an NF type of the NRF, the NRF determines that the CCA verification fails.

Step 704: The NRF sends an access token response message to the SCP, where the access token response message does not include an access token.

Therefore, the SCP fails to obtain the access token. As a result, the NF service consumer fails to request a service from the NF service producer.

In the indirect communication scenario based on the mode D, embodiments of this application provide the following embodiments, to resolve a problem that when an NF service consumer directly sends a service request message to an SCP to trigger the SCP to request another service, because a receiver (a producer of the another service) of a service request fails to authenticate the NF service consumer, the SCP fails to request the another service, and consequently the NF service consumer fails to request a service.

The following first describes technical concepts in embodiments of this application.

1. Embodiments of this application relate to at least two network function types. A first network function type is different from a second network function type. A network function type is a general name of network functions that provide a group of function behavior or a group of services in a network. For example, a network function type in a 5G network may include an AMF type, an SMF type, or the like. A function network element of the AMF type may provide a service related to access and mobility management, and a function network element of the SMF type may provide a service related to PDU session management.

2. Embodiments of this application further relate to at least two services. A first service is different from a second service, and the first service is associated with the second service.

For example, the first service may be a request for session establishment, and the second service may be a request for an access token corresponding to the first service. Alternatively, the first service may be a request for session establishment, and the second service may be a request for information about a network element providing the first service.

For example, in an indirect communication scenario based on a mode D, when an AMF requests an SMF to establish a session, the AMF sends a session establishment request message to an SCP. Before the SCP sends the session establishment request to the SMF, if the SCP needs to first obtain an access token (which is denoted as an access token 1 below) corresponding to the session establishment request from an NRF, after the SCP obtains the access token 1 from the NRF, the SCP sends the session establishment request message to the SMF. In this case, the session establishment request message includes the access token 1. The first service herein is the request for session establishment, the second service is the request for the access token corresponding to the first service, and the SCP requests the access token corresponding to the first service from the NRF before the SCP sends the session establishment request message to the SMF, that is, the SCP requests the second service before requesting the first service. In addition, in some scenarios, the SCP may request the second service after requesting the first service. This is not limited in embodiments of this application. Unless otherwise specified, the following merely uses an example in which the SCP requests the second service before requesting the first service for description.

An association between the first service and the second service may be that, for example, requesting the first service may trigger requesting the second service.

In an example, the second service is used to provide an access token corresponding to the first service, and the access token corresponding to the first service represents/indicates that a service consumer network element has permission to obtain the first service. Because the service consumer network element requests the first service, and the access token, corresponding to the first service, provided by the second service represents/indicates that the service consumer network element has the permission to obtain the first service, the first service is associated with the second service. For example, that an NF service consumer requests the first service may trigger the SCP to request the access token corresponding to the first service. The access token corresponding to the first service represents/indicates that the NF service consumer has permission to obtain the first service or permission to access the first service.

In another example, the second service is used to provide information about a service producer network element. Because the service consumer network element requests the first service, and the service producer network element indicated by the information about the service producer network element provided by the second service may provide the first service, the first service is associated with the second service. For example, that an NF service consumer requests the first service may trigger the SCP to request information about an NF service producer. The NF service producer provides the first service for the NF service consumer.

In addition, requesting the first service may further trigger requesting a plurality of second services. For example, that the NF service consumer requests the first service may trigger the SCP to request the information about the NF service producer, and trigger the SCP to request the access token corresponding to the first service. The NF service producer provides the first service for the NF service consumer, and the access token corresponding to the first service represents/indicates that the service consumer network element has the permission to obtain the first service. Specifically, the SCP may request the access token corresponding to the first service from an NRF 1, and request the information about the NF service producer from the NRF 1. In this case, the NRF 1 provides two second services. Alternatively, the SCP may request the access token corresponding to the first service from an NRF 1, and request the information about the NF service producer from an NRF 2. In this case, the NRF 1 is different from the NRF 2, and the second service provided by the NRF 1 is different from the second service provided by the NRF 2.

It may be understood that the first service and the second service are merely examples, and are not intended to limit embodiments of this application.

The following merely uses an example in which a network element providing the second service is a network repository function network element for description. The network element providing the second service may alternatively be network element of another type. This is not limited in embodiments of this application.

An embodiment of this application provides a communication method. A service consumer network element sends a service request message to a service communication proxy, where the service request message includes a first client credentials assertion, and the first client credentials assertion may include at least two different network function types, so that different network elements can successfully authenticate the service consumer network element based on the first client credentials assertion. The following uses the embodiment shown in FIG. 8 as an example for description.

Step 801: The service consumer network element sends a first service request message to the service communication proxy, where the first service request message is used to request a first service from a service producer network element, and the first service request message includes the first client credentials assertion.

The first client credentials assertion is used to authenticate the service consumer network element. The first client credentials assertion includes a first network function type and a second network function type. The first network function type is a network function type of a network element providing the first service, namely, a network function type of the service producer network element. The second network function type is a network function type of a network element providing a second service. The second service is associated with the first service. The network function type of the network element providing the second service may be a network function type of a network repository function network element.

Compared with an existing CCA, the first client credentials assertion includes two network function types. Therefore, the existing CCA is used only by a receiver of a service request to authenticate the service consumer network element, that is, authenticate an identity of the service consumer network element. In this embodiment of this application, the first client credentials assertion may be used by network elements of two network function types to authenticate the service consumer network element, to be specific, the receiver of the service request and a receiver of a request message triggered by the service request authenticate the identity of the service consumer network element. In addition, the first client credentials assertion further includes one or more of an identifier of the service consumer network element and validity time information of the first client credentials assertion. The validity time information of the first client credentials assertion indicates validity time of the first client credentials assertion. For example, the validity time information of the first client credentials assertion may include a timestamp and expiration time of the first client credentials assertion. The content has a same meaning as a corresponding concept in the existing CCA, and details are not described herein again. For example, if the timestamp indicates a moment A, and the expiration time indicates a moment B, the first client credentials assertion is valid within a time period determined between the moment A and the moment B. Alternatively, the validity time information of the first client credentials assertion may include a timestamp and validity duration of the first client credentials assertion. The timestamp herein has a same meaning as a corresponding concept in the existing CCA, and the validity duration may be a time period after the timestamp. For example, if the timestamp indicates a moment A, and the validity duration indicates a time period C (for example, 5 minutes), the first client credentials assertion is valid within the time period C after the moment A.

The validity time information of the first client credentials assertion is associated with first duration, and the first duration is determined based on a transmission delay between the service consumer network element and the service communication proxy, a transmission delay between the service communication proxy and the network element providing the second service, and a transmission delay between the service communication proxy and the service producer network element (namely, the network element providing the first service).

For example, the transmission delay between the service consumer network element and the service communication proxy is denoted as $T_1$, the transmission delay between the service communication proxy and the network element providing the second service is denoted as $T_2$, and the transmission delay between the service communication proxy and the service producer network element is denoted as $T_3$. The foregoing transmission delay may be an average value of transmission delays between two network elements or may be slightly greater than an average value of transmission delays. If the service communication proxy requests the second service earlier than the first service, the first duration=$T_1+2T_2+T_3$. In this case, the validity duration of the first client credentials assertion may be a sum of the first duration and preset duration. Alternatively, the expiration time of the first client credentials assertion may be determined based on the timestamp, the first duration, and the preset duration. The preset duration herein may be preset or determined through dynamic adjustment. It should be noted that, if the preset duration is set to excessively large duration, validity time of the CCA may be excessively long, and the CCA may be repeatedly used.

The foregoing configuration rule for the validity time information of the first client credentials assertion can ensure, as much as possible, that the first client credentials assertion is not maliciously used by the service communication proxy, to ensure security of a communication process.

It may be understood that, before the service consumer network element sends the first service request message to the service communication proxy, the service consumer network element further needs to determine whether an available first client credentials assertion is locally stored, and if the available client credentials assertion is stored (for example, an unexpired client credentials assertion is stored), the unexpired client credentials assertion is used as the first client credentials assertion. If the available client credentials assertion is not stored (for example, the client credentials assertion expires or no client credentials assertion is stored), the service consumer network element generates the first client credentials assertion. In addition, when there is an expired client credentials assertion, the service consumer network element may delete the expired client credentials assertion. Therefore, the service consumer network element may delete the expired client credentials assertion, to release storage space, and reduce storage load of a system.

The following describes several possible scenarios in which the service consumer network element is triggered to send the first service request message to the service communication proxy.

Scenario 1: When the first service needs to be requested and there is no available access token corresponding to the first service, the service consumer network element sends the first service request message to the service communication proxy.

For example, when the service consumer network element determines that the first service needs to be requested and there is no available access token corresponding to the first service, the service consumer network element sends the first service request message to the service communication proxy.

In some embodiments, that the service consumer network element determines that there is no available access token corresponding to the first service includes: The service consumer network element determines that an access token corresponding to the first service is not stored; or the service consumer network element determines that a stored access token corresponding to the first service expires. Further, when the stored access token corresponding to the first service expires, the service consumer network element may delete the expired access token corresponding to the first service.

For example, an access token may be stored in public storage space of an NF service consumer (for example, the access token is stored in a node-level context). The NF service consumer may receive a service request message of UE, and determine, based on the service request message, that the first service needs to be requested. The NF service consumer obtains related information of the UE (for example, context information of the UE) based on an identifier of the UE. Further, the NF service consumer checks whether the public storage space includes an access token corresponding to the first service. If the access token corresponding to the first service is included and the access token does not expire, the access token is used. If the access token corresponding to the first service is not included, it is determined that there is no available access token. Alternatively, if the access token corresponding to the first service is included but the access token expires, it is determined that there is no available access token. In some embodiments, the NF service consumer deletes the access token. The related information of the UE may be stored in the public storage space of the NF service consumer, or the related information of the UE is obtained by the NF service consumer from another network element based on the identifier of the UE.

It may be understood that, if the service consumer network element determines that there is the available access token corresponding to the first service, the first service request message sent by the service consumer network element to the service communication proxy may not include the second network function type, and include only the first network function type.

Scenario 2: When the first service needs to be requested and requesting of the first service triggers the service communication proxy to request information about the service producer network element, the service consumer network element sends the first service request message to the service communication proxy.

For example, when the service consumer network element determines that the first service needs to be requested and requesting of the first service triggers the service communication proxy to request the information about the service producer network element, the service consumer network element sends the first service request message to the service communication proxy.

When one or more of the following cases occur, the service consumer network element may determine that requesting of the first service triggers the service communication proxy to request the information about the service producer network element. For example, the service consumer network element receives a first message associated with a first terminal device, and the service consumer network element determines, based on the first message, that the first service needs to be requested. Further, the service consumer network element determines, based on one or more of the following cases, requesting of the first service triggers the service communication proxy to request the information of the service producer network element.

Case 1: Context of the First Terminal Device is not Stored.

For example, an NF service consumer may receive a service request message of UE, and determine, based on the service request message, that the first service needs to be requested. The NF service consumer obtains context information of the UE based on an identifier of the UE. If the context information of the UE is not obtained, that is, the UE is new UE, and has not triggered the NF service consumer to request a service from an NF service producer, the NF service consumer determines that requesting of the first service triggers the SCP to request information about the NF service producer. The context information of the UE may be stored in the NF service consumer, or the context information of the UE is obtained by the NF service consumer from another network element based on the identifier of the UE.

Case 2: Context of the First Service is not Stored.

For example, an NF service consumer may receive a service request message of UE, and determine, based on the service request message, that the first service needs to be requested. The NF service consumer obtains context information mation of the UE based on an identifier of the UE. If it is determined, based on the context information of the UE, that the context of the first service is not included, that is, the UE has not triggered the NF service consumer to request the first service from an NF service producer, the NF service consumer determines that requesting of the first service triggers the SCP to request information about the NF service producer. The context information of the UE may be stored in the NF service consumer, or the context information of the UE is obtained by the NF service consumer from another network element based on the identifier of the UE.

Case 3: A First Slice Belongs to the Service Producer Network Element and Context of the First Slice is not Stored.

For example, an NF service consumer may receive a service request message of the UE, and determine, based on the service request message, that the first service needs to be requested and the first service needs to be requested from the service producer network element in the first slice. The NF service consumer obtains context information of the UE based on an identifier of the UE. If it is determined, based on the context information of the UE, that the context of the first slice is not included, that is, the UE has not triggered the NF service consumer to request the first service from an NF service producer in the first slice, the NF service consumer determines that requesting of the first service triggers the SCP to request information about the NF service producer. The context information of the UE may be stored in the NF service consumer, or the context information of the UE is obtained by the NF service consumer from another network element based on the identifier of the UE.

Case 4: The Service Consumer Network Element Communicates with the Service Communication Proxy for the First Time.

It may be understood that the service consumer network element may request a service from the service producer network element through a plurality of service communication proxies. If the service consumer network element determines to send the first service request message to a new service communication proxy, that is, the service consumer network element communicates with the service communication proxy for the first time, the service consumer network element determines that the first service request message triggers the service communication proxy to request the second service.

In addition, the NF service consumer receives a service request response message, where the message includes a binding indication, and the binding indication is used in a subsequent related service message. In this scenario, when the NF service consumer requests the first service, the first service request message carries binding information, and the binding information may be used by the SCP to route the first service request message to a specific NF service producer. In this case, the SCP does not need to initiate an NF service producer discovery procedure.

Scenario 3: When the first service needs to be requested and the service consumer network element communicates with the service communication proxy in an indirect communication mode, namely, a mode D, the service consumer network element sends the first service request message to the service communication proxy.

For example, it may be agreed on in a standard protocol or configured based on preconfiguration information that, when the service consumer network element communicates with the service communication proxy in the mode D, the first service request message always carries the client credentials assertion including the first network function type and the second network function type.

Scenario 4: Before the service consumer network element sends the first service request message to the service communication proxy, the service consumer network element obtains indication information, and the service consumer network element sends the first service request message to the service communication proxy based on the indication information.

Figure 8:
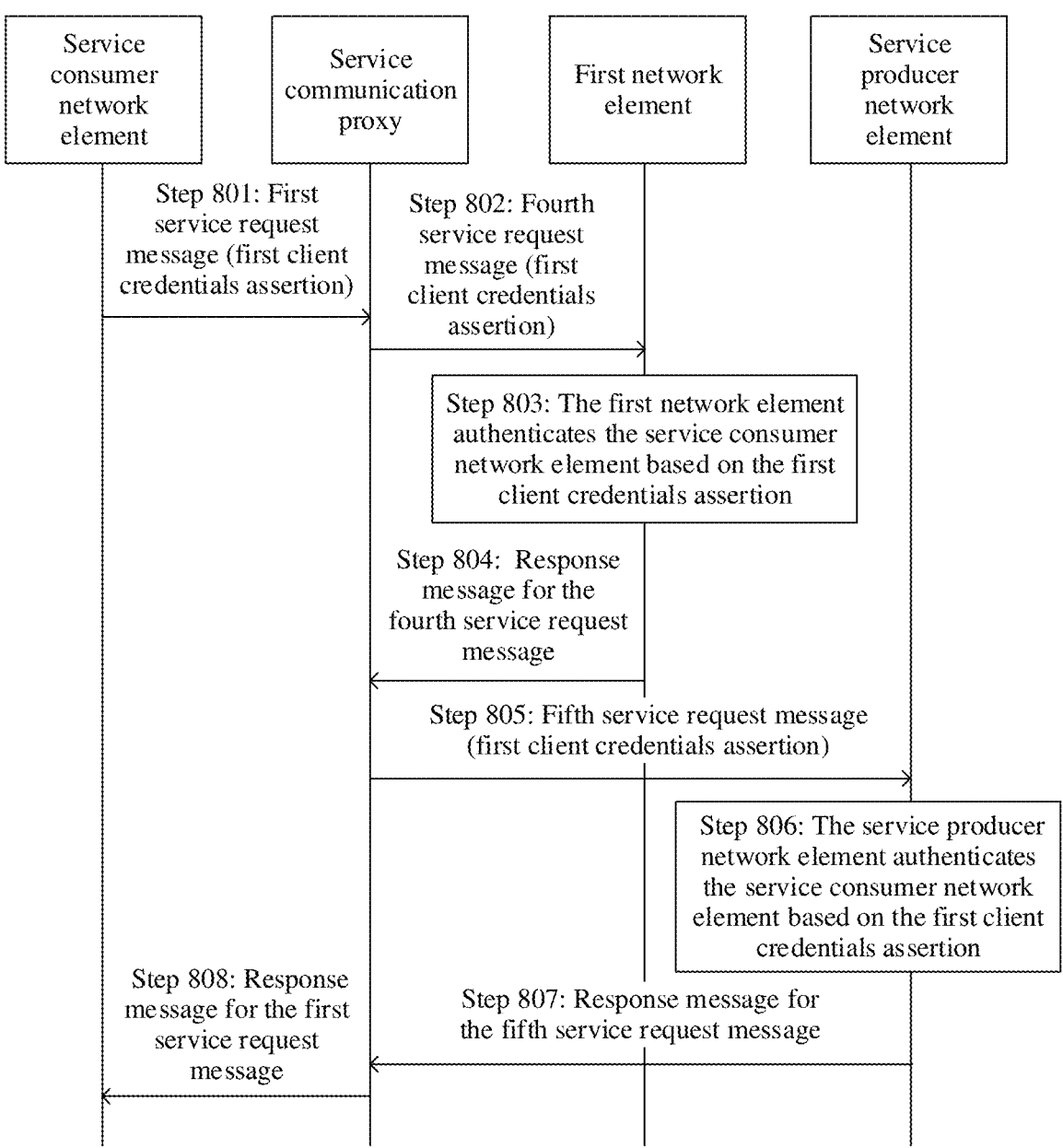
FIG. 8 is an overview flowchart 1 of a communication method according to an embodiment of this application.
Figure 9:
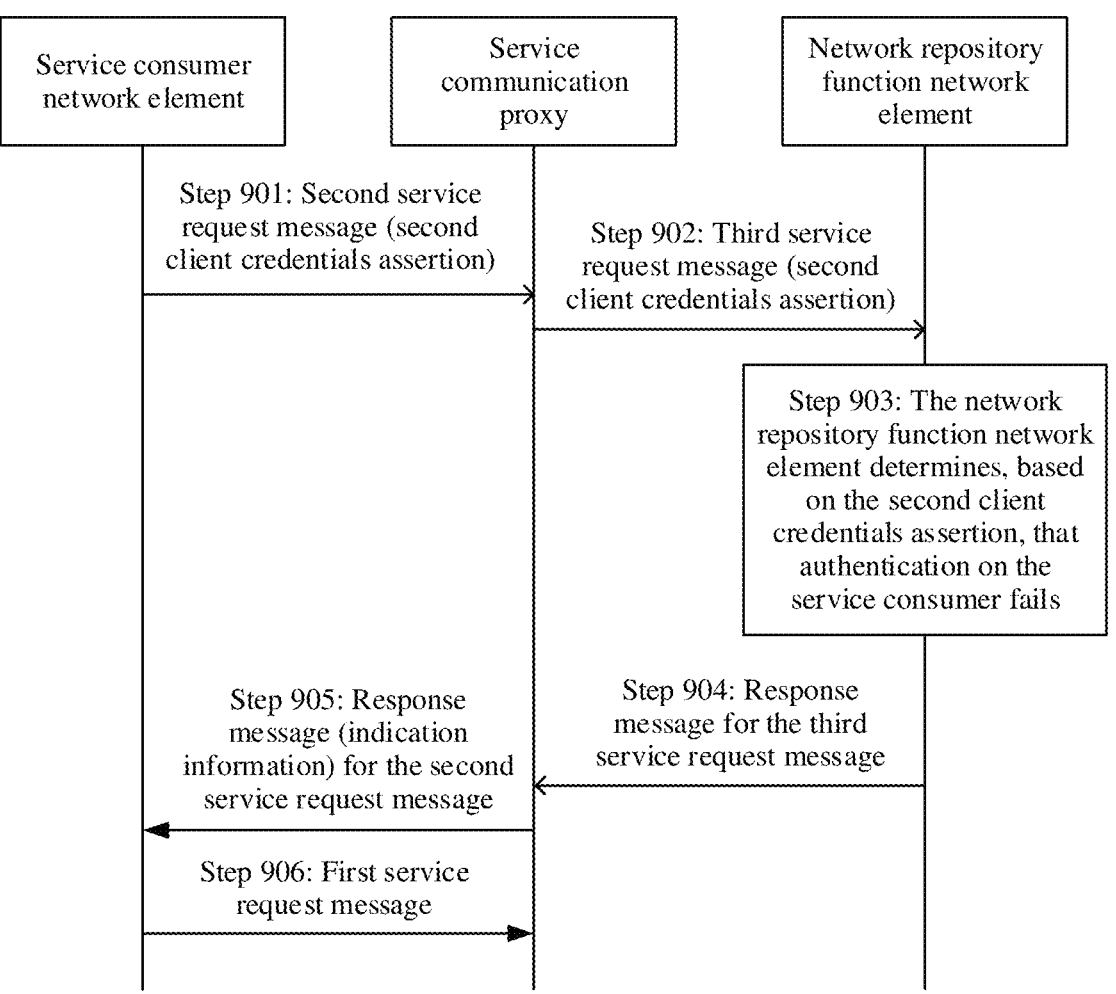
FIG. 9 shows a specific process in which a service consumer network element sends a first service request message to a service communication proxy based on indication information according to an embodiment of this application.

As shown in FIG. 9, the following describes a specific process in which the service consumer network element sends the first service request message to the service communication proxy based on the indication information in the scenario 4 in step 801 in FIG. 8.

Step 901: Before the service consumer network element sends the first service request message to the service communication proxy, the service consumer network element sends a second service request message to the service communication proxy, where the second service request message is used to request the first service, the second service request message includes a second client credentials assertion, the second client credentials assertion includes the first network function type, and the second client credentials assertion is used by the service producer network element to authenticate the service consumer network element.

It should be noted that, in this case, the second client credentials assertion does not include the second network function type.

Step 902: The service communication proxy sends a third service request message to the network repository function network element, where the third service request message is used to request the second service, and the third service request message includes a second client credentials assertion. The network repository function network element is configured to provide the second service.

That the service communication proxy determines that requesting of the first service triggers requesting of the second service may include but is not limited to the following scenarios:

Scenario A: When an available access token corresponding to the first service is not stored and the second service request message does not include an access token corresponding to the first service, the service communication proxy sends the third service request message to the network repository function network element, where the third service request message is used to request the access token corresponding to the first service. The service communication proxy determines that the available access token corresponding to the first service is not stored and the second service request message does not include the access token corresponding to the first service, and the service communication proxy sends the third service request message to the network repository function network element.

For example, the service communication proxy may determine, based on the received second service request message, that the access token corresponding to the first service is required. For example, the service communication proxy may determine, based on a type of the service request message or an access scope of a service request, that the access token corresponding to the first service is required. Further, the service communication proxy queries whether the access token corresponding to the first service is stored. If the access token corresponding to the first service is not stored or a stored access token corresponding to the first service expires, and the second service request message does not include the access token, a parameter required for requesting the access token corresponding to the first service, namely, a parameter in the claim, for example, an expected service name or an NF instance ID of a consumer, may be determined based on the type of the service request message. In addition, when the stored access token corresponding to the first service expires, the service communication proxy may delete the expired access token.

Scenario B: When information about an available service producer network element is not stored and the second service request message does not include information about the service producer network element, the service communication proxy sends the third service request message to the network repository function network element, where the third service request message is used to request the information about the service producer network element. The service communication proxy determines that the information about the available service producer network element is not stored and the second service request message does not include the information about the service producer network element; and sends the third service request message to the network repository function network element. For example, the service communication proxy may be determined based on a type of the second service request message and/or indication information in the second service request message.

After the service communication proxy receives the second service request message, the service communication proxy parses the second service request message, to determine who is a receiver of the message and whether the receiver of the message (namely, the service producer network element) needs to be discovered. That the service communication proxy determines whether the service producer network element needs to be discovered is logically similar to that the service consumer network element in direct communication determines whether a service producer needs to be discovered. For example, if a request message received by the SCP is a session establishment request, the SCP determines that the message needs to be forwarded to an SMF, and the SCP determines, based on a parameter in the message, whether SMF instance information meeting a condition exists locally.

Step 903: The network repository function network element determines, based on the second client credentials assertion, that the authentication on the service consumer network element fails.

For example, that the network repository function network element determines, based on the second client credentials assertion, that the authentication on the service consumer network element fails includes: The network repository function network element determines that the first network function type does not match the network function type of the network repository function network element.

Alternatively, that the network repository function network element determines, based on the second client credentials assertion, that the authentication on the service consumer network element fails includes: The network repository function network element verifies that a signature of the second client credentials assertion succeeds, verifies, based on a timestamp included in the second client credentials assertion and/or expiration time of the second client credentials assertion, that the second client credentials assertion does not expire, verifies that an identifier of the service consumer network element in the second client credentials assertion is the same as an identifier of a network element in a certificate for signing the second client credentials assertion, and verifies that the first network function type does not match the network function type of the network repository function network element.

Step 904: When the first network function type does not match the network function type of the network repository function network element, the network repository function network element sends a response message for the third service request message to the service communication proxy. The response message for the third service request message includes a cause value and/or first indication information.

The cause value and/or the first indication information indicates/indicate that the second client credentials assertion does not include the second network function type, indicates/indicate that the first network function type included in the second client credentials assertion does not match the network function type of the network repository function network element, or indicates/indicate that the second client credentials assertion does not include a correct network function type.

In some embodiments, the first indication information may be a third client credentials assertion. The third client credentials assertion includes an identifier of the network repository function network element, a timestamp of the third client credentials assertion, expiration time of the third client credentials assertion, and a network function type of the service consumer network element. In some embodiments, the third client credentials assertion may further include the network function type of the network repository function network element, to indicate the service consumer network element to generate a client credentials assertion including the network function type of the network repository function network element.

It can be learned from step 903 that the network repository function network element fails to authenticate the service consumer network element, the response message for the third service request message may further indicate that a second service request fails.

Step 905: The service communication proxy sends, based on the response message for the third service request message, a response message for the second service request message to the service consumer network element, where the response message for the second service request message includes second indication information.

The second indication information is used to trigger the service consumer network element to send the first service request message (namely, a service request message that carries both the network function type of the service producer network element and the network function type of the network repository function network element) in step 801 of the embodiment in FIG. 8.

In a possible implementation, the second indication information indicates that the second client credentials assertion does not include the network function type of the network repository function network element (namely, the second network function type), indicates that the first network function type included in the second client credentials assertion does not match the network function type of the network repository function network element, or indicates that the second client credentials assertion does not include the correct network function type.

In specific implementation, the second indication information may be the same as the first indication information, or may be information obtained by processing the first indication information by the service communication proxy. This is not limited in embodiments of this application.

In some embodiments, the service communication proxy may further generate the second indication information based on the response message for the third service request message. The second indication information may be used to trigger the service consumer network element to re-initiate a service request message for requesting the first service and carry, when the first service is requested again, a client credentials assertion including the network function type of the network repository function network element and the network function type of the service producer network element (that is, perform step 801).

Step 906: The service consumer network element sends the first service request message to the service communication proxy based on the second indication information.

In some embodiments, when the second indication information includes the third client credentials assertion and the third client credentials assertion includes the network function type of the network repository function network element, the service consumer network element may authenticate the network repository function network element based on the third client credentials assertion. When the authentication on the network repository function network element succeeds, the service consumer network element sends the first service request message to the service communication proxy, and the service consumer network element determines that the second network function type is the network function type of the network repository function network element (the network repository function network element is configured to provide the second service, and the network function type of the network repository function network element is the network function type of the network element providing the second service).

Step 802: The service communication proxy receives the first service request message from the service consumer network element, and the service communication proxy sends a fourth service request message to the network repository function network element, where the fourth service request message is used to request the second service, and the fourth service request message includes the first client credentials assertion.

For the service communication proxy determining that requesting of the first service triggers requesting of the second service, refer to the foregoing step 902. Details are not repeated.

Step 803: The network repository function network element receives the fourth service request message from the service communication proxy, and the network repository function network element authenticates the service consumer network element based on the first client credentials assertion.

If the network repository function network element determines that a network function type the same as the network function type of the network repository function network element exists in the first network function type and the second network function type, the network repository function network element determines that the authentication on the service consumer network element succeeds. The second network function type is the same as the network function type of the network repository function network element.

Specifically, if the network repository function network element verifies that a signature of the first client credentials assertion succeeds, verifies, based on the timestamp and/or the expiration time of the first client credentials assertion included in the first client credentials assertion, that the first client credentials assertion does not expire, verifies that the identifier of the service consumer network element in the first client credentials assertion is the same as an identifier of a network element in a certificate for signing the first client credentials assertion, and verifies that the second network function type in the first network function type and the second network function type matches the network function type of the network repository function network element, the network repository function network element determines that the authentication on the service consumer network element succeeds.

Step 804: When the authentication on the service consumer network element succeeds, the network repository function network element sends a response message for the fourth service request message to the service communication proxy.

For example, if the fourth service request message is used to request the access token corresponding to the first service, after the authentication on the service consumer network element succeeds, the network repository function network element performs authorization check. If it is determined that the authorization succeeds, the network repository function network element generates the access token corresponding to the first service. The network repository function network element sends the response message for the fourth service request message to the service communication proxy. The response message for the fourth service request message includes the access token corresponding to the first service.

For example, if the fourth service request message is used to request the information about the service producer network element, after the authentication on the service consumer network element succeeds, the network repository function network element sends the response message for the fourth service request message to the service communication proxy. The response message for the fourth service request message includes the information about the service producer network element.

Step 805: The service communication proxy receives the response message for the fourth service request message from the network repository function network element, and the service communication proxy sends, based on the response message for the fourth service request message, a fifth service request message to the service producer network element, where the fifth service request message is used to request the first service, and the fifth service request message includes the first client credentials assertion.

It may be understood that the fifth service request message further includes the access token corresponding to the first service.

For example, when the response message for the fourth service request message includes the access token corresponding to the first service, the service communication proxy sends the fifth service request message to the service producer network element, where the fifth service request message is used to request the first service, and the fifth service request message includes the first client credentials assertion and the access token corresponding to the first service.

For example, when the response message for the fourth service request message includes the information about the service producer network element, the service communication proxy sends the fifth service request message to the service producer network element indicated by the information about the service producer network element, where the fifth service request message is used to request the first service, and the fifth service request message includes the first client credentials assertion and the access token corresponding to the first service. In this case, the access token corresponding to the first service may be stored by the service communication proxy or carried in the first request message.

In another implementation, the service communication proxy requests, from the network repository function network element based on the first client credentials assertion, the access token corresponding to the first service and the information about the service producer network element. That is, step 802 to step 804 are performed twice, so that the service communication proxy may initiate a service request message for the second service twice, to respectively request the access token corresponding to the first service and the information about the service producer network element. In this case, the access token corresponding to the first service in step 805 may be obtained by the service communication proxy from the network repository function network element in step 802 to step 804.

Step 806: The service producer network element receives the fifth service request message from the service communication proxy, and the service producer network element authenticates the service consumer network element based on the first client credentials assertion.

It may be understood that the service producer network element further needs to verify the access token corresponding to the first service. For details, refer to the foregoing verification process of the access token. Details are not described herein again.

That the service producer network element authenticates the service consumer network element based on the first client credentials assertion includes: The service producer network element determines whether the network function type of the service producer network element matches one or more of the first network function type and the second network function type.

Specifically, that the service producer network element authenticates the service consumer network element based on the first client credentials assertion further includes: The service producer network element verifies whether the signature of the first client credentials assertion succeeds, verifies, based on the timestamp and/or the expiration time of the first client credentials assertion included in the first client credentials assertion, whether the first client credentials assertion does not expire, and verifies whether the identifier of the service consumer network element in the first client credentials assertion is the same as the identifier of the network element in the certificate for signing the first client credentials assertion.

The network repository function network element and the service producer network element authenticate, based on the first client credentials assertion, the service consumer network element based on a same authentication idea. For corresponding content, refer to each other. Details are not described again.

Step 807: When the authentication on the service consumer network element succeeds, the service producer network element sends a response message for the fifth service request message to the service communication proxy.

For example, when the authentication on the service consumer network element succeeds and the verification on the access token corresponding to the first service succeeds, the response message for the fifth service request message indicates to provide the first service or indicates that a fifth service request succeeds. Alternatively, when the authentication on the service consumer network element fails and/or verification on the access token corresponding to the first service fails, the response message for the fifth service request message indicates that requesting of the first service fails.

Step 808: The service communication proxy sends a response message for the first service request message to the service consumer network element.

When the response message for the fifth service request message indicates to provide the first service or indicates that the fifth service request succeeds, the response message for the first service request message indicates to provide the first service or indicates that a first service request succeeds. Alternatively, when the response message for the fifth service request message indicates that a first service request fails, the response message for the first service request message indicates that the first service request fails. For example, the service communication proxy may modify information in a message header of the response message for the fifth service request message, but content of the response message for the fifth service request message basically remains unchanged. The service communication proxy is mainly used for message routing.

In the foregoing embodiment, when the service consumer network element requests the first service from the service producer network element through the service communication proxy, the service consumer network element carries, in the first service request message sent to the service communication proxy, a client credentials assertion including the first network function type and the second network function type. This can ensure that when the service communication proxy requests the second service, the network element providing the second service successfully authenticates the service consumer network element, further ensures that the service consumer network element requests the first service, and resolves a problem, in an indirect communication scenario, that the service consumer network element fails to request the service because the authentication based on the client credentials assertion fails.

An embodiment of this application provides a communication method. A service consumer network element sends a service request message to a service communication proxy, where the service request message includes a fourth client credentials assertion and a fifth client credentials assertion, and the fourth client credentials assertion and the fifth client credentials assertion respectively include different network function types. The service communication proxy sends corresponding client credentials assertions to different network elements, so that the different network elements can authenticate the service consumer network element based on the different client credentials assertions. The following uses the embodiment shown in FIG. 10 as an example for description.

Figure 10:
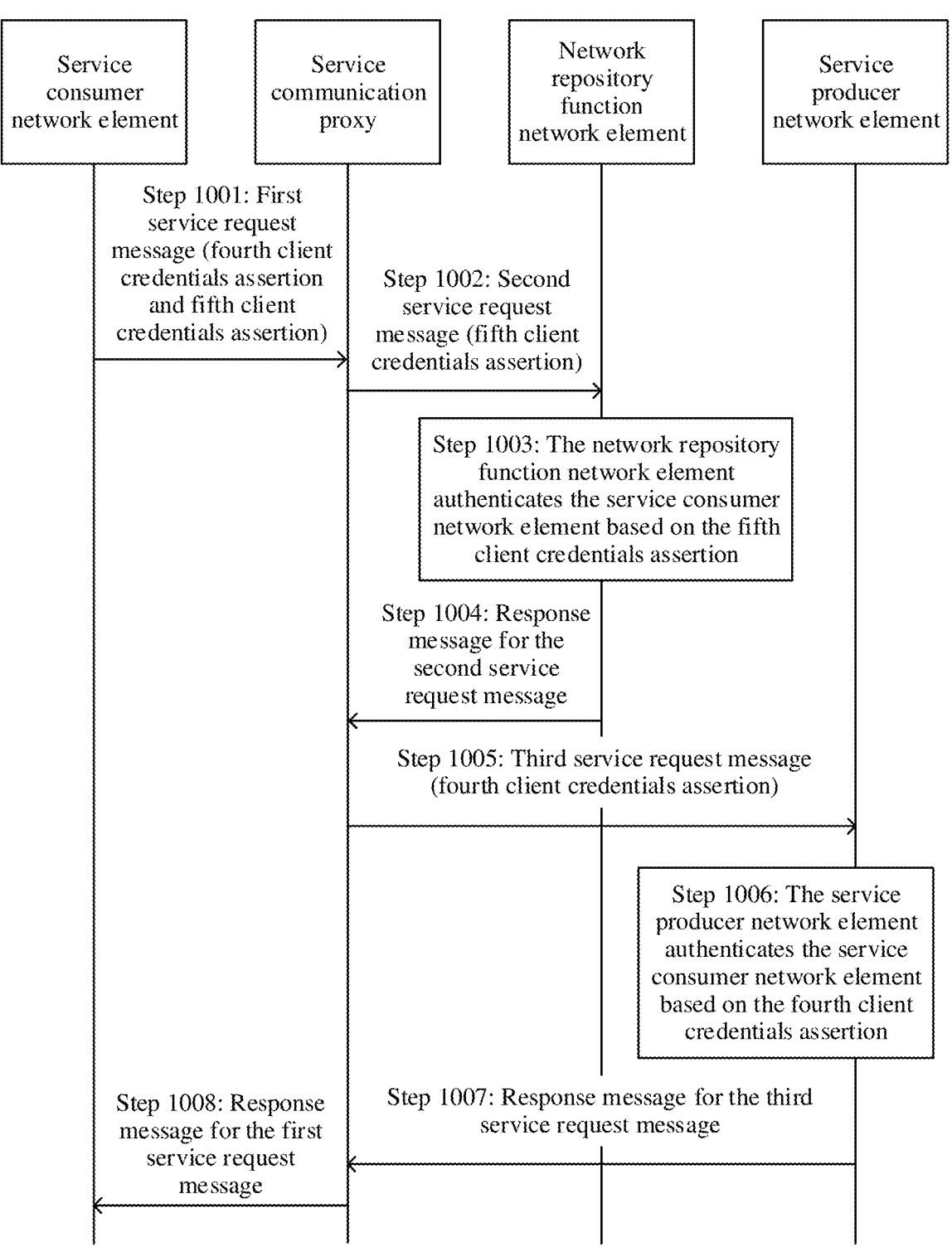
FIG. 10 is an overview flowchart 2 of a communication method according to an embodiment of this application.

This embodiment of this application provides the communication method. As shown in FIG. 10, the method includes the following steps.

Step 1001: The service consumer network element sends a first service request message to the service communication proxy, where the first service request message is used to request a first service, and the first service request message includes the fourth client credentials assertion and the fifth client credentials assertion.

The fourth client credentials assertion is used by a service producer network element to authenticate the service consumer network element, and the fifth client credentials assertion is used by a network element providing a second service, to authenticate the service consumer network element. The fourth client credentials assertion includes a first network function type, and the fifth client credentials assertion includes a second network function type. The first network function type is a network function type of the service producer network element, the second network function type is a network function type of the network element providing the second service, and the second service is associated with the first service.

The fourth client credentials assertion further includes one or more of an identifier of the service consumer network element and validity time information of the fourth client credentials assertion. The validity time information of the fourth client credentials assertion indicates expiration time of the fourth client credentials assertion. For example, the validity time information of the fourth client credentials assertion includes a timestamp and the expiration time of the fourth client credentials assertion. Alternatively, the validity time information of the fourth client credentials assertion may include a timestamp of the fourth client credentials assertion and validity duration of the fourth client credentials assertion. The fifth client credentials assertion further includes one or more of the identifier of the service consumer network element and validity time information of the fifth client credentials assertion. The validity time information of the fifth client credentials assertion indicates validity time of the fifth client credentials assertion. For example, the validity time information of the fifth client credentials assertion includes a timestamp of the fifth client credentials assertion and expiration time of the fifth client credentials assertion. Alternatively, the validity time information of the fifth client credentials assertion may include a timestamp of the fifth client credentials assertion and validity duration of the fifth client credentials assertion.

When the service communication proxy requests the second service earlier than the first service, the validity time of the fifth client credentials assertion is shorter than the validity time of the fourth client credentials assertion. For example, when the service communication proxy requests the second service earlier than the first service, the validity time of the fifth client credentials assertion is associated with first duration. The first duration is determined based on a transmission delay between the service consumer network element and the service communication proxy and a transmission delay between the service communication proxy and the network element providing the second service. For example, the transmission delay between the service consumer network element and the service communication proxy is denoted as $T_1$, and the transmission delay between the service communication proxy and the network element providing the second service is denoted as $T_2$. The foregoing transmission delay may be an average value of transmission delays or may be slightly greater than an average value of transmission delays. First duration=$T_1$+$T_2$. For example, the expiration time of the first client credentials assertion may be determined based on a timestamp, the first duration, and preset duration. The preset duration herein may be determined based on an empirical value.

When the service communication proxy requests the second service later than the first service, the validity time of the fifth client credentials assertion is longer than the validity time of the fourth client credentials assertion.

The foregoing configuration rules for the validity time of the fourth client credentials assertion and the validity time of the fifth client credentials assertion can ensure, as much as possible, that the fourth client credentials assertion and the fifth client credentials assertion are not maliciously used by the service communication proxy, to ensure security of a communication process.

It may be understood that before the service consumer network element sends the first service request message to the service communication proxy, the service consumer network element further needs to determine whether an available client credentials assertion is locally stored, and if the available client credentials assertion is stored (for example, an unexpired client credentials assertion is stored), the available client credentials assertion is used as the fourth client credentials assertion. If the available client credentials assertion is not stored (for example, a stored client credentials assertion expires or no client credentials assertion is stored), the service consumer network element generates the fourth client credentials assertion. In addition, when there is an expired client credentials assertion, the service consumer network element may delete the expired client credentials assertion. Therefore, the service consumer network element may delete the expired client credentials assertion, to release storage space, and reduce storage load of a system. Similarly, this is applicable to the fifth client credentials assertion. Details are not described herein again.

The network function type of the network element providing the second service may be a network function type of a network repository function network element.

For several scenarios in which the service consumer network element is triggered to send the first service request message to the service communication proxy, refer to related content in the embodiment shown in FIG. 8. Details are not described again.

Step 1002: The service communication proxy receives the first service request message from the service consumer network element, and the service communication proxy sends a second service request message to the network repository function network element, where the second service request message is used to request the second service, and the second service request message includes the fifth client credentials assertion.

For the service communication proxy determining that requesting of the first service triggers requesting of the second service, refer to the foregoing step 902. Details are not repeated.

After the service communication proxy determines that requesting of the first service triggers requesting of the second service, the service communication proxy sends the second service request message to the network repository function network element based on the network function type of the network repository function network element, where the second service request message includes the fifth client credentials assertion.

For example, the service communication proxy determines that an access token corresponding to the first service needs to be requested from the network repository function network element, selects the fifth client credentials assertion from the fourth client credentials assertion and the fifth client credentials assertion based on the network function type of the network repository function network element, and adds the fifth client credentials assertion to the second service request message. Alternatively, the service communication proxy determines that information about the service producer network element needs to be requested from the network repository function network element, selects the fifth client credentials assertion from the fourth client credentials assertion and the fifth client credentials assertion based on the network function type of the network repository function network element, and adds the fifth client credentials assertion to the second service request message.

Step 1003: The network repository function network element receives the second service request message from the service communication proxy, and the network repository function network element authenticates the service consumer network element based on the fifth client credentials assertion.

The network repository function network element determines that the authentication on the service consumer network element succeeds. Specifically, if the network repository function network element verifies that a signature of the fifth client credentials assertion succeeds, verifies, based on the timestamp and/or the expiration time of the fifth client credentials assertion included in the fifth client credentials assertion, that the fifth client credentials assertion does not expire, verifies that the identifier of the service consumer network element in the fifth client credentials assertion is the same as an identifier of a network element in a certificate for signing the fifth client credentials assertion, and verifies that the second network function type matches the network function type of the network repository function network element, the network repository function network element determines that the authentication on the service consumer network element succeeds.

Step 1004: The network repository function network element sends a response message for the second service request message to the service communication proxy.

For example, if the second service request message is used to request the access token corresponding to the first service, after the authentication on the service consumer network element succeeds, the network repository function network element performs authorization check. If it is determined that the authorization succeeds, the network repository function network element generates the access token corresponding to the first service. The network repository function network element sends the response message for the second service request message to the service communication proxy. The response message for the second service request message includes the access token corresponding to the first service.

For example, if the second service request message is used to request the information about the service producer network element, after the authentication on the service consumer network element succeeds, the network repository function network element sends the response message for the second service request message to the service communication proxy. The response message for the second service request message includes the information about the service producer network element.

In some embodiments, when the authentication on the service consumer network element fails, the network repository function network element sends the response message for the second service request message to the service communication proxy, to indicate that requesting of the second service fails.

Step 1005: The service communication proxy receives the response message for the second service request message from the network repository function network element, and the service communication proxy sends, based on the response message for the second service request message, a third service request message to the service producer network element, where the third service request message is used to request the first service, and the third service request message includes the fourth client credentials assertion.

It may be understood that the third service request message further includes the access token corresponding to the first service.

For example, the service communication proxy determines that the service consumer network element requests the first service, selects the fourth client credentials assertion from the fourth client credentials assertion and the fifth client credentials assertion based on the network function type of the service producer network element, and adds the fourth client credentials assertion to the third service request message.

For example, when the response message for the second service request message includes the access token corresponding to the first service, the service communication proxy sends the third service request message to the service producer network element, where the third service request message is used to request the first service, and the third service request message includes the fourth client credentials assertion and the access token corresponding to the first service. Alternatively, when the response message for the second service request message includes the information about the service producer network element, the service communication proxy sends the third service request message to the service producer network element indicated by the information about the service producer network element, where the third service request message is used to request the first service, and the third service request message includes the fourth client credentials assertion and the access token corresponding to the first service. In this case, the access token corresponding to the first service may be stored by the service communication proxy or carried in the first service request message.

Step 1006: The service producer network element receives the third service request message from the service communication proxy, and the service producer network element authenticates the service consumer network element based on the fourth client credentials assertion.

It may be understood that the service producer network element further needs to verify the access token corresponding to the first service. For details, refer to the foregoing verification process of the access token. Details are not described herein again.

The service producer network element determines that the authentication on the service consumer network element succeeds. Specifically, if the service producer network element verifies that a signature of the fourth client credentials assertion succeeds, verifies, based on the timestamp and/or the expiration time of the fourth client credentials assertion included in the fourth client credentials assertion, that the fourth client credentials assertion does not expire, verifies that the identifier of the service consumer network element in the fourth client credentials assertion is the same as an identifier of a network element in a certificate for signing the fourth client credentials assertion, and verifies that the first network function type matches the network function type of the service producer network element, the service producer network element determines that the authentication on the service consumer network element succeeds.

Step 1007: The service producer network element sends a response message for the third service request message to the service communication proxy.

When the authentication on the service consumer network element succeeds and the verification on the access token corresponding to the first service succeeds, the response message for the third service request message indicates to provide the first service or indicates that a third service request succeeds. Alternatively, when the authentication on the service consumer network element fails and/or verification on the access token corresponding to the first service fails, the response message for the third service request message indicates that a first service request fails.

Step 1008: The service communication proxy sends a response message for the first service request message to the service consumer network element.

When the response message for the third service request message indicates to provide the first service or indicates that the third service request succeeds, the response message for the first service request message indicates to provide the first service or indicates that a first service request succeeds. Alternatively, when the response message for the third service request message indicates that the first service request fails, the response message for the first service request message indicates that the first service request fails. For example, the service communication proxy may modify information in a message header of the response message for the third service request message, but content of the response message for the third service request message basically remains unchanged. The service communication proxy is mainly used for message routing.

In the foregoing embodiment, the service consumer network element sends the first service request message to the service communication proxy, where the first service request message includes the fourth client credentials assertion and the fifth client credentials assertion, the fourth client credentials assertion includes the first network function type, and the fifth client credentials assertion includes the second network function type. This can ensure that when the service communication proxy requests the second service, the network element providing the second service successfully authenticates the service consumer network element, and further ensure that the service consumer network element requests the first service.

An embodiment of this application provides a communication method. A service consumer network element sends a service request message to a service communication proxy, where the service request message includes a fourth client credentials assertion and a fifth client credentials assertion, and the fourth client credentials assertion and the fifth client credentials assertion respectively include different network function types. When receiving the fourth client credentials assertion and the fifth client credentials assertion, a network repository function network element (or a service producer network element) determines, based on the fourth client credentials assertion, that authentication on the service consumer network element succeeds, or determines, based on the fifth client credentials assertion, that authentication on the service consumer network element succeeds. It can be determined that the authentication on the service consumer network element succeeds. The following uses the embodiment shown in FIG. 11 as an example for description.

Figure 11:
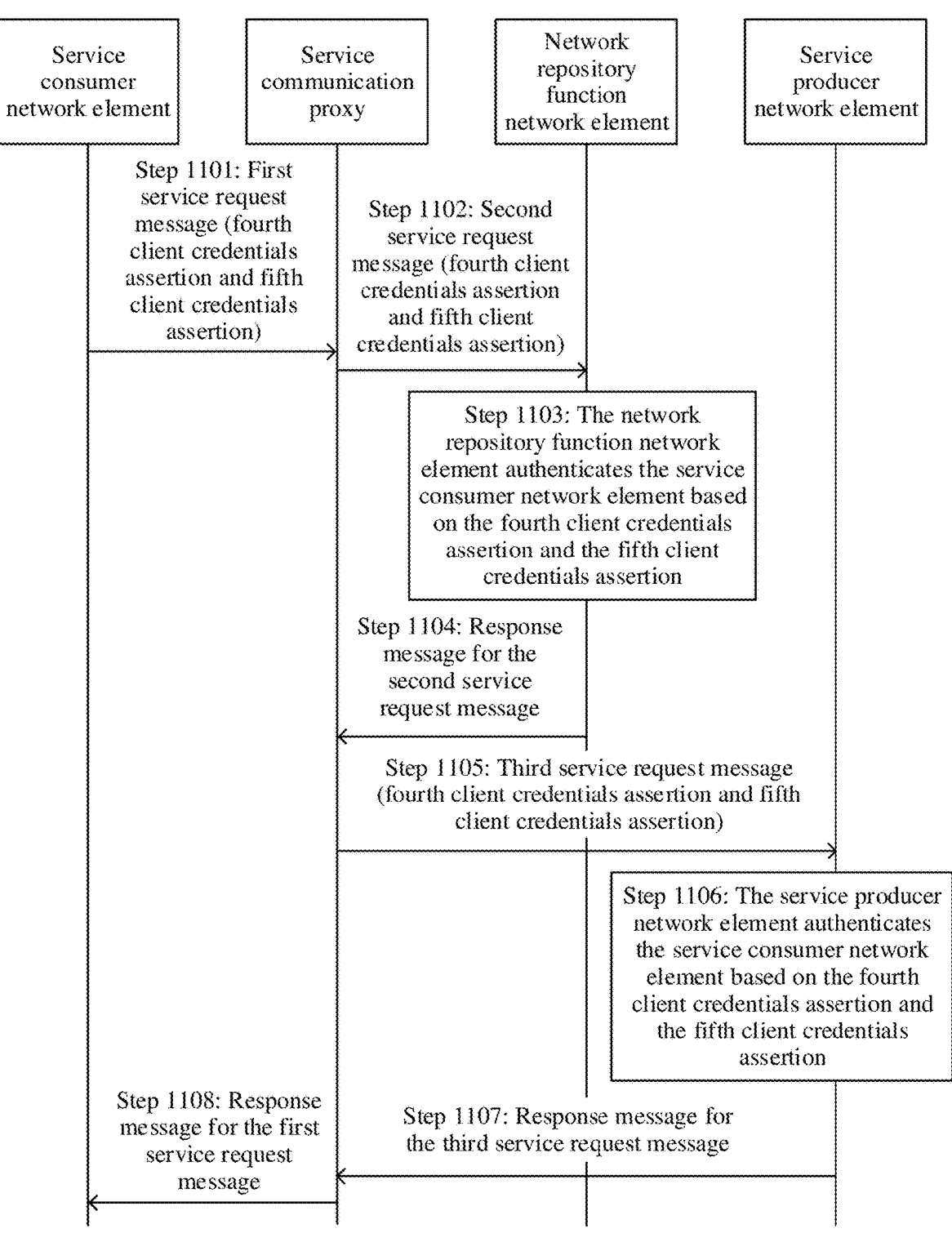
FIG. 11 is an overview flowchart 3 of a communication method according to an embodiment of this application.

This embodiment of this application provides the communication method. As shown in FIG. 11, the method includes the following steps.

Step 1101: The service consumer network element sends a first service request message to the service communication proxy, where the first service request message is used to request a first service, and the first service request message includes the fourth client credentials assertion and the fifth client credentials assertion.

For details, refer to step 1001 in FIG. 10. Details are not described again.

Step 1102: The service communication proxy receives the first service request message from the service consumer network element, and the service communication proxy sends a second service request message to the network repository function network element, where the second service request message is used to request a second service, and the second service request message includes the fourth client credentials assertion and the fifth client credentials assertion.

For the service communication proxy determining that requesting of the first service triggers requesting of the second service, refer to the foregoing step 902. Details are not repeated.

Step 1103: The network repository function network element receives the second service request message from the service communication proxy, and the network repository function network element authenticates the service consumer network element based on the fourth client credentials assertion and the fifth client credentials assertion.

If the network repository function network element successfully authenticates the service consumer network element based on one or more of the fourth client credentials assertion and the fifth client credentials assertion, the network repository function network element determines that the authentication on the service consumer network element succeeds.

The network repository function network element determines, based on the fifth client credentials assertion, that the authentication on the service consumer network element succeeds. Specifically, if the network repository function network element verifies that a signature of the fifth client credentials assertion succeeds, verifies, based on a timestamp and/or expiration time of the fifth client credentials assertion included in the fifth client credentials assertion, that the fifth client credentials assertion does not expire, verifies that an identifier of the service consumer network element in the fifth client credentials assertion is the same as an identifier of a network element in a certificate for signing the fifth client credentials assertion, and verifies that a second network function type matches a network function type of the network repository function network element, the network repository function network element determines that the authentication on the service consumer network element succeeds.

The network repository function network element determines, based on the fourth client credentials assertion, that the authentication on the service consumer network element fails. Specifically, if the network repository function network element verifies that a signature of the fourth client credentials assertion succeeds, verifies, based on a timestamp and/or expiration time of the fourth client credentials assertion included in the fourth client credentials assertion, that the fourth client credentials assertion does not expire, verifies that an identifier of a service consumer network element in the fourth client credentials assertion is the same as an identifier of a network element in a certificate for signing the fourth client credentials assertion, and verifies that a first network function type does not match the network function type of the network repository function network element, the network repository function network element determines that the authentication on the service consumer network element fails.

It can be learned from the foregoing that if the network repository function network element successfully authenticates the service consumer network element based on the fifth client credentials assertion, and fails to authenticate the service consumer network element based on the fourth client credentials assertion, the network repository function network work element determines that the authentication on the service consumer network element succeeds.

Step 1104: When the authentication on the service consumer network element succeeds, the network repository function network element sends a response message for the second service request message to the service communication proxy.

For example, if the second service request message is used to request an access token corresponding to the first service, after the authentication on the service consumer network element succeeds, the network repository function network element performs authorization check. If it is determined that the authorization succeeds, the network repository function network element generates the access token corresponding to the first service. The network repository function network element sends the response message for the second service request message to the service communication proxy. The response message for the second service request message includes the access token corresponding to the first service.

For example, if the second service request message is used to request information about the service producer network element, after the authentication on the service consumer network element succeeds, the network repository function network element sends the response message for the second service request message to the service communication proxy. The response message for the second service request message includes the information about the service producer network element.

Step 1105: The service communication proxy receives the response message for the second service request message from the network repository function network element, and the service communication proxy sends, based on the response message for the second service request message, a third service request message to the service producer network element, where the third service request message is used to request the first service, and the third service request message includes the fourth client credentials assertion and the fifth client credentials assertion.

It may be understood that the third service request message further includes the access token corresponding to the first service.

For example, when the response message for the second service request message includes the access token corresponding to the first service, the service communication proxy sends the third service request message to the service producer network element, where the third service request message is used to request the first service, and the third service request message includes the fourth client credentials assertion and the access token corresponding to the first service.

For example, when the response message for the second service request message includes the information about the service producer network element, the service communication proxy sends the third service request message to the service producer network element indicated by the information about the service producer network element, where the third service request message is used to request the first service, and the third service request message includes the fourth client credentials assertion and the access token corresponding to the first service. In this case, the access token corresponding to the first service may be stored by the service communication proxy or carried in the first service request message.

Step 1106: The service producer network element receives the third service request message from the service communication proxy, and the service producer network element verifies the fourth client credentials assertion and the fifth client credentials assertion.

It may be understood that the service producer network element further needs to verify the access token corresponding to the first service. For details, refer to the foregoing verification process of the access token. Details are not described herein again.

If the service producer network element successfully authenticates the service consumer network element based on one or more of the fourth client credentials assertion and the fifth client credentials assertion, the service producer network element determines that the authentication on the service consumer network element succeeds.

The service producer network element determines, based on the fourth client credentials assertion, that the authentication on the service consumer network element succeeds. Specifically, if the service producer network element verifies that the signature of the fourth client credentials assertion succeeds, verifies, based on the timestamp and/or the expiration time of the fourth client credentials assertion included in the fourth client credentials assertion, that the fourth client credentials assertion does not expire, verifies that the identifier of the service consumer network element in the fourth client credentials assertion is the same as the identifier of the network element in the certificate for signing the fourth client credentials assertion, and verifies that the first network function type matches the network function type of the service producer network element, the service producer network element determines that the authentication on the service consumer network element succeeds.

The service producer network element determines, based on the fifth client credentials assertion, that the authentication on the service consumer network element fails. Specifically, if the service producer network element verifies that the signature of the fifth client credentials assertion succeeds, verifies, based on the timestamp and/or the expiration time of the fifth client credentials assertion included in the fifth client credentials assertion, that the fifth client credentials assertion does not expire, verifies that the identifier of the service consumer network element in the fifth client credentials assertion is the same as the identifier of the network element in the certificate for signing the fifth client credentials assertion, and verifies that the second network function type does not match the network function type of the service producer network element, the service producer network element determines that the authentication on the service consumer network element fails.

It can be learned from the foregoing that if the service producer network element successfully authenticates the service consumer network element based on the fourth client credentials assertion, and fails to authenticate the service consumer network element based on the fifth client credentials assertion, the service producer network element determines that the authentication on the service consumer network element succeeds.

Step 1107: The service producer network element sends a response message for the third service request message to the service communication proxy.

Step 1108: The service communication proxy sends a response message for the first service request message to the service consumer network element.

Step 1107 and step 1108 are respectively the same as step 1007 and step 1008 in the embodiment in FIG. 10. Details are not described again.

Compared with the embodiment in FIG. 10, in the embodiment in FIG. 11, the service communication proxy does not need to carry different CCAs in the service request message based on different objects of requesting services. This simplifies processing logic of the service communication proxy. In addition, after receiving a service request of the service consumer network element, the service communication proxy carries two CCAs regardless of requesting the second service from the network repository function network element or requesting the first service from the service producer network element. Therefore, it can be always ensured that the network repository function network element and the service producer network element successfully authenticate the service consumer network element, and a problem that the service consumer network element fails to request the service is avoided.

An embodiment of this application provides a communication method. When a service communication proxy fails to request a second service, the service communication proxy may actively request a client credentials assertion from a service consumer network element, to ensure that the service communication proxy can obtain the second service, and further ensure that the service consumer network element obtains a first service.

Figure 12:
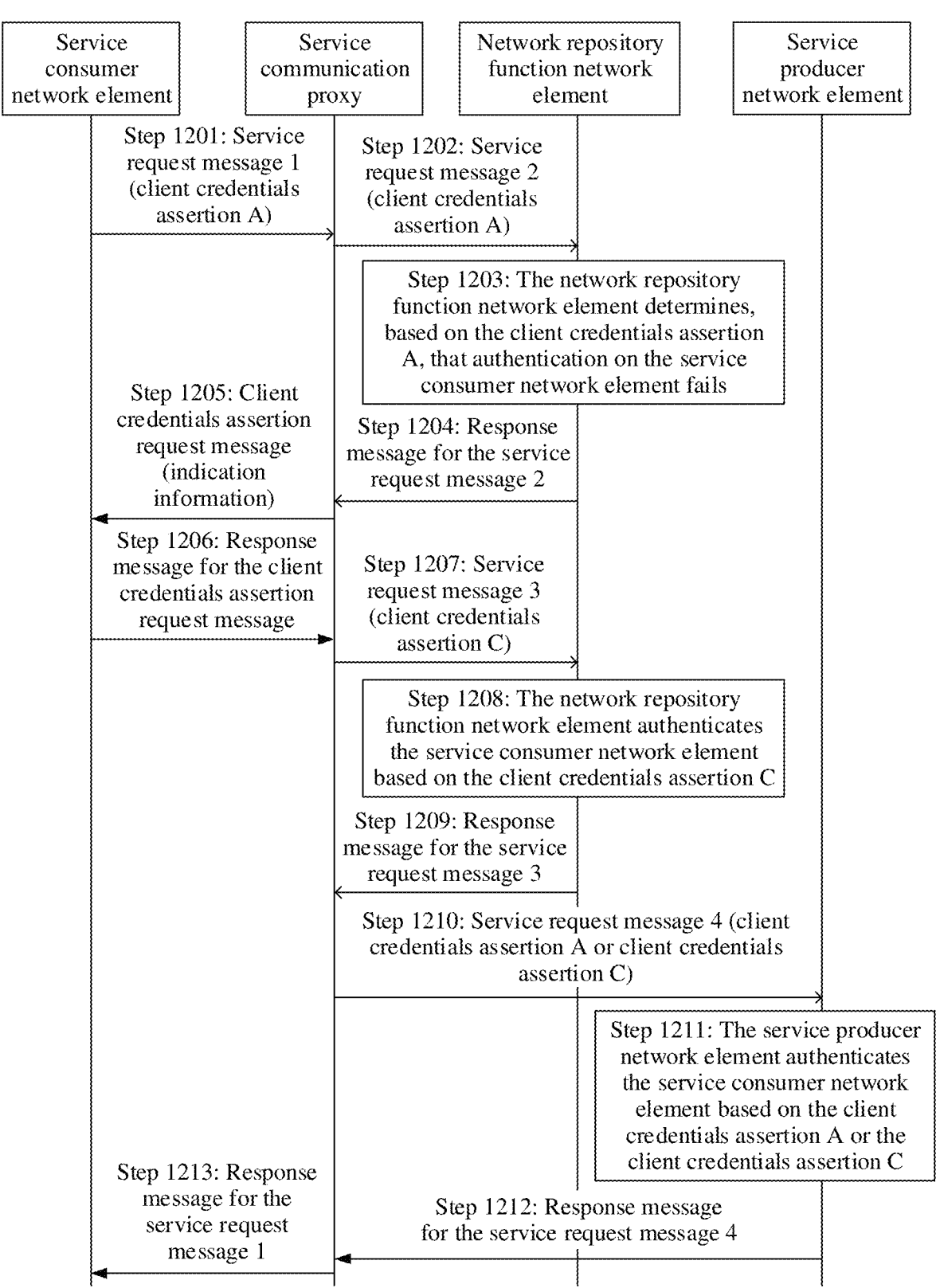
FIG. 12 is an overview flowchart 4 of a communication method according to an embodiment of this application.

This embodiment of this application provides the communication method. As shown in FIG. 12, the method includes the following steps.

Step 1201: The service consumer network element sends a service request message 1 to the service communication proxy, where the service request message 1 is used to request the first service, the service request message 1 includes a client credentials assertion A, the client credentials assertion A includes a first network function type, and the client credentials assertion A is used by a service producer network element to authenticate the service consumer network element. The first network function type is a network function type of the service producer network element.

It should be noted that, in this case, the client credentials assertion A does not include a second network function type. The second network function type is a network function type of a network element providing a second service, and the second service is associated with the first service.

Step 1202: The service communication proxy sends a service request message 2 to a network repository function network element, where the service request message 2 is used to request the second service, and the service request message 2 includes the client credentials assertion A. The network repository function network element is configured to provide the second service.

Step 1203: The network repository function network element determines, based on the client credentials assertion A, that the authentication on the service consumer network element fails.

Step 1204: The network repository function network element sends a response message for the service request message 2 to the service communication proxy.

Step 1201 to step 1204 are respectively the same as step 901 to step 904 in the embodiment in FIG. 9. Details are not described again.

Step 1205: The service communication proxy sends a client credentials assertion request message to the service consumer network element based on the response message for the service request message 2.

The client credentials assertion request message may indicate that a first service request fails. The client credentials assertion request message may further include indication information.

In some embodiments, the indication information may include a client credentials assertion B and/or a cause value. When the indication information includes the client credentials assertion B, the service communication proxy may be prevented from maliciously triggering the service consumer network element to request a client credentials assertion.

In some embodiments, the service communication proxy may further generate the indication information based on the response message for the service request message 2. The indication information may alternatively include no client credentials assertion B or cause value. The indication information may indicate the service consumer network element to request a client credentials assertion and carry, when requesting the client credentials assertion, a client credentials assertion including a network function type of the network repository function network element.

Step 1206: The service consumer network element sends, based on the indication information, a response message for the client credentials assertion request message to the service communication proxy.

In some embodiments, when the indication information includes the client credentials assertion B and the client credentials assertion B includes the network function type of the network repository function network element, the service consumer network element may verify the client credentials assertion B. When the verification on the client credentials assertion B succeeds, the service consumer network element sends the response message for the client credentials assertion request message to the service communication proxy. The response message for the client credentials assertion request message includes a client credentials assertion C. The client credentials assertion C includes the first network function type and the second network function type, or the client credentials assertion C includes the second network function type. The first network function type is the network function type of the service producer network element, and the second network function type is the network function type of the network element providing the second service.

Step 1207: The service communication proxy receives the response message for the client credentials assertion request message from the service consumer network element, and sends a service request message 3 to the network repository function network element, where the service request message 3 is used to request the second service, and the service request message 3 includes the client credentials assertion C.

For example, when an available access token corresponding to the first service is not stored and the first service request message does not include an access token corresponding to the first service, the service communication proxy sends the service request message 3 to the network repository function network element, where the service request message 3 is used to request the access token corresponding to the first service.

Alternatively, when information about the service producer network element is not stored and the first service request message does not include the information about the service producer network element, the service communication proxy sends the service request message 3 to the network repository function network element, where the service request message 3 is used to request the information about the service producer network element.

Step 1208: The network repository function network element receives the service request message 3 from the service communication proxy, and the network repository function network element authenticates the service consumer network element based on the client credentials assertion C.

If the client credentials assertion C includes the first network function type and the second network function type, and the network repository function network element determines that a network function type matching the network function type of the network repository function network element exists in the first network function type and the second network function type, the network repository function network element determines that verification on the client credentials assertion C succeeds. The second network function type matches the network function type of the network repository function network element. Specifically, if the network repository function network element verifies that a signature of the client credentials assertion C succeeds, verifies, based on a timestamp and/or expiration time of the client credentials assertion C included in the client credentials assertion C, that the client credentials assertion C does not expire, verifies that an identifier of the service consumer network element in the client credentials assertion C is the same as an identifier of a network element in a certificate for signing the client credentials assertion C, and verifies that the second network function type in the first network function type and the second network function type matches the network function type of the network repository function network element, the network repository function network element determines that the authentication on the service consumer network element succeeds.

If the client credentials assertion C includes the second network function type, and the network repository function network element verifies that a signature of the client credentials assertion C succeeds, verifies, based on a timestamp and/or expiration time of the client credentials assertion C included in the client credentials assertion C, that the client credentials assertion C does not expire, verifies that an identifier of the service consumer network element in the client credentials assertion C is the same as an identifier of a network element in a certificate for signing the client credentials assertion C, and verifies that the second network function type matches the network function type of the network repository function network element, the network repository function network element determines that the authentication on the service consumer network element succeeds.

Step 1209: When the authentication on the service consumer network element succeeds, the network repository function network element sends a response message for the service request message 3 to the service communication proxy.

For example, if the service request message 3 is used to request the access token corresponding to the first service, after the authentication on the service consumer network element succeeds, the network repository function network element performs authorization check. If it is determined that the authorization succeeds, the network repository function network element generates the access token corresponding to the first service. The network repository function network element sends the response message for the service request message 3 to the service communication proxy. The response message for the service request message 3 includes the access token corresponding to the first service.

For example, if the service request message 3 is used to request the information about the service producer network element, after the authentication on the service consumer network element succeeds, the network repository function network element sends the response message for the service request message 3 to the service communication proxy. The response message for the service request message 3 includes the information about the service producer network element.

Step 1210: The service communication proxy receives the response message for the service request message 3 from the network repository function network element, and the service communication proxy sends a service request message 4 to the service producer network element based on the response message for the service request message 3, where the service request message 4 is used to request the first service, and the service request message 4 includes the client credentials assertion A or the client credentials assertion C.

It may be understood that the service request message 4 further includes the access token corresponding to the first service.

For example, when the response message for the service request message 3 includes the access token corresponding to the first service, the service communication proxy sends the service request message 4 to the service producer network element, where the service request message 4 is used to request the first service, and the service request message 4 includes a first client credentials assertion and the access token corresponding to the first service.

For example, when the response message for the service request message 3 includes the information about the service producer network element, the service communication proxy sends the service request message 4 to the service producer network element indicated by the information about the service producer network element, where the service request message 4 is used to request the first service, and the service request message 4 includes a first client credentials assertion and the access token corresponding to the first service. In this case, the access token corresponding to the first service may be stored by the service communication proxy or carried in the service request message 1.

Step 1211: The service producer network element receives the service request message 4 from the service communication proxy, and the service producer network element authenticates an NF service consumer based on the client credentials assertion A or the client credentials assertion C.

It may be understood that the service producer network element further needs to verify the access token corresponding to the first service. For details, refer to the foregoing verification process of the access token. Details are not described herein again.

If the service request message 4 includes the client credentials assertion C, and the service producer network element determines that a network function type matching the network function type of the service producer network element exists in the first network function type and the second network function type, the service producer network element determines, based on the client credentials assertion C, that the authentication on the service consumer network element succeeds. The first network function type matches the network function type of the service producer network element. Specifically, if the service producer network element verifies that the signature of the client credentials assertion C succeeds, verifies, based on the timestamp and/or the expiration time of the client credentials assertion C included in the client credentials assertion C, that the client credentials assertion C does not expire, verifies that the identifier of the service consumer network element in the client credentials assertion C is the same as the identifier of the network element in the certificate for signing the client credentials assertion C, and verifies that the first network function type in the first network function type and the second network function type matches the network function type of the service producer network element, the service producer network element determines that the authentication on the service consumer network element succeeds.

If the service request message 4 includes the client credentials assertion A, the service producer network element verifies that a signature of the client credentials assertion A succeeds, verifies, based on a timestamp and/or expiration time of the client credentials assertion A included in the client credentials assertion A, that the client credentials assertion A does not expire, verifies that an identifier of the service consumer network element in the client credentials assertion A is the same as an identifier of a network element in a certificate for signing the client credentials assertion A, and verifies that the first network function type matches the network function type of the service producer network element, the service producer network element determines that the authentication on the service consumer network element succeeds.

Step 1212: The service producer network element sends a response message for the service request message 4 to the service communication proxy.

When the authentication on the service consumer network element succeeds and the verification on the access token corresponding to the first service succeeds, the response message for the service request message 4 indicates to provide the first service or indicates that a service request 4 succeeds. Alternatively, when the authentication on the service consumer network element fails and/or the verification on the access token corresponding to the first service fails, the response message for the service request message 4 indicates that the first service request fails.

Step 1213: The service communication proxy sends a response message for the service request message 1 to the service consumer network element.

When the response message for the service request message 4 indicates to provide the first service or indicates that the service request 4 succeeds, the response message for the service request message 1 indicates to provide the first service or indicates that a service request 1 succeeds. Alternatively, when the response message for the service request message 4 indicates that the first service request fails, the response message for the service request message 1 indicates that the first service request fails.

In the foregoing embodiment, the service communication proxy sends the client credentials assertion request message to the service consumer network element, to ensure that when the service communication proxy requests the second service, the network element providing the second service successfully authenticates the service consumer network element, and further ensure that the service consumer network element requests the first service.

The embodiments shown in FIG. 8 to FIG. 12 are described below by using examples with reference to Embodiments 1 to 8.

Figure 13:
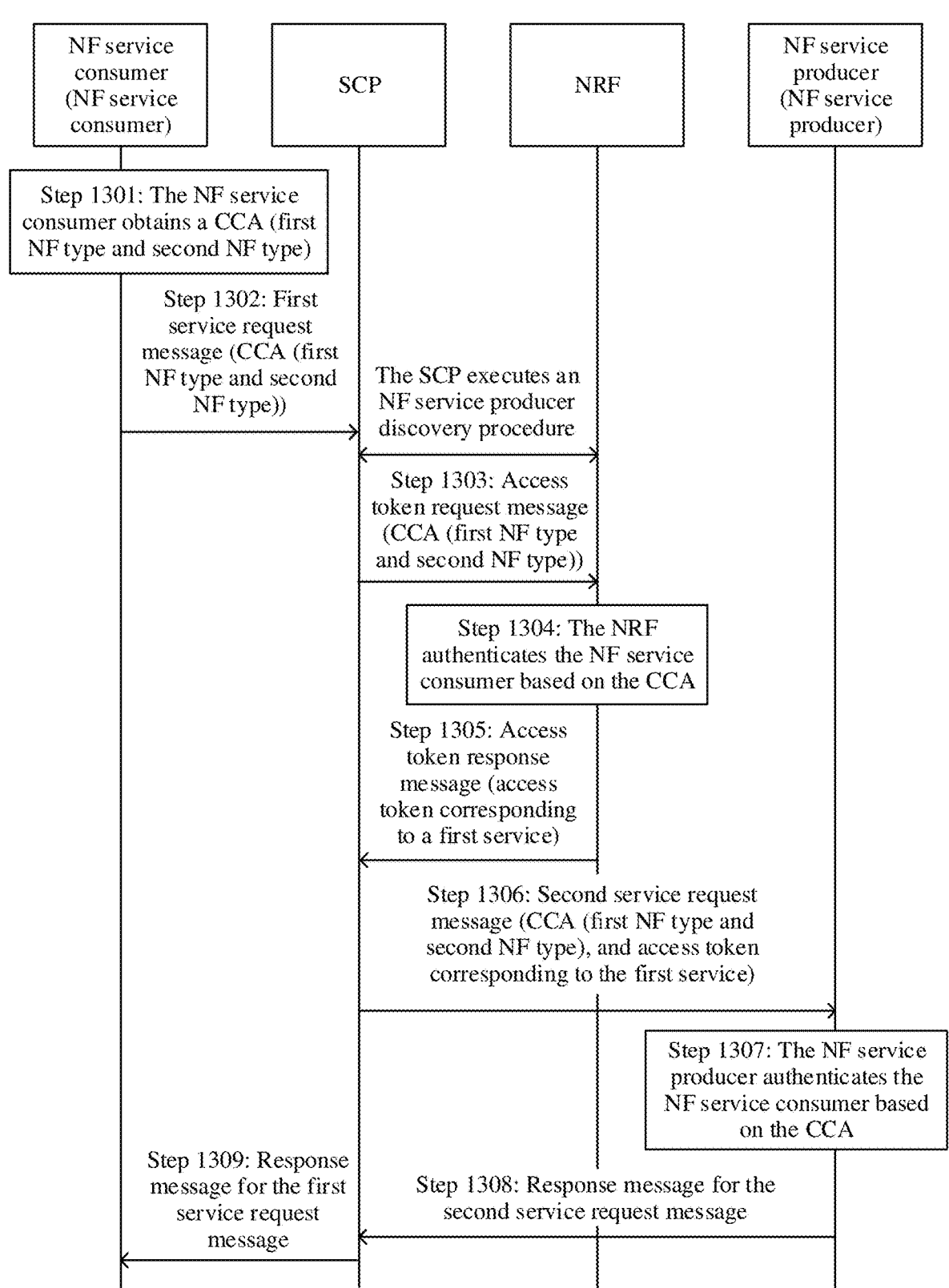
FIG. 13 is a flowchart 1 in which an NF service consumer obtains a first service when it is determined that the first service needs to be requested and there is no available access token corresponding to the first service according to an embodiment of this application.

Embodiment 1: With reference to the embodiment shown in FIG. 8, when it is determined that the first service needs to be requested and there is no available access token corresponding to the first service, the NF service consumer may obtain the first service according to, but not limited to, the following embodiment, as shown in FIG. 13.

Step 1301: The NF service consumer determines to request the first service and determines that there is no available access token corresponding to the first service, and the NF service consumer obtains a CCA, where the access token corresponding to the first service represents/indicates that the NF service consumer has permission to obtain the first service or permission to access the first service.

It may be understood that the NF service consumer may further determine, before step 1301, that a current indirect communication mode is the mode D.

After the NF service consumer determines to request the first service, the NF service consumer checks whether the access token corresponding to the first service is locally stored. That the NF service consumer determines that there is no available access token corresponding to the first service means that the NF service consumer determines that the access token corresponding to the first service is not stored or a stored access token corresponding to the first service expires. Further, when the NF service consumer determines that the stored access token corresponding to the first service expires, the NF service consumer deletes the expired access token corresponding to the first service.

For example, the NF service consumer may receive a service request message of UE, and determine, based on the service request message, that the first service needs to be requested. The NF service consumer obtains related information of the UE (for example, context information of the UE) based on an identifier of the UE. Further, the NF service consumer checks whether the public storage space includes the access token corresponding to the first service. If the access token corresponding to the first service is included and the access token does not expire, the access token is used. If the access token corresponding to the first service is not included, it is determined that there is no available access token. Alternatively, if the access token corresponding to the first service is included but the access token expires, it is determined that there is no available access token. In some embodiments, the NF service consumer deletes the access token. The related information of the UE may be stored in the public storage space of the NF service consumer, or the related information of the UE is obtained by the NF service consumer from another network element based on the identifier of the UE.

In addition, the NF service consumer further needs to determine whether an available CCA is locally stored. If the available CCA is stored (for example, the CCA does not expire), the CCA is used. If the available CCA is not stored (for example, the CCA expires or the CCA is not stored), the NF service consumer generates the CCA. In addition, if the CCA expires, the NF service consumer deletes the expired CCA.

The CCA includes the first NF type and the second NF type. The first NF type is an NF type of an expected NF service producer providing the first service, and the second NF type is an NF type of an expected NRF providing an access token.

In addition, the CCA further includes an NF instance identifier of the NF service consumer, a timestamp, and expiration time.

Step 1302: The NF service consumer sends the first service request message to the SCP, where the first service request message includes the CCA in step 1301 and a parameter for obtaining an access token. The first service request message is used to request the first service.

The parameter for obtaining the access token and a parameter for discovering the NF service producer may be the same, or may be totally or partially different. The parameter for obtaining the access token and the parameter for discovering the NF service producer may be indicated by a same information element or different information elements. For example, if both the parameter for obtaining the access token and the parameter for discovering the NF service producer are the same, the same information element may be used for indication. If the parameter for obtaining the access token and the parameter for discovering the NF service producer are totally different, the first service request message further includes the parameter for discovering the NF service producer. If the parameter for obtaining the access token and the parameter for discovering the NF service producer are partially different, the first service request message further includes a remaining parameter for discovering the NF service producer.

For example, the parameter for obtaining the access token may include an expected service name, an NF type of the NF service consumer, an NF type of an expected NF service producer, an S-NSSAI list or an NSI ID list of an expected NF service producer instance, an NF set ID of the expected NF service producer instance, an S-NSSAI list of the NF service consumer, and the like. The parameter for discovering the NF service producer may include the NF type of the expected NF service producer and the S-NSSAI list or NSI ID list of the expected NF service producer instance. In this case, the parameter for obtaining the access token may be partially same as the parameter for discovering the NF service producer.

Step 1303: The SCP sends an access token request message to the NRF, where the access token request message includes the CCA and the parameter for obtaining the access token.

Before the SCP sends the access token request message to the NRF, the SCP determines that the first service request message does not include the access token corresponding to the first service and the access token corresponding to the first service is not locally stored, or the SCP determines that the first service request message does not include the access token corresponding to the first service and the stored access token corresponding to the first service expires. If it is determined that the stored access token corresponding to the first service expires, the SCP deletes the expired access token corresponding to the first service.

In addition, it may be understood that if the access token corresponding to the first service is an access token of a type B, the SCP further needs to initiate the NF service producer discovery procedure before step 1303. Otherwise, the SCP may initiate the NF service producer discovery procedure after obtaining the access token corresponding to the first service. Alternatively, when information about the NF service producer is locally stored, the SCP may not initiate the NF service producer discovery procedure.

The access token request message may be an NNrf_AccessToken_Get_Request or another message. This is not limited in embodiments of this application.

Step 1304: The NRF receives the access token request message, and the NRF authenticates the NF service consumer based on the CCA.

The NRF successfully authenticates the NF service consumer based on the CCA, and performs authorization check. If it is determined that the authorization succeeds, the access token corresponding to the first service is generated.

The NRF verifies a signature of the CCA, verifies, based on the timestamp and/or the expiration time of the CCA, whether the CCA expires, and verifies whether the NF instance ID of the NF service consumer in the CCA matches an NF instance ID in a certificate for signing the CCA. In addition to successful verification of all the foregoing verification content, the NRF further needs to verify whether an NF type the same as an NF type of the NRF exists in the first NF type and the second NF type that are included in the CCA. When the NRF determines that the second NF type matches the NF type of the NRF, the NRF determines that the authentication on the NF service consumer succeeds.

Step 1305: The NRF sends an access token response message to the SCP, where the access token response message includes the access token corresponding to the first service.

Step 1306: The SCP sends a second service request message to the NF service producer. The second service request message includes the CCA and the access token corresponding to the first service.

Step 1307: The NF service producer receives the second service request message from the SCP. The NF service producer authenticates the NF service consumer based on the CCA.

The NF service producer performs integrity verification on the access token corresponding to the first service. If the integrity verification succeeds, the NF service producer further verifies claims in the access token corresponding to the first service. For details, refer to related content of verification on the claims in the access token.

The NF service producer further needs to authenticate the NF service consumer based on the CCA. The NF service producer verifies the signature of the CCA, verifies, based on the timestamp and/or the expiration time of the CCA, whether the CCA expires, and verifies whether the NF instance ID of the NF service consumer in the CCA matches the NF instance ID in the certificate for signing the CCA. In addition to successful verification of all the foregoing verification content, the NF service producer further needs to verify whether an NF type matching the NF type of the NF service producer exists in the first NF type and the second NF type that are included in the CCA. When the NF service producer determines that the first NF type matches the NF type of the NF service producer, the NF service producer determines that the authentication on the NF service consumer succeeds.

Alternatively, the foregoing sequence of verifying the access token and the CCA may be that the CCA is first verified, and then the access token is verified after the verification succeeds. This is not limited herein.

In addition, the NF service producer further checks whether the NF instance ID of the NF service consumer in the CCA is the same as an NF instance ID of the NF service consumer included in the access token. If the NF instance ID of the NF service consumer in the CCA is the same as the NF instance ID of the NF service consumer included in the access token, the requested service is provided for the NF service consumer.

Step 1308: If the NF service producer determines that the verification on the first access token succeeds and the authentication on the NF service consumer succeeds, the NF service producer sends a response message for the second service request message to the SCP. The response message for the second service request message indicates to provide the first service or indicates that a second service request succeeds.

It may be understood that if the verification on the first access token fails and/or the authentication on the NF service consumer fails, the response message for the second service request message indicates that a first service request fails.

Step 1309: The SCP receives the response message for the second service request message from the NF service producer, and sends the response message for the first service request message to the NF service consumer.

The response message for the second service request message may include the access token corresponding to the first service. The NF service consumer stores the access token corresponding to the first service, to subsequently request the first service.

In addition, if the NF service consumer determines that there is the available access token corresponding to the first service, the NF service consumer may determine whether the available CCA is stored. If the available CCA is stored, the CCA is used. If the available CCA is not stored, a CCA is generated. It may be understood that, in this case, the CCA may not include the second NF type. However, if the NF service consumer determines, before step 1301, that the current indirect communication mode is the mode D, the first service request message needs to carry the first NF type and the second NF type.

In the foregoing embodiment, the CCA includes the first NF type and the second NF type. This can ensure that the NRF and the NF service producer successfully authenticate the NF service consumer based on the CCA, and further ensure that the NF service consumer obtains the first service.

Figure 14:
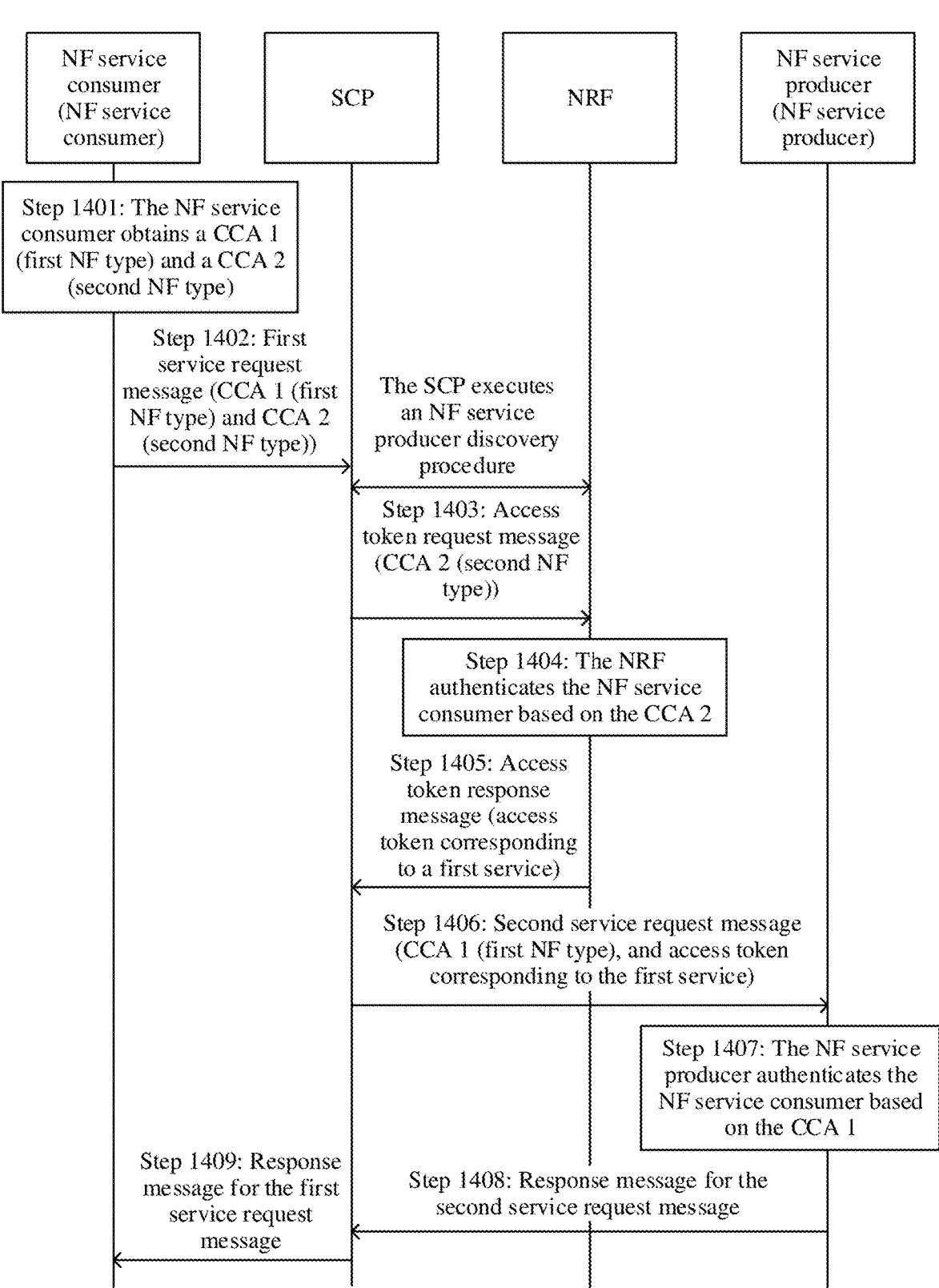
FIG. 14 is a flowchart 2 in which an NF service consumer obtains a first service when it is determined that the first service needs to be requested and there is no available access token corresponding to the first service according to an embodiment of this application.

Embodiment 2: With reference to the embodiment shown in FIG. 10, when it is determined that the first service needs to be requested and there is no available access token corresponding to the first service, the NF service consumer may obtain the first service according to, but not limited to, the following embodiment, as shown in FIG. 14.

Step 1401: The NF service consumer determines to request the first service and determines that there is no available access token corresponding to the first service, and the NF service consumer obtains a CCA 1 and a CCA 2, where the access token corresponding to the first service represents/indicates that the NF service consumer has permission to obtain the first service or permission to access the first service.

It may be understood that the NF service consumer may further determine, before step 1401, that a current indirect communication mode is a mode D. The NF service consumer determines to request the first service and determines that there is no available access token corresponding to the first service. For details, refer to related descriptions in step 1301 in FIG. 13. Details are not repeated.

In addition, the NF service consumer needs to determine whether available CCA 1 and CCA 2 are locally stored. If the available CCA 1 is stored (for example, the CCA 1 does not expire), the CCA 1 is used. If the available CCA 1 is not stored (for example, the CCA 1 expires), the NF service consumer generates a CCA 1. If the available CCA 2 is stored (for example, the CCA 2 does not expire or the CCA 2 is not stored), the CCA 2 is used. If the available CCA 2 is not stored (for example, the CCA 2 expires or the CCA 2 is not stored), the NF service consumer generates a CCA 2. If the CCA 1 or the CCA 2 expires, the NF service consumer deletes the expired CCA.

The CCA 1 includes the first NF type, and the CCA 2 includes the second NF type. The first NF type is an NF type of an expected NF service producer providing the first service, and the second NF type is an NF type of an expected NRF providing an access token.

In addition, the CCA 1 further includes an NF instance identifier of the NF service consumer, a timestamp, and expiration time of the CCA 1. The CCA 2 further includes the NF instance identifier of the NF service consumer, a timestamp, and expiration time of the CCA 2.

Step 1402: The NF service consumer sends the first service request message to the SCP, where the first service request message includes the CCA 1 and the CCA 2 in step 1401 and a parameter for obtaining an access token. The first service request message is used to request the first service.

For the parameter for obtaining the access token and a parameter for discovering the NF service producer, refer to step 1402 in Embodiment 1. Details are not repeated.

Step 1403: The SCP sends an access token request message to the NRF. The access token request message includes the CCA 2 and the parameter for obtaining the access token.

Before the SCP sends the access token request message to the NRF, the SCP determines that the first service request message does not include the access token corresponding to the first service and the access token corresponding to the first service is not locally stored, or the SCP determines that the first service request message does not include the access token corresponding to the first service and a stored access token corresponding to the first service expires. If it is determined that the stored access token corresponding to the first service expires, the SCP deletes the expired access token corresponding to the first service.

The SCP needs to send the access token request message to the NRF. Therefore, the SCP adds the CCA 2 to the access token request message.

In addition, it may be understood that if the access token corresponding to the first service is an access token of a type B, the SCP further needs to initiate an NF service producer discovery procedure before step 1403. Otherwise, the SCP may initiate an NF service producer discovery procedure after obtaining the access token corresponding to the first service. Alternatively, when information about the NF service producer is locally stored, the SCP may not initiate an NF service producer discovery procedure.

For example, the access token request message may be an NNrf_AccessToken_Get_Request or another message. This is not limited in embodiments of this application.

Step 1404: The NRF receives the access token request message, and the NRF authenticates the NF service consumer based on the CCA 2.

The NRF successfully authenticates the NF service consumer based on the CCA 2, and performs authorization check. If it is determined that the authorization succeeds, the access token corresponding to the first service is generated.

The NRF verifies a signature of the CCA 2, verifies, based on the timestamp and/or the expiration time of the CCA 2, whether the CCA 2 expires, and verifies whether the NF instance ID of the NF service consumer in the CCA 2 matches an NF instance ID in a certificate for signing the CCA 2. In addition to successful verification of all the foregoing verification content, the NRF further needs to verify whether the second NF type included in the CCA 2 is the same as an NF type of the NRF. Because the second NF type matches the NF type of the NRF, the NRF determines that the verification on the CCA 2 succeeds.

Step 1405: The NRF sends an access token response message to the SCP, where the access token response message includes the access token corresponding to the first service.

Step 1406: The SCP sends the second service request message to the NF service producer. The second service request message includes the CCA 1 and the access token corresponding to the first service.

Because the SCP needs to send the second service request message to the NF service producer, the SCP selects the CCA 1 and adds the CCA 1 to the second service request message.

Step 1407: The NF service producer receives the second service request message from the SCP, and the NF service producer verifies the CCA 1 and the access token corresponding to the first service.

The NF service producer performs integrity verification on the access token corresponding to the first service. If the integrity verification succeeds, the NF service producer further verifies claims in the access token corresponding to the first service. For details, refer to related content of verification on the claims in the access token.

The NF service producer further needs to authenticate the NF service consumer based on the CCA 1. The NF service producer verifies a signature of the CCA 1, verifies, based on the timestamp and/or the expiration time of the CCA 1, whether the CCA 1 expires, and verifies whether the NF instance ID of the NF service consumer in the CCA 1 matches an NF instance ID in a certificate for signing the CCA 1. In addition to successful verification of all the foregoing verification content, the NF service producer further needs to verify whether the first NF type included in the CCA 1 matches the NF type of the NF service producer. Because the first NF type matches the NF type of the NF service producer, it is determined that the authentication on the NF service consumer succeeds.

Alternatively, the foregoing sequence of verifying the access token and the CCA 1 may be that the CCA 1 is first verified, and then the access token is verified after the verification succeeds. This is not limited herein.

After both the verification on the access token and the verification on the CCA 1 succeed, the NF service producer further checks whether the NF instance ID of the NF service consumer in the CCA 1 is the same as an NF instance ID of the NF service consumer included in the access token. If the NF instance ID of the NF service consumer in the CCA 1 is the same as the NF instance ID of the NF service consumer included in the access token, the requested service is provided for the NF service consumer.

Step 1408: If the NF service producer determines that the verification on the first access token succeeds and the authentication on the NF service consumer succeeds, the NF service producer sends the response message for the second service request message to the SCP. The response message for the second service request message indicates to provide the first service or indicates that a second service request succeeds.

It may be understood that if the verification on the first access token fails and/or the authentication on the NF service consumer fails, the response message for the second service request message indicates that a first service request fails.

Step 1409: The SCP receives the response message for the second service request message from the NF service producer, and sends the response message for the first service request message to the NF service consumer.

The response message for the first service request message may include the access token corresponding to the first service. The NF service consumer stores the access token corresponding to the first service, to subsequently request the first service.

In addition, if the NF service consumer determines that there is the available access token corresponding to the first service, the NF service consumer may determine whether the available CCA 1 is stored. If the available CCA 1 is stored, the CCA 1 is used. If the available CCA 1 is not stored, a CCA 1 is generated. It may be understood that, in this case, the NF service consumer does not need to determine whether the available CCA 2 is stored. Even if the available CCA 2 is not stored, the NF service consumer does not need to generate the CCA 2, and does not need to obtain, through the SCP, the access token corresponding to the first service. The first service request message may not include the CCA 2. However, if the NF service consumer determines, before step 1401, that the current indirect communication mode is the mode D, the first service request message needs to carry the CCA 1 and the CCA 2.

In the foregoing embodiment, the CCA 1 includes the first NF type, and the CCA 2 includes the second NF type. This can ensure that the NRF successfully authenticates the NF service consumer based on the CCA 2 and the NF service producer successfully authenticates the NF service consumer based on the CCA 1, and further ensure that the NF service consumer obtains the first service.

Figure 15:
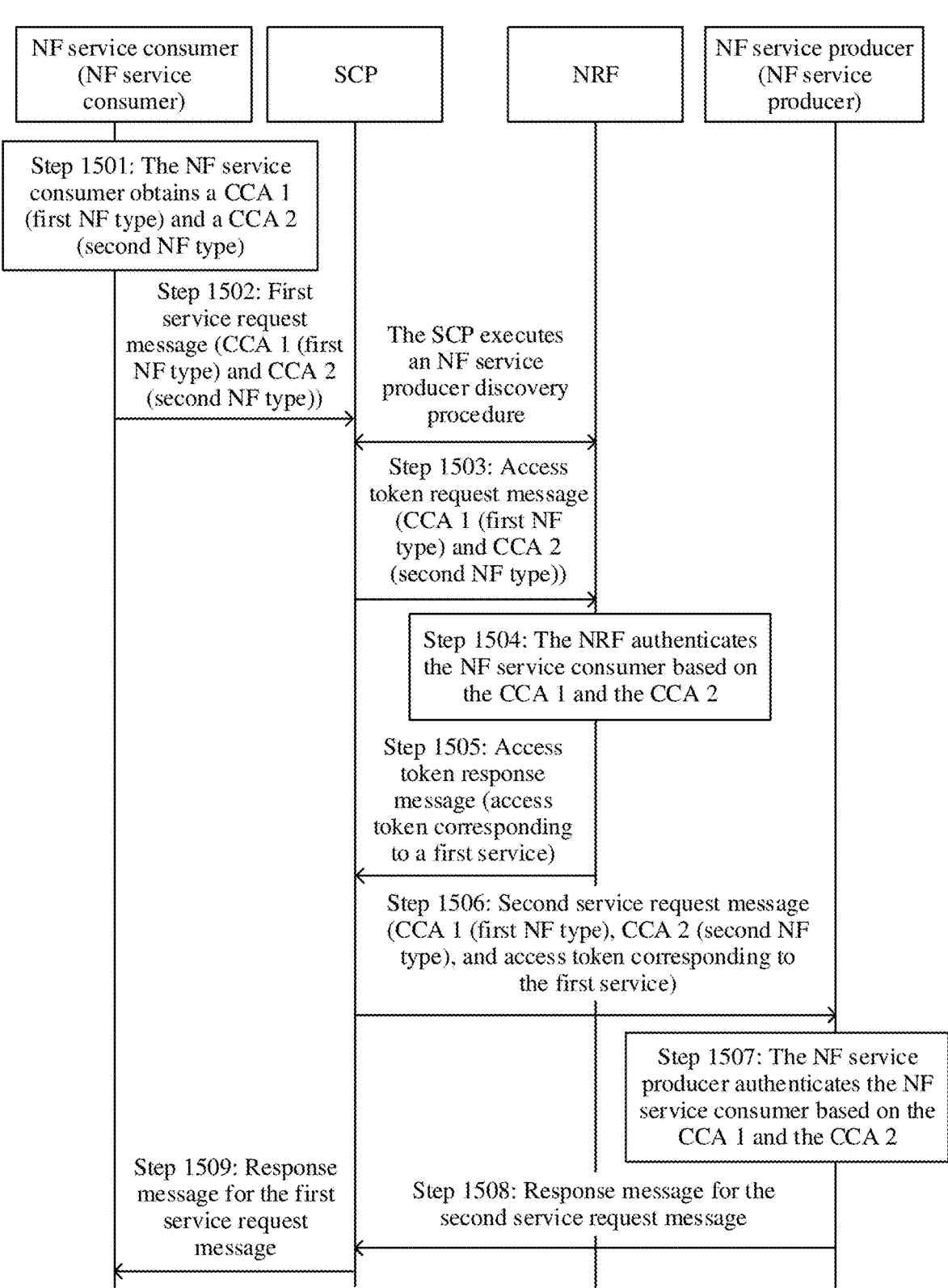
FIG. 15 is a flowchart 3 in which an NF service consumer obtains a first service when it is determined that the first service needs to be requested and there is no available access token corresponding to the first service according to an embodiment of this application.

Embodiment 3: With reference to the embodiment shown in FIG. 11, when it is determined that the first service needs to be requested and there is no available access token corresponding to the first service, the NF service consumer may obtain the first service according to, but not limited to, the following embodiment, as shown in FIG. 15.

For step 1501 and step 1502, refer to step 1401 and step 1402 in FIG. 14. Details are not repeated.

Step 1503: The SCP sends an access token request message to the NRF. The access token request message includes a CCA 2, a CCA 1, and a parameter for obtaining an access token.

Before the SCP sends the access token request message to the NRF, the SCP determines that the first service request message does not include an access token corresponding to the first service and the access token corresponding to the first service is not locally stored, or the SCP determines that the first service request message does not include the access token corresponding to the first service and a stored access token corresponding to the first service expires. If it is determined that the stored access token corresponding to the first service expires, the SCP deletes the expired access token corresponding to the first service.

In addition, it may be understood that if the access token corresponding to the first service is an access token of a type B, the SCP further needs to initiate an NF service producer discovery procedure before step 1503. Otherwise, the SCP may initiate an NF service producer discovery procedure after obtaining the access token corresponding to the first service. Alternatively, when information about an NF service producer is locally stored, the SCP may not initiate an NF service producer discovery procedure.

For example, the access token request message may be an NNrf_AccessToken_Get_Request or another message. This is not limited in embodiments of this application.

Step 1504: The NRF receives the access token request message, and the NRF authenticates the NF service consumer based on the CCA 1 and the CCA 2.

The NRF successfully authenticates the NF service consumer based on the CCA 1 or successfully authenticates the NF service consumer based on the CCA 2, and performs authorization check. If it is determined that the authorization succeeds, the access token corresponding to the first service is generated.

The NRF authenticates the NF service consumer based on the CCA 1 and the CCA 2. In this case, the NRF does not need to determine, based on the CCA 1, that the authentication on the NF service consumer succeeds, or determine, based on the CCA 2, that the authentication on the NF service consumer succeeds. When determining, based on the CCA 1, that the authentication on the NF service consumer succeeds, or determining, based on the CCA 2, that the authentication on the NF service consumer succeeds, the NRF determines that the authentication on the NF service consumer succeeds.

The NRF verifies a signature of the CCA 1, verifies, based on a timestamp and/or expiration time of the CCA 1, whether the CCA 1 expires, and verifies whether an NF instance ID of the NF service consumer in the CCA 1 matches an NF instance ID in a certificate for signing the CCA 1. In addition to successful verification of all the foregoing verification content, the NRF further needs to verify whether a first NF type included in the CCA 1 matches the NF type of the NRF. Because the first NF type does not match the NF type of the NRF, the NRF determines that the authentication on the NF service consumer fails.

The NRF verifies a signature of the CCA 2, verifies, based on a timestamp and/or expiration time of the CCA 2, whether the CCA 2 expires, and verifies whether the NF instance ID of the NF service consumer in the CCA 2 matches an NF instance ID in a certificate for signing the CCA 2. In addition to successful verification of all the foregoing verification content, the NRF further needs to verify whether a second NF type included in the CCA 2 matches the NF type of the NRF. Because the second NF type matches the NF type of the NRF, the NRF determines that the authentication on the NF service consumer succeeds.

Step 1505: The NRF sends an access token response message to the SCP, where the access token response message includes the access token corresponding to the first service.

Step 1506: The SCP sends the second service request message to the NF service producer. The second service request message includes the CCA 1, the CCA 2, and the access token corresponding to the first service.

Step 1507: The NF service producer receives the second service request message from the SCP. The NF service producer verifies the CCA 1, CCA 2, and the access token.

The NF service producer performs integrity verification on the access token corresponding to the first service. If the integrity verification succeeds, the NF service producer further verifies claims in the access token corresponding to the first service. For details, refer to related content of verification on the claims in the access token.

The NF service producer authenticates the NF service consumer based on the CCA 1 and the CCA 2. In this case, the NF service producer does not need to determine, based on the CCA 1, that the authentication on the NF service consumer succeeds, or determine, based on the CCA 2, that the authentication on the NF service consumer succeeds. When the NF service producer determines, based on the CCA 1, that the authentication on the NF service consumer succeeds, or determines, based on the CCA 2, that the authentication on the NF service consumer succeeds, the NF service producer determines that the authentication on the NF service consumer succeeds.

The NF service producer verifies the signature of the CCA 1, verifies, based on the timestamp and/or the expiration time of the CCA 1, whether the CCA 1 expires, and verifies whether the NF instance ID of the NF service consumer in the CCA 1 matches the NF instance ID in the certificate for signing the CCA. In addition to successful verification of all the foregoing verification content, the NF service producer further needs to verify whether the first NF type included in the CCA 1 matches the NF type of the NF service producer. Because the first NF type matches the NF type of the NF service producer, the NF service producer determines that the authentication on the NF service consumer succeeds.

The NF service producer verifies the signature of the CCA 2, verifies, based on the timestamp and/or the expiration time of the CCA 2, whether the CCA 2 expires, and verifies whether the NF instance ID of the NF service consumer in the CCA 2 matches the NF instance ID in the certificate for signing the CCA 2. In addition to successful verification of the foregoing verification content, the NF service producer further needs to verify whether the second NF type included in the CCA 2 matches the NF type of the NF service producer. Because the second NF type is an NF type of an expected NF service producer providing the access token corresponding to the first service, and the second NF type does not match the NF type of the NF service producer, the NF service producer determines that the authentication on the NF service consumer fails.

Step 1508: If the NF service producer determines that the verification on the first access token succeeds and the authentication on the NF service consumer succeeds, the NF service producer sends the response message for the second service request message to the SCP. The response message for the second service request message indicates to provide the first service or indicates that a second service request succeeds.

It may be understood that if the verification on the first access token fails and/or the authentication on the NF service consumer fails, the response message for the second service request message indicates that a first service request fails.

Step 1509: The SCP receives the response message for the second service request message from the NF service producer, and sends the response message for the first service request message to the NF service consumer.

The response message for the second service request message may include the access token corresponding to the first service. The NF service consumer stores the access token corresponding to the first service, to subsequently request the first service.

In the foregoing embodiment, the CCA 1 includes the first NF type, and the CCA 2 includes the second NF type. This can ensure that the NRF successfully authenticates the NF service consumer based on the CCA 1 and the NF service producer successfully authenticates the NF service consumer based on the CCA 2, and further ensure that the NF service consumer obtains the first service.

Figure 16:
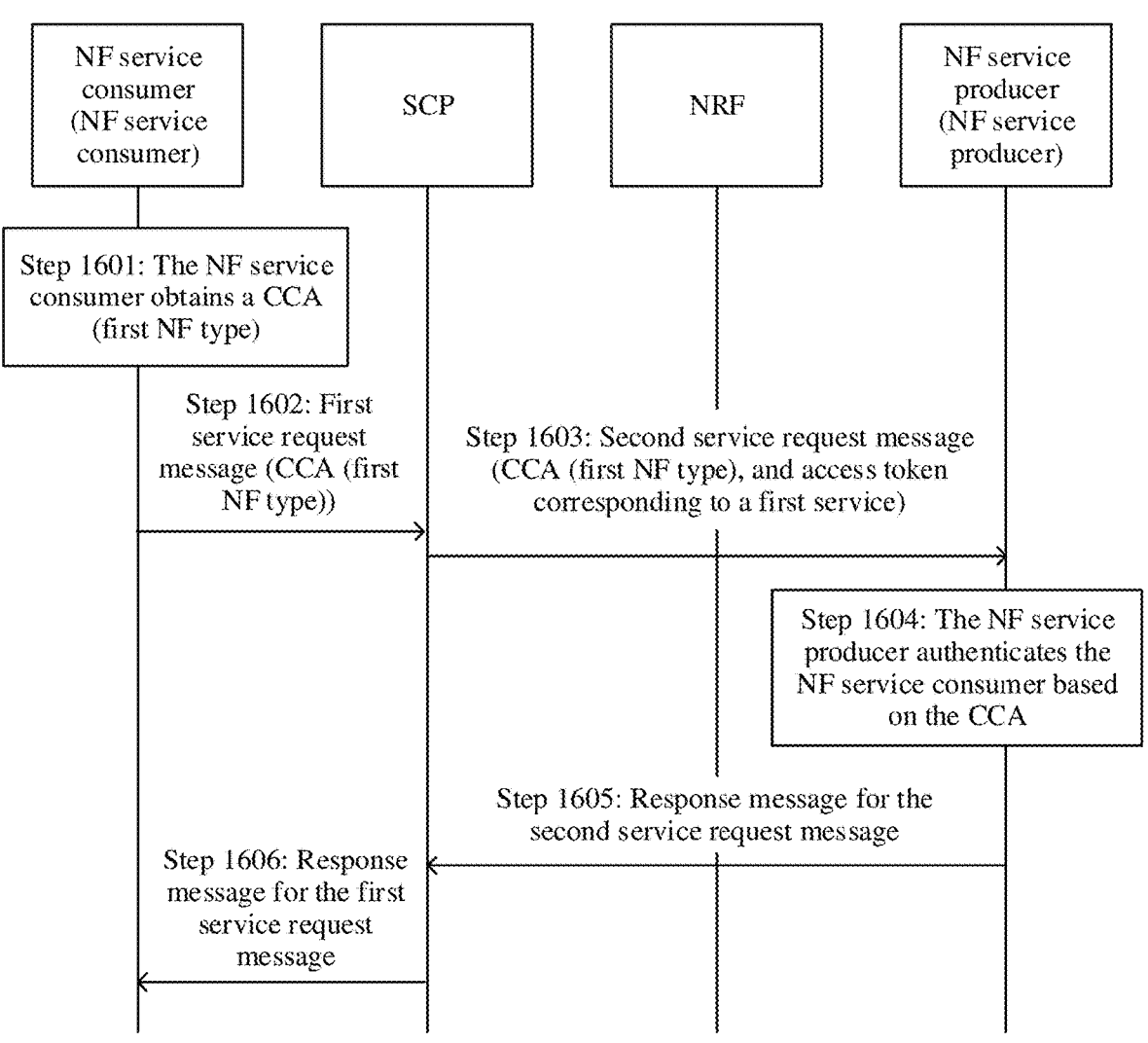
FIG. 16 is a flowchart in which an NF service consumer obtains a first service when it is determined that the first service needs to be requested and there is an available access token corresponding to the first service according to an embodiment of this application.

Embodiment 4: When it is determined that the first service needs to be requested and there is an available access token corresponding to the first service, the NF service consumer may obtain the first service according to, but not limited to, the following embodiment, as shown in FIG. 16.

Step 1601: The NF service consumer determines to request the first service and determines that there is the available access token corresponding to the first service, and the NF service consumer obtains a CCA, where the access token corresponding to the first service represents/indicates that the NF service consumer has permission to obtain the first service or permission to access the first service.

If the NF service consumer determines that there is the available access token corresponding to the first service, the NF service consumer may further determine whether the available CCA is stored. If the available CCA is stored, the CCA is used. If the available CCA is not stored, a CCA is generated. It may be understood that, in this case, the CCA generated by the NF service consumer may not include a second NF type.

The CCA includes an NF instance identifier of the NF service consumer, a timestamp, expiration time, and a first NF type, and the first NF type is an NF type of an expected NF service producer providing the first service.

Step 1602: The NF service consumer sends a first service request message to the SCP, where the first service request message includes the CCA in step 1601 and the access token corresponding to the first service.

Step 1603: The SCP sends a second service request message to the NF service producer. The second service request message includes the CCA and the access token corresponding to the first service.

Before the SCP sends the second service request message to the NF service producer, the SCP determines that the first service request message includes the access token corresponding to the first service or a locally stored access token corresponding to the first service.

Step 1604: The NF service producer receives the second service request message from the SCP. The NF service producer authenticates the NF service consumer based on the CCA.

The NF service producer performs integrity verification on the access token corresponding to the first service. If the integrity verification succeeds, the NF service consumer further verifies claims in the access token corresponding to the first service. For details, refer to related content of verification on the claims in the access token. The NF service producer further needs to authenticate the NF service consumer based on the CCA. For details, refer to an existing CCA verification process.

The NF service producer verifies a signature of the CCA, verifies, based on the timestamp and/or the expiration time of the CCA, whether the CCA expires, and verifies whether the NF instance ID of the NF service consumer in the CCA matches an NF instance ID in a certificate for signing the CCA. In addition to successful verification of all the foregoing verification content, the NF service producer further needs to verify whether the first NF type included in the CCA matches the NF type of the NF service producer. Because the first NF type matches the NF type of the NF service producer, the NF service producer determines that the authentication on the NF service consumer succeeds.

Step 1605: If the NF service producer determines that the verification on the first access token succeeds and the authentication on the NF service consumer succeeds, the NF service producer sends a response message for the second service request message to the SCP.

The response message for the second service request message indicates to provide the first service or indicates that a second service request succeeds.

It may be understood that if the verification on the first access token fails and/or the authentication on the NF service consumer fails, the response message for the second service request message indicates that a first service request fails.

Step 1606: The SCP receives the response message for the second service request message from the NF service producer, and sends the response message for the first service request message to the NF service consumer.

In the foregoing embodiment, by determining that the available CCA is stored, the NF service consumer may carry the first NF type to obtain the first service.

Figure 17:
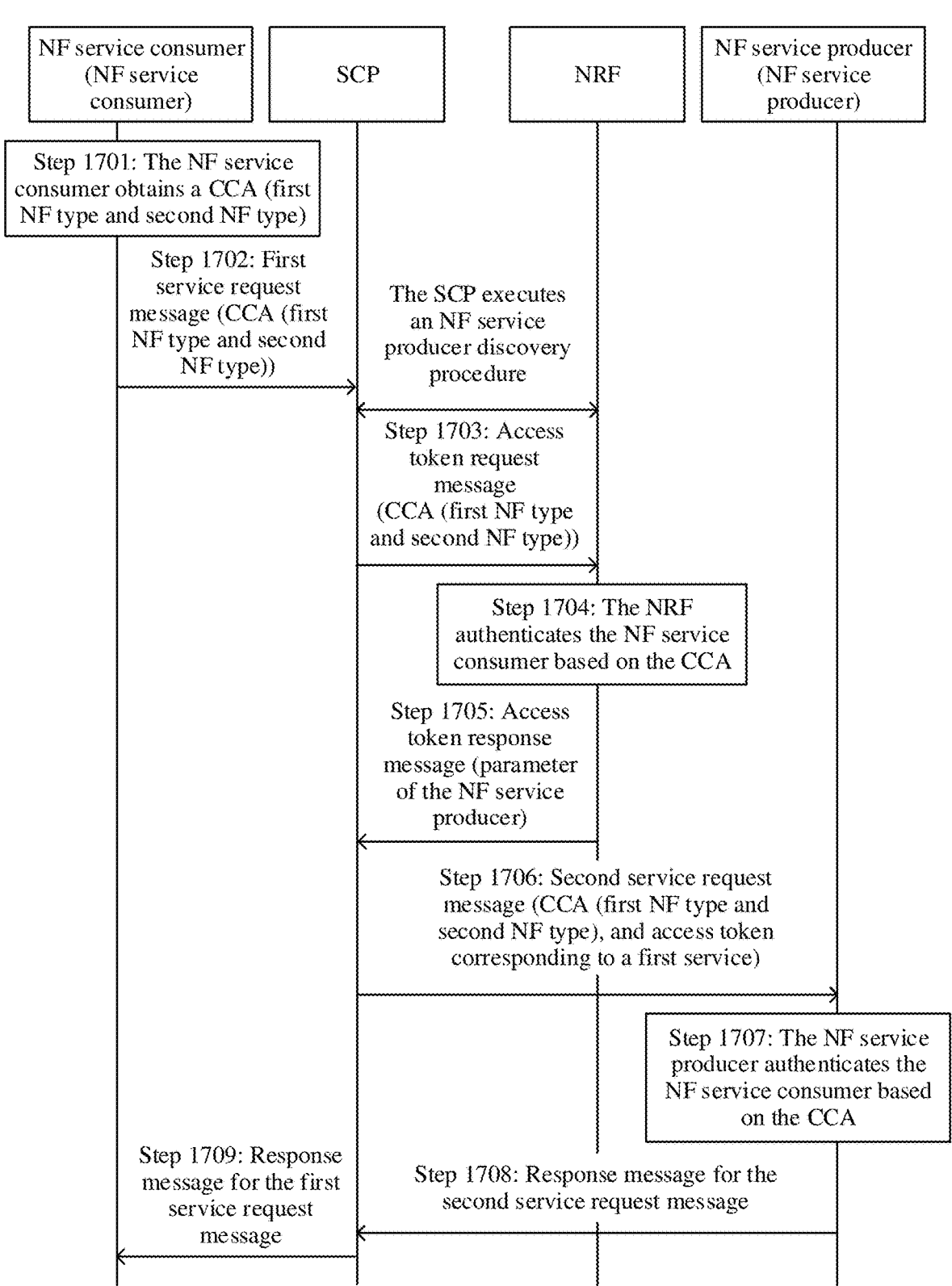
FIG. 17 is a flowchart 1 in which an NF service consumer obtains a first service when the first service needs to be requested and the first service is requested to trigger an SCP to request a parameter of an NF service producer according to an embodiment of this application.

Embodiment 5: With reference to the embodiment shown in FIG. 8, when the first service needs to be requested and requesting of the first service triggers the SCP to request a parameter of the NF service producer (triggers the SCP to initiate the NF service producer discovery procedure), the NF service consumer may obtain the first service according to, but not limited to, the following embodiment, as shown in FIG. 17.

Step 1701: The NF service consumer determines to trigger the SCP to initiate the NF service producer discovery procedure, and the NF service consumer obtains a CCA.

It may be understood that the NF service consumer may further determine, before step 1701, that a current indirect communication mode is the mode D.

For Example, the NF Service Consumer May Determine, Based on One or More of the Following Cases, to Trigger the SCP to Initiate the NF Service Producer Discovery Procedure:

Case 1: Context of the UE is not stored. For example, the NF service consumer determines, based on a service request message of the UE, that the first service needs to be requested.

Case 2: Context of the first service is not stored.

Case 3: A first slice belongs to the service producer network element and context of the first slice is not stored. For example, the NF service consumer determines, based on the service request message of the UE, that the first service needs to be requested from the service producer network element in the first slice.

Case 4: The service consumer network element communicates with the service communication proxy for the first time.

Before the NF service consumer generates the CCA, the NF service consumer needs to determine whether an available CCA is locally stored. If the available CCA is stored (for example, the CCA does not expire), the CCA is used. If the available CCA is not stored (for example, the CCA expires or the CCA is not stored), the NF service consumer generates the CCA. If the CCA expires, the NF service consumer deletes the expired CCA.

The CCA includes the first NF type and the second NF type. The first NF type is an NF type of an expected NF service producer providing the first service, and the second NF type is an NF type of an expected NRF providing the information about the NF service producer.

In addition, the CCA further includes an NF instance identifier of the NF service consumer, a timestamp, and expiration time.

Step 1702: The NF service consumer sends the first service request message to the SCP, where the first service request message includes the CCA in step 1701 and a parameter for discovering the NF service producer, and the first service request message is used to request the first service.

For example, the parameter for discovering the NF service producer may include the NF type of the expected NF service producer, an S-NSSAI list or NSI ID list of an expected NF service producer instance, or the like.

Step 1703: The SCP sends a discovery request message to the NRF, where the discovery request message includes the CCA and the parameter for discovering the NF service producer.

Before the SCP sends the discovery request message to the NRF, the SCP determines that the first service request message does not include the information about the NF service producer and the information about the NF service producer is not locally stored.

Herein, it is assumed that the first service request message further includes the access token corresponding to the first service or the SCP locally stores the access token corresponding to the first service.

Step 1704: The NRF receives the discovery request message, and the NRF authenticates the NF service consumer based on the CCA.

The NRF verifies a signature of the CCA, verifies, based on the timestamp and/or the expiration time of the CCA, whether the CCA expires, and verifies whether the NF instance ID of the NF service consumer in the CCA matches an NF instance ID in a certificate for signing the CCA. In addition to successful verification of all the foregoing verification content, the NRF further needs to verify whether an NF type matching the NF type of the NRF exists in the first NF type and the second NF type that are included in the CCA. When the NRF determines that the second NF type matches the NF type of the NRF, the NRF determines that the authentication on the NF service consumer succeeds.

Step 1705: The NRF sends a discovery response message to the SCP, where the discovery response message includes the parameter of the NF service producer.

When the authentication on the NF service consumer succeeds, the NRF sends the discovery response message to the SCP, where the discovery response message includes the parameter of the NF service producer.

Step 1706: The SCP sends a second service request message to the NF service producer. The second service request message includes the CCA and the access token corresponding to the first service.

The SCP sends the second service request message to the NF service producer indicated by the parameter of the NF service producer in the discovery response message.

Step 1707: The NF service producer receives the second service request message from the SCP. The NF service producer authenticates the NF service consumer based on the CCA.

The NF service producer performs integrity verification on the access token corresponding to the first service. If the integrity verification succeeds, the NF service producer further verifies claims in the access token corresponding to the first service. For details, refer to related content of verification on the claims in the access token. The NF service producer further needs to authenticate the NF service consumer based on the CCA.

The NF service producer verifies the signature of the CCA, verifies, based on the timestamp and/or the expiration time of the CCA, whether the CCA expires, and verifies whether the NF instance ID of the NF service consumer in the CCA matches the NF instance ID in the certificate for signing the CCA. In addition to successful verification of all the foregoing verification content, the NF service producer further needs to verify whether an NF type matching the NF type of the NF service producer exists in the first NF type and the second NF type that are included in the CCA. When the NF service producer determines that the first NF type matches the NF type of the NF service producer, the NF service producer determines that the authentication on the NF service consumer succeeds.

Step 1708: If the NF service producer determines that the verification on the first access token succeeds and the authentication on the NF service consumer succeeds, the NF service producer sends a response message for the second service request message to the SCP. The response message for the second service request message indicates to provide the first service or indicates that a second service request succeeds.

It may be understood that if the verification on the first access token fails and/or the authentication on the NF service consumer fails, the response message for the second service request message indicates that a first service request fails.

Step 1709: The SCP receives the response message for the second service request message from the NF service producer, and sends the response message for the first service request message to the NF service consumer.

In the foregoing embodiment, the CCA includes the first NF type and the second NF type. This can ensure that the NRF and the NF service producer successfully authenticate the NF service consumer based on the CCA, and further ensure that the NF service consumer obtains the first service.

Figure 18:
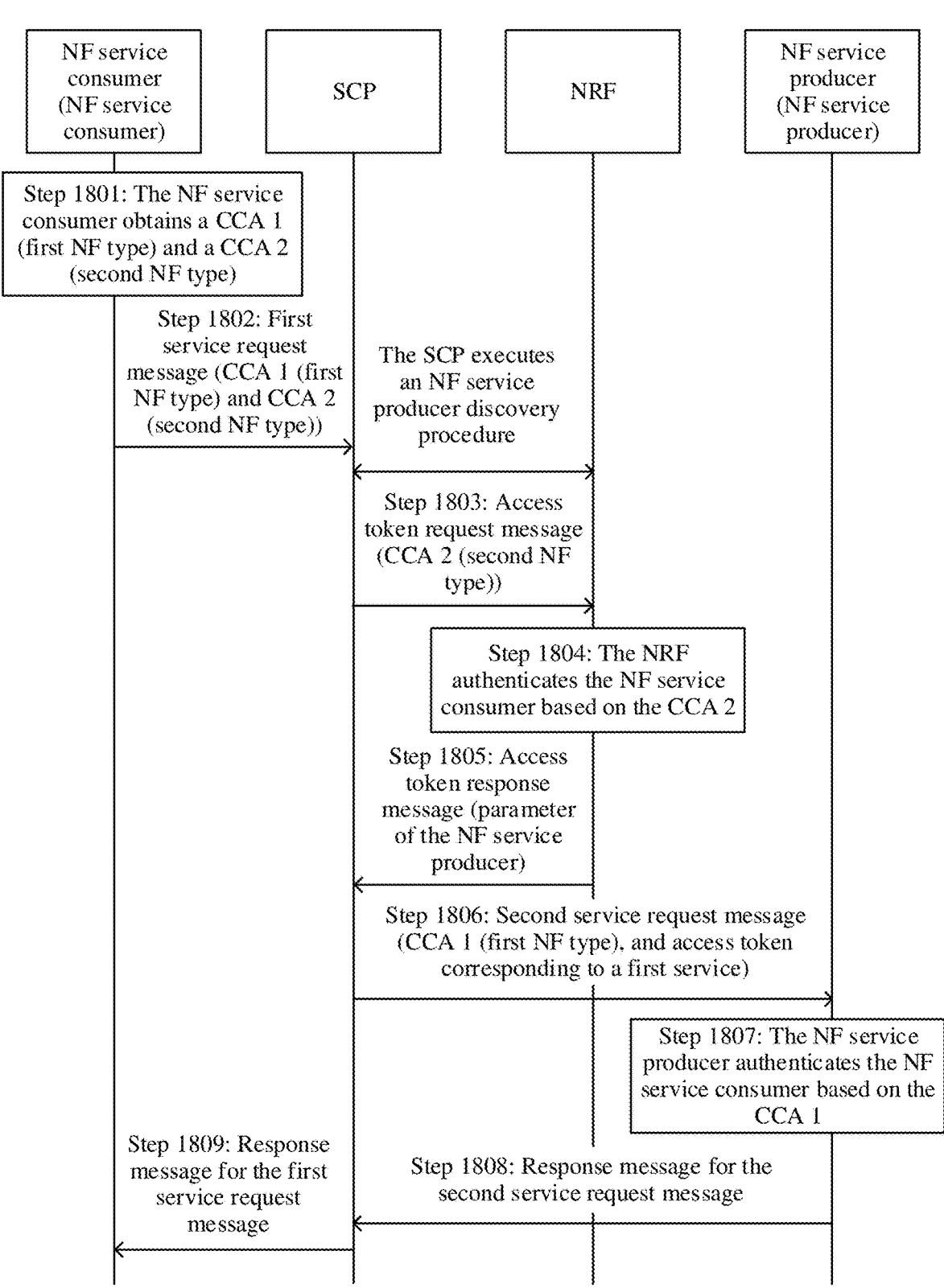
FIG. 18 is a flowchart 2 in which an NF service consumer obtains a first service when the first service needs to be requested and the first service is requested to trigger an SCP to request a parameter of an NF service producer according to an embodiment of this application.

Embodiment 6: With reference to the embodiment shown in FIG. 10, when the first service needs to be requested and requesting of the first service triggers the SCP to request a parameter of an NF service producer (triggers the SCP to initiate an NF service producer discovery procedure), an NF service consumer may obtain the first service according to, but not limited to, the following embodiment, as shown in FIG. 18.

Step 1801: The NF service consumer determines to trigger the SCP to execute the NF service producer discovery procedure, and the NF service consumer obtains a CCA 1 and a CCA 2.

It may be understood that the NF service consumer may further determine, before step 1801, that a current indirect communication mode is a mode D.

For example, for the NF service consumer determining to trigger the SCP to execute the NF service producer discovery procedure, refer to related descriptions in step 1701 in Embodiment 5.

In addition, before the NF service consumer generates the CCA 1 and the CCA 2, the NF service consumer needs to determine whether an available CCA 1 and an available CCA 2 are locally stored. If the available CCA 1 is stored (for example, the CCA 1 does not reach expiration time), the CCA 1 is used. If the available CCA 1 is not stored (for example, the CCA 1 expires or the CCA 1 is not stored), the NF service consumer generates the CCA 1. If the available CCA 2 is stored (for example, the CCA 2 does not expire), the CCA 2 is used. If the available CCA 2 is stored (for example, the CCA 2 expires or the CCA 2 is not stored), the NF service consumer generates the CCA 2. If the CCA 1 or the CCA 2 expires, the NF service consumer deletes the expired CCA.

The CCA 1 includes the first NF type, and the CCA 2 includes the second NF type. The first NF type is an NF type of an expected NF service producer providing the first service, and the second NF type is an NF type of an expected NRF providing information about the NF service producer.

In addition, the CCA 1 further includes an NF instance identifier of the NF service consumer, the timestamp, and the expiration time of the CCA 1. The CCA 2 further includes the NF instance identifier of the NF service consumer, a timestamp, and expiration time of the CCA 2.

Step 1802: The NF service consumer sends the first service request message to the SCP, where the first service request message includes the CCA 1 and the CCA 2 in step 1801 and a parameter for discovering the NF service producer. The first service request message is used to request the first service.

Step 1803: The SCP sends a discovery request message to the NRF, where the discovery request message includes the CCA 2 and the parameter for discovering the NF service producer.

Before the SCP sends the discovery request message to the NRF, the SCP determines that the first service request message does not include the information about the NF service producer and the information about the NF service producer is not locally stored.

Herein, it is assumed that the first service request message further includes the access token corresponding to the first service or the SCP locally stores the access token corresponding to the first service.

The SCP needs to send the discovery request message to the NRF. Therefore, the SCP selects the CCA 2 and adds the CCA 2 to the discovery request message.

Step 1804: The NRF receives the discovery request message, and the NRF authenticates the NF service consumer based on the CCA 2.

The NRF verifies a signature of the CCA 2, verifies, based on the timestamp and/or the expiration time of the CCA 2, whether the CCA 2 expires, and verifies whether the NF instance ID of the NF service consumer in the CCA 2 matches an NF instance ID in a certificate for signing the CCA 2. In addition to successful verification of all the foregoing verification content, the NRF further needs to verify whether the second NF type included in the CCA 2 matches the NF type of the NRF. Because the second NF type matches the NF type of the NRF, the NRF determines that the authentication on the NF service consumer succeeds.

Step 1805: The NRF sends a discovery response message to the SCP, where the discovery response message includes the information about the NF service producer.

When the authentication on the NF service consumer succeeds, the NRF sends the discovery response message to the SCP, where the discovery response message includes the parameter of the NF service producer.

Step 1806: The SCP sends the second service request message to the NF service producer. The second service request message includes the CCA 1 and the access token corresponding to the first service.

The SCP sends the second service request message to the NF service producer indicated by the parameter of the NF service producer in the discovery response message.

Because the SCP needs to send the second service request message to the NF service producer, the SCP selects the CCA 1 and adds the CCA 1 to the second service request message.

Step 1807: The NF service producer receives the second service request message from the SCP. The NF service producer authenticates the NF service consumer based on the CCA 1.

The NF service producer performs integrity verification on the access token corresponding to the first service. If the integrity verification succeeds, the NF service producer further verifies claims in the access token corresponding to the first service. For details, refer to related content of verification on the claims in the access token. The NF service producer further needs to authenticate the NF service consumer based on the CCA 1.

The NF service producer verifies a signature of the CCA 1, verifies, based on the timestamp and/or the expiration time of the CCA 1, whether the CCA 1 expires, and verifies whether the NF instance ID of the NF service consumer in the CCA 1 matches an NF instance ID in a certificate for signing the CCA. In addition to successful verification of all the foregoing verification content, the NF service producer further needs to verify whether the first NF type included in the CCA 1 matches the NF type of the NF service producer. Because the first NF type matches the NF type of the NF service producer, the NF service producer determines that the authentication on the NF service consumer succeeds.

Step 1808: If the NF service producer determines that the verification on the first access token succeeds and the authentication on the NF service consumer succeeds, the NF service producer sends the response message for the second service request message to the SCP. The response message for the second service request message indicates to provide the first service or indicates that a second service request succeeds.

It may be understood that if the verification on the first access token fails and/or the authentication on the NF service consumer fails, the response message for the second service request message indicates that a first service request fails.

Step 1809: The SCP receives the response message for the second service request message from the NF service producer, and sends the response message for the first service request message to the NF service consumer.

In addition, if the NF service consumer determines that the SCP does not need to be triggered to perform the NF service producer discovery procedure, the NF service consumer may determine whether the available CCA 1 is stored. If the available CCA 1 is stored, the CCA 1 is used. If the available CCA 1 is not stored, the CCA 1 is generated. It may be understood that, in this case, the NF service consumer does not need to determine whether the available CCA 2 is stored. Even if the available CCA 2 is not stored, the NF service consumer does not need to generate the CCA 2. The first service request message may not include the CCA 2. However, if the NF service consumer determines, before step 1801, that the current indirect communication mode is the mode D, the first service request message needs to carry the CCA 1 and the CCA 2.

In the foregoing embodiment, the CCA 1 includes the first NF type, and the CCA 2 includes the second NF type. This can ensure that the NRF successfully authenticates the NF service consumer based on the CCA 1 and the NF service producer successfully authenticates the NF service consumer based on the CCA 2, and further ensure that the NF service consumer obtains the first service.

Figure 19A:
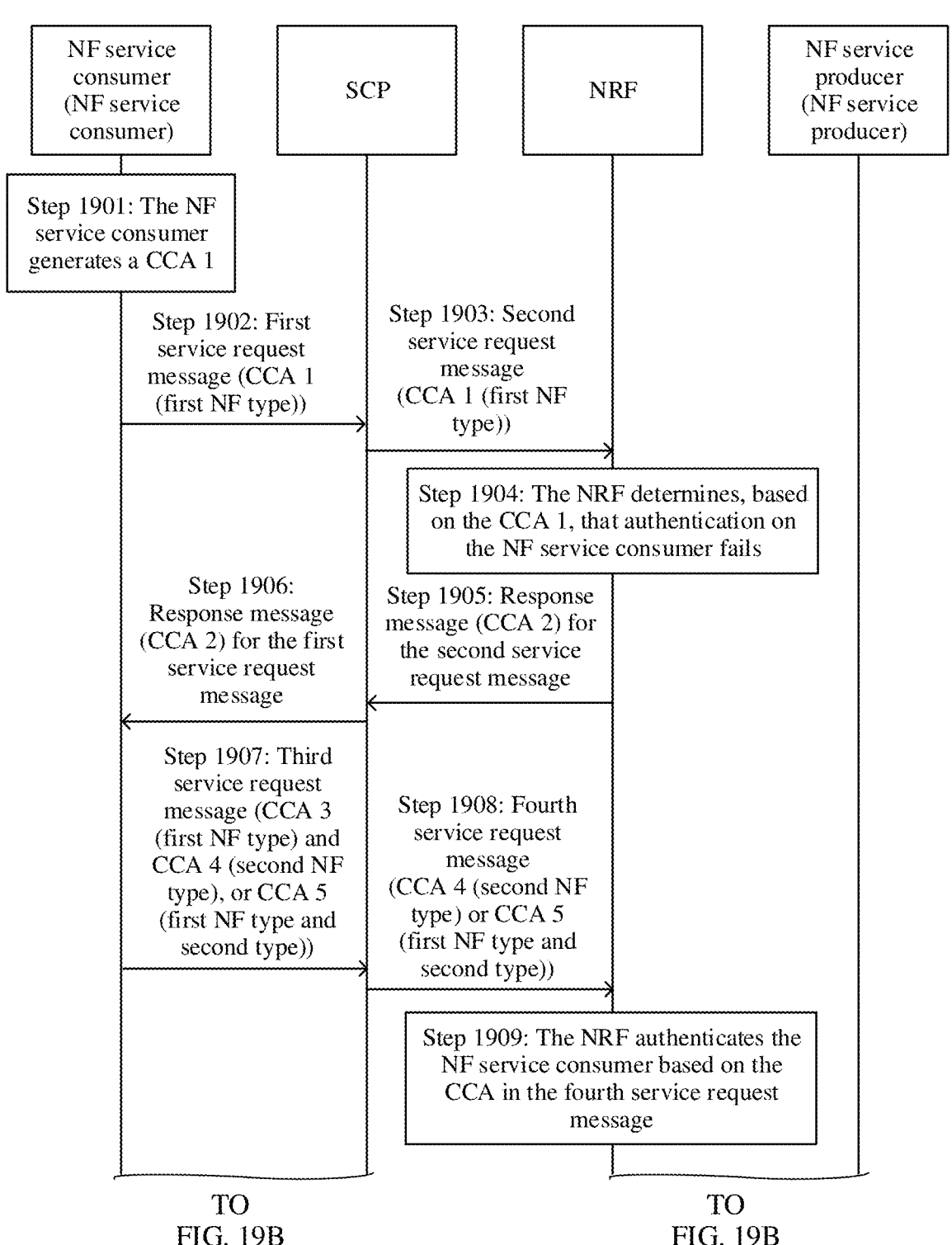
FIG. 19A and FIG. 19B are a flowchart in which an NF service consumer sends a service request message to an SCP based on indication information to obtain a first service according to an embodiment of this application.
Figure 19B:
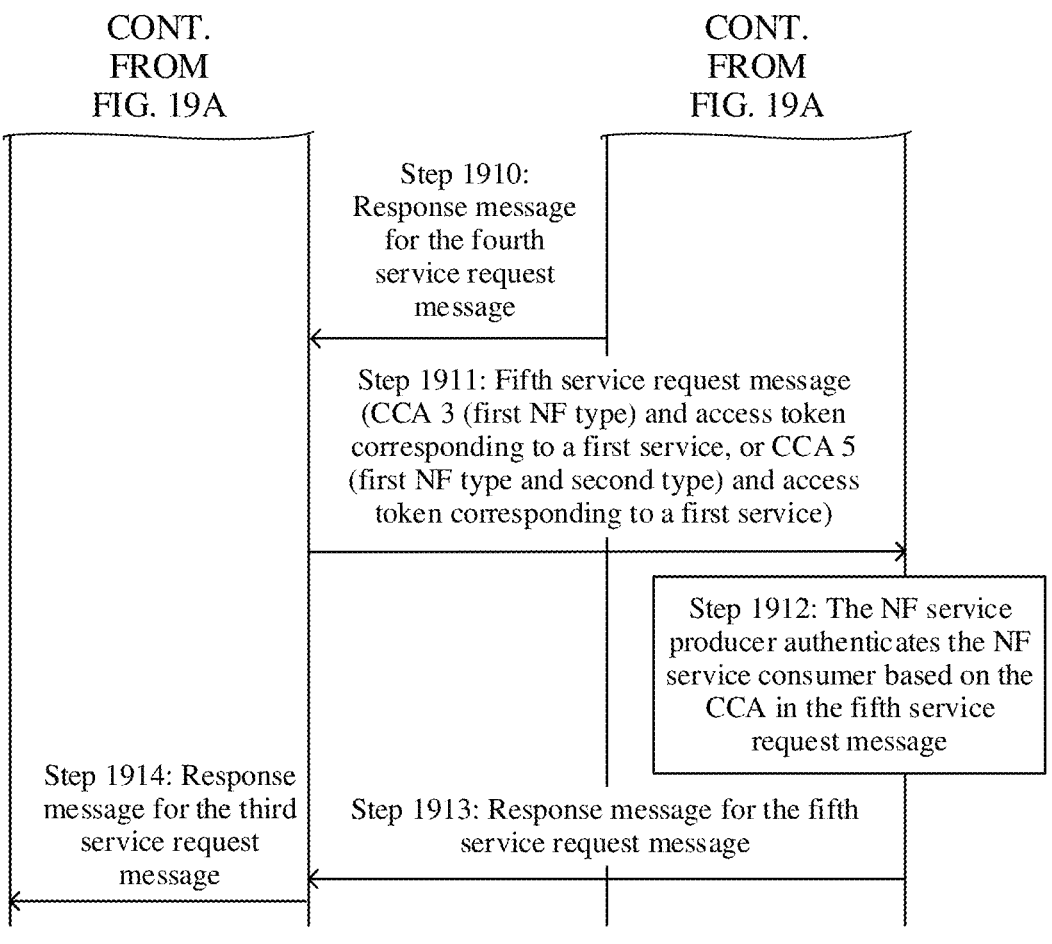

Embodiment 7: With reference to the embodiments shown in FIG. 8 and FIG. 10, the NF service consumer obtains the indication information, the NF service consumer sends the service request message to the SCP based on the indication information, and the NF service consumer may obtain the first service according to, but not limited to, the following embodiment, as shown in FIG. 19A and FIG. 19B.

Step 1901: The NF service consumer obtains a CCA 1.

It may be understood that the NF service consumer may further determine, before step 1901, that a current indirect communication mode is a mode D.

The NF service consumer determines to request the first service, and the NF service consumer obtains the CCA 1. Before the NF service consumer generates the CCA 1, the NF service consumer needs to determine whether an available CCA 1 is locally stored. If the available CCA 1 is stored (for example, the CCA 1 does not expire), the CCA 1 is used. If the available CCA 1 is not stored (for example, the CCA 1 expires or the CCA 1 is not stored), the NF service consumer generates the CCA 1. In addition, if the CCA 1 expires, the NF service consumer deletes the expired CCA 1.

The CCA 1 includes an NF instance identifier of the NF service consumer, a timestamp, expiration time of the CCA 1, and the first NF type, and the first NF type is an NF type of an expected NF service producer providing the first service.

Step 1902: The NF service consumer sends the first service request message to the SCP, where the first service request message includes the CCA 1 in step 1901. The first service request message is used to request the first service.

Step 1903: The SCP sends the second service request message to the NRF, where the second service request message includes the CCA 1, and the second service request message is used to request the second service.

Step 1904: The NRF receives the second service request message, and the NRF fails to authenticate the NF service consumer based on the CCA 1.

The NRF verifies a signature of the CCA 1, verifies, based on the timestamp and/or the expiration time of the CCA 1, whether the CCA 1 expires, and verifies whether the NF instance ID of the NF service consumer in the CCA 1 matches an NF instance ID in a certificate for signing the CCA 1. In addition to successful verification of all the foregoing verification content, the NRF further needs to verify whether the first NF type included in the CCA 1 matches an NF type of the NRF. Because the first NF type does not match the NF type of the NRF, the NRF determines that the authentication on the NF service consumer fails.

Step 1905: The NRF sends the response message for the second service request message to the SCP. The response message for the second service request message includes the CCA 2. The CCA 2 includes an NF instance identifier of the NRF, a timestamp, expiration time, an NF type of the NF service consumer, and the NF type of the NRF.

Step 1906: The SCP sends the response message for the first service request message to the NF service consumer. The response message for the first service request message includes the CCA 2.

Step 1907: The NF service consumer sends the third service request message to the SCP, where the third service request message includes a CCA 3 and a CCA 4, or the third service request message includes a CCA 5.

The CCA 3 includes an NF instance identifier of the NF service consumer, a timestamp, expiration time of the CCA 3, and the first NF type.

The CCA 4 includes an NF instance identifier of the NF service consumer, a timestamp, expiration time of the CCA 4, and the second NF type.

The CCA 5 includes an NF instance identifier of the NF service consumer, a timestamp, expiration time of the CCA 5, the first NF type, and the second NF type.

The first NF type is the NF type of the expected NF service producer providing the first service, and the second NF type is an NF type of an expected NF service producer providing the second service.

For example, if the NF service consumer authenticates the NRF based on the CCA 2, and determines that the authentication on the NRF succeeds, the NF service consumer generates the CCA 3 and the CCA 4, or the CCA 5 based on the NF type of the NRF in the CCA 2.

Step 1908: The SCP sends the fourth service request message to the NRF, where the fourth service request message includes the CCA 4 or the CCA 5, and the fourth service request message is used to request the second service.

Step 1909: The NRF receives the fourth service request message, and the NRF authenticates the NF service consumer based on the CCA in the fourth service request message.

For example, if the fourth service request message includes the CCA 4, the NRF successfully authenticates the NF service consumer based on the CCA 4. The NRF verifies a signature of the CCA 4, verifies, based on a timestamp and/or expiration time of the CCA 4, whether the CCA 4 expires, and verifies whether the NF instance ID of the NF service consumer in the CCA 4 matches an NF instance ID in a certificate for signing the CCA 4. In addition to successful verification of all the foregoing verification content, the NRF further needs to verify whether the second NF type included in the CCA 4 matches the NF type of the NRF. Because the second NF type matches the NF type of the NRF, the NRF determines that the authentication on the NF service consumer succeeds.

For example, if the fourth service request message includes the CCA 5, the NRF successfully authenticates the NF service consumer based on the CCA 5. The NRF verifies a signature of the CCA 5, verifies, based on a timestamp and/or expiration time of the CCA 5, whether the CCA 5 expires, and verifies whether the NF instance ID of the NF service consumer in the CCA 5 matches an NF instance ID in a certificate for signing the CCA 5. In addition to successful verification of all the foregoing verification content, the NRF further needs to verify whether an NF type matching the NF type of the NRF exists in the first NF type and the second NF type that are included in the CCA 5. Because the second NF type matches the NF type of the NRF, the NRF determines that the authentication on the NF service consumer succeeds.

Step 1910: The NRF sends the response message for the fourth service request message to the SCP.

Step 1911: The SCP sends the fifth service request message to the NF service producer. The fifth service request message includes the CCA 3 and an access token corresponding to the first service, or the fifth service request message includes the CCA 5 and an access token corresponding to the first service.

Step 1912: The NF service producer receives the fifth service request message from the SCP. The NF service producer authenticates the NF service consumer based on the CCA in the fifth service request message.

The NF service producer performs integrity verification on the access token corresponding to the first service. If the integrity verification succeeds, the NF service producer further verifies claims in the access token corresponding to the first service. For details, refer to related content of verification on the claims in the access token.

If the fifth service request message includes the CCA 3, the NF service producer further needs to authenticate the NF service consumer based on the CCA 3. The NF service producer verifies a signature of the CCA 3, verifies, based on the timestamp and/or the expiration time of the CCA 3, whether the CCA 3 expires, and verifies whether the NF instance ID of the NF service consumer in the CCA 3 matches an NF instance ID in a certificate for signing the CCA. In addition to successful verification of all the foregoing verification content, the NF service producer further needs to verify whether the first NF type included in the CCA 3 matches the NF type of the NF service producer. Because the first NF type matches the NF type of the NF service producer, it is determined that the authentication on the NF service consumer succeeds.

If the fifth service request message includes the CCA 5, the NF service producer further needs to authenticate the NF service consumer based on the CCA 5. The NF service producer verifies the signature of the CCA 5, verifies, based on the timestamp and/or the expiration time of the CCA 5, whether the CCA 5 expires, and verifies whether the NF instance ID of the NF service consumer in the CCA 5 matches an NF instance ID in a certificate for signing the CCA. In addition to successful verification of all the foregoing verification content, the NF service producer further needs to verify whether the first NF type and the second NF type that are included in the CCA 5 include an NF type matching the NF type of the NF service producer. Because the first NF type matches the NF type of the NF service producer, it is determined that the authentication based on the CCA 5 succeeds.

Step 1913: If the NF service producer determines that the verification on the first access token succeeds and the authentication on the NF service consumer succeeds, the NF service producer sends the response message for the fifth service request message to the SCP. The response message for the fifth service request message indicates to provide the first service or indicates that a fifth service request succeeds.

It may be understood that if the verification on the first access token fails and/or the authentication on the NF service consumer fails, the response message for the fifth service request message indicates that a first service request fails.

Step 1914: The SCP receives the response message for the fifth service request message from the NF service producer, and sends the response message for the third service request message to the NF service consumer.

In the foregoing embodiment, the SCP sends the indication information to the NF service consumer, and the NF service consumer sends, based on the indication information, the service request message carrying the CCA 3 (the first NF type) and the CCA 4 (the second NF type), or the CCA 5 (the first NF type and the second NF type), to ensure that the NF service consumer obtains the first service.

Figure 20A:
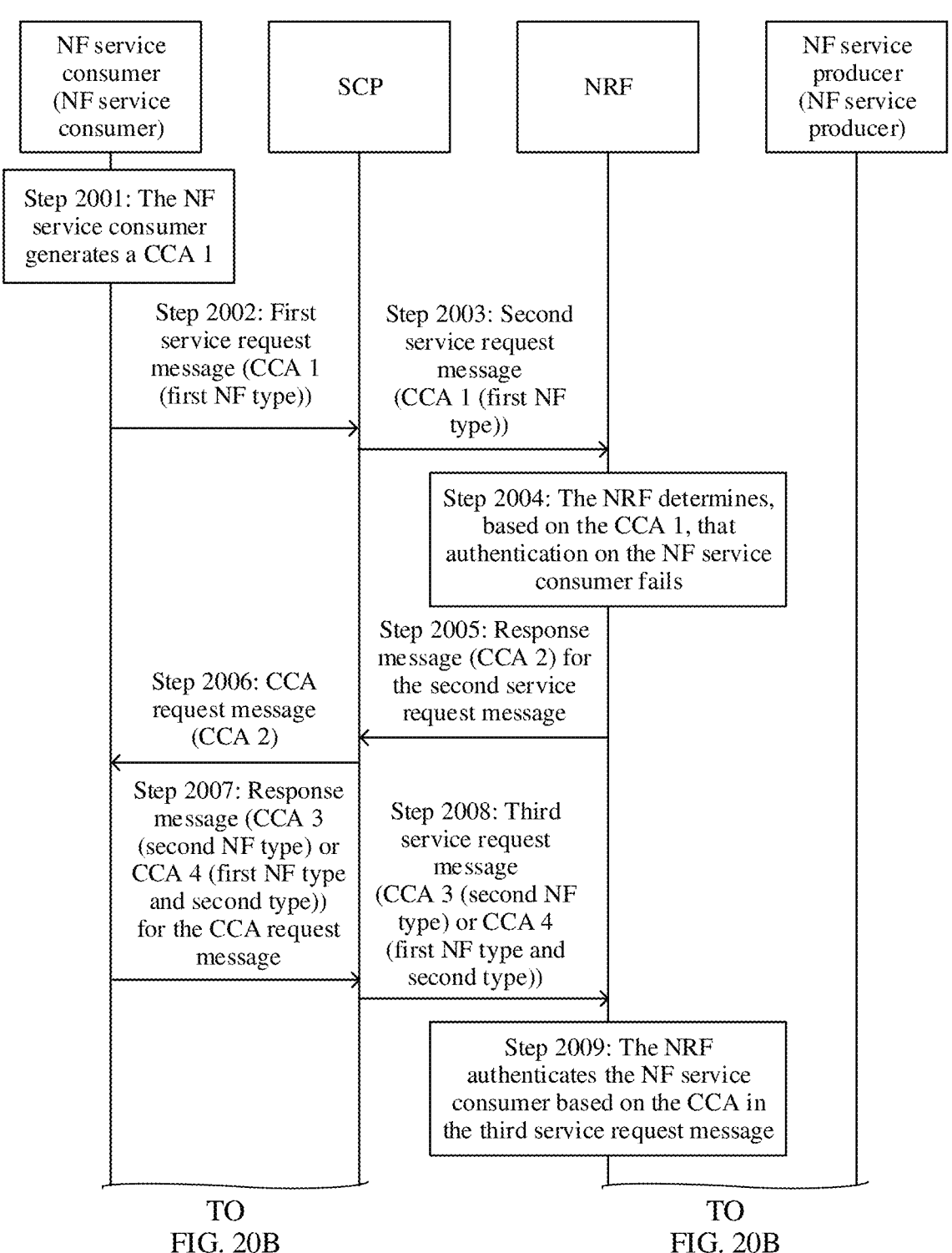

Embodiment 8: With reference to the embodiment shown in FIG. 12, the SCP actively requests a client credentials assertion, and sends the client credentials assertion request message. The NF service consumer responds to the client credentials assertion request message. The NF service consumer may obtain the first service according to, but is not limited to, the following embodiment, as shown in FIG. 20A and FIG. 20B.

For step 2001 to step 2005, refer to related descriptions of step 1901 to step 1905 in Embodiment 7.

Step 2006: The SCP sends the CCA request message to the NF service consumer. The CCA request message includes a CCA 2.

Step 2007: The NF service consumer sends the response message for the CCA request message to the SCP, where the response message for the CCA request message includes a CCA 3, or the response message for the CCA request message includes a CCA 4.

The CCA 3 includes an NF instance identifier of the NF service consumer, a timestamp, expiration time of the CCA 3, and the second NF type.

The CCA 4 includes an NF instance identifier of the NF service consumer, a timestamp, expiration time of the CCA 4, the first NF type, and the second NF type.

The first NF type is an NF type of an expected NF service producer providing the first service, and the second NF type is an NF type of an expected NF service producer providing the second service.

For example, if the NF service consumer authenticates the NRF based on the CCA 2, and determines that the authentication on the NRF succeeds, the NF service consumer generates the CCA 3 or the CCA 4 based on an NF type of the NRF in the CCA 2.

Step 2008: The SCP sends a third service request message to the NRF, where the third service request message includes the CCA 3 or the CCA 4, and the third service request message is used to request the second service.

Step 2009: The NRF receives the third service request message, and the NRF authenticates the NF service consumer based on the CCA in the third service request message. For example, if the third service request message includes the CCA 3, the NRF successfully authenticates the NF service consumer based on the CCA 3. The NRF verifies a signature of the CCA 3, verifies, based on the timestamp and/or the expiration time of the CCA 3, whether the CCA 3 expires, and verifies whether the NF instance ID of the NF service consumer in the CCA 3 matches an NF instance ID in a certificate for signing the CCA 3. In addition to successful verification of all the foregoing verification content, the NRF further needs to verify whether the second NF type included in the CCA 3 matches the NF type of the NRF. Because the second NF type matches the NF type of the NRF, the NRF determines that the authentication on the NF service consumer succeeds.

For example, if the third service request message includes the CCA 4, the NRF successfully authenticates the NF service consumer based on the CCA 4. The NRF verifies a signature of the CCA 4, verifies, based on the timestamp and/or the expiration time of the CCA 4, whether the CCA 4 expires, and verifies whether the NF instance ID of the NF service consumer in the CCA 4 matches an NF instance ID in a certificate for signing the CCA 4. In addition to successful verification of all the foregoing verification content, the NRF further needs to verify whether an NF type matching the NF type of the NRF exists in the first NF type and the second NF type that are included in the CCA 4. Because the second NF type matches the NF type of the NRF, the NRF determines that the authentication on the NF service consumer succeeds.

Step 2010: The NRF sends a response message for the third service request message to the SCP.

Step 2011: The SCP sends a fourth service request message to the NF service producer. The fourth service request message includes the CCA 3 and the access token corresponding to the first service, or the fourth service request message includes the CCA 4 and the access token corresponding to the first service.

Step 2012: The NF service producer receives the fourth service request message from the SCP. The NF service producer authenticates the NF service consumer based on the CCA in the fourth service request message.

The NF service producer performs integrity verification on the access token corresponding to the first service. If the integrity verification succeeds, the NF service producer further verifies claims in the access token corresponding to the first service. For details, refer to related content of verification on the claims in the access token.

If the fourth service request message includes the CCA 3, the NF service producer further needs to authenticate the NF service consumer based on the CCA 3. The NF service producer verifies the signature of the CCA 3, verifies, based on the timestamp and/or the expiration time of the CCA 3, whether the CCA 3 expires, and verifies whether the NF instance ID of the NF service consumer in the CCA 3 matches an NF instance ID in a certificate for signing the CCA. In addition to successful verification of all the foregoing verification content, the NF service producer further needs to verify whether the first NF type included in the CCA 3 matches the NF type of the NF service producer. Because the first NF type matches the NF type of the NF service producer, it is determined that the authentication on the NF service consumer succeeds.

If the fourth service request message includes the CCA 4, the NF service producer further needs to authenticate the NF service consumer based on the CCA 4. The NF service producer verifies the signature of the CCA 4, verifies, based on the timestamp and/or the expiration time of the CCA 4, whether the CCA 4 expires, and verifies whether the NF instance ID of the NF service consumer in the CCA 4 matches an NF instance ID in a certificate for signing the CCA. In addition to successful verification of all the foregoing verification content, the NF service producer further needs to verify whether the first NF type and the second NF type that are included in the CCA 4 include an NF type matching the NF type of the NF service producer. Because the first NF type matches the NF type of the NF service producer, it is determined that the authentication based on the CCA 4 succeeds.

Step 2013: If the NF service producer determines that the verification on the first access token succeeds and the authentication on the NF service consumer succeeds, the NF service producer sends a response message for the fourth service request message to the SCP. The response message for the fourth service request message indicates to provide the first service or indicates that a fourth service request succeeds.

It may be understood that if the verification on the first access token fails and/or the authentication on the NF service consumer fails, the response message for the fourth service request message indicates that a first service request fails.

Step 2014: The SCP receives the response message for the fourth service request message from the NF service producer, and sends the response message for the first service request message to the NF service consumer.

In the foregoing embodiment, the SCP sends the client credentials assertion request message to the NF service consumer, where the client credentials assertion request message includes the indication information, and the NF service consumer responds to the client credentials assertion request message based on the indication information. The response message for the client credentials assertion request message carries the CCA 3 (the second NF type) or the CCA 4 (the first NF type and the second NF type), to ensure that the NF service consumer obtains the first service.

Figure 21:
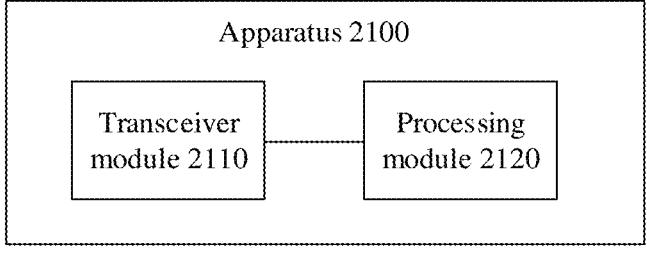
FIG. 21 is a schematic diagram 1 of a structure of a communication apparatus according to an embodiment of this application.

FIG. 21 is a block diagram of a possible example of an apparatus according to an embodiment of this application. The apparatus 2100 includes a transceiver module 2110 and a processing module 2120. The transceiver module 2110 may include a receiving unit and a sending unit. The processing module 2120 is configured to control and manage an action of the apparatus 2100. The transceiver module 2110 is configured to support the apparatus 2100 in communicating with another network entity. In some embodiments, the apparatus 2100 may further include a storage unit, and the storage unit is configured to store program code and data of the apparatus 2100.

In some embodiments, each module in the apparatus 2100 may be implemented by using software.

In some embodiments, the processing module 2120 may be a processor or a controller, for example, may be a general-purpose central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor or controller may implement or execute various example logical blocks, modules, and circuits described with reference to content disclosed in embodiments of this application. The processor may be a combination of processors implementing a computing function, for example, a combination of one or more microprocessors, or a combination of the DSP and a microprocessor. The transceiver module 2110 may be a communication interface, a transceiver, a transceiver circuit, or the like. The communication interface is a general name. In specific implementation, the communication interface may include a plurality of interfaces, and the storage unit may be a memory.

When the apparatus 2100 is a service consumer network element or a chip in the service consumer network element, the processing module 2120 in the apparatus 2100 may support the apparatus 2100 in performing the actions of the service consumer network element in the foregoing method examples, for example, may support the apparatus 2100 in performing step 1401 in FIG. 14, step 1501 in FIG. 15, step 1601 in FIG. 16, step 1701 in FIG. 17, step 1801 in FIG. 18, step 1901 in FIG. 19A, and step 2001 in FIG. 20A.

The transceiver module 2110 may support communication between the apparatus 2100 and a service communication proxy (for example, an SCP). For example, the transceiver module 2110 may support the apparatus 2100 in performing step 801 and step 808 in FIG. 8, step 901, step 905, and step 906 in FIG. 9, step 1001 and step 1008 in FIG. 10, step 1101 and step 1108 in FIG. 11, step 1201, step 1205, step 1206, and step 1213 in FIG. 12, step 1302 and step 1309 in FIG. 13, step 1402 and step 1409 in FIG. 14, step 1502 and step 1509 in FIG. 15, step 1602 and step 1606 in FIG. 16, step 1702 and step 1709 in FIG. 17, step 1802 and step 1809 in FIG. 18, step 1902, step 1906, step 1907, step 1914 in FIG. 19A and FIG. 19B, and step 2002, step 2006, step 2007, and step 2014 in FIG. 20A and FIG. 20B.

For Example, Details May be as Follows:

In an Implementation, the Apparatus 2100 Further Includes:

the transceiver module 2110 sends a first service request message to the service communication proxy, and the service consumer network element receives a response message for the first service request message from the service communication proxy, where the first service request message is used to request a first service from a service producer network element, the first service request message includes a first client credentials assertion, the first client credentials assertion is used to authenticate the service consumer network element, the first client credentials assertion includes a first network function type and a second network function type, the first network function type is a network function type of the service producer network element, the second network function type is a network function type of a network element providing a second service, and the second service is associated with the first service.

In a possible implementation, the second service is used to provide an access token corresponding to the first service, and the access token corresponding to the first service indicates that the service consumer network element has permission to obtain the first service.

In a possible implementation, the processing module 2120 is configured to determine, by using the service consumer network element, that there is no available access token corresponding to the first service.

In a possible implementation, the processing module 2120 is configured to: determine that the access token corresponding to the first service is not stored; or determine that a stored access token corresponding to the first service expires.

In a possible implementation, the second service is used to provide information about the service producer network element.

In a possible implementation, the processing module 2120 is configured to determine that the first service request message triggers the service communication proxy to request the second service.

In a possible implementation, the processing module 2120 is configured to: determine, based on one or more of the following cases, that the first service request message triggers the service communication proxy to request the second service: context of a first terminal device is not stored and the first terminal device is associated with the first service; context of the first service is not stored; the service producer network element belongs to a first slice and context corresponding to the first slice is not stored; or the service consumer network element communicates with the service communication proxy for the first time.

In a possible implementation, the processing module 2120 is configured to determine to request the first service in an indirect communication mode, namely, a mode D.

In a possible implementation, the transceiver module 2110 is configured to: send a second service request message to the service communication proxy, where the second service request message is used to request the first service, the second service request message includes a second client credentials assertion, the second client credentials assertion includes the first network function type, and the second client credentials assertion is used to authenticate the service consumer network element; and receive a response message for the second service request message from the service communication proxy, where the response message for the second service request message includes indication information. The processing module 2120 is configured to send, by using the transceiver module 2110, the first service request message to the service communication proxy based on the indication information.

It should be understood that the apparatus 2100 in this embodiment of this application may correspond to the service consumer network element in the foregoing method embodiment, for example, the method in FIG. 8. In addition, operations and/or functions of modules in the apparatus 2100 are respectively used to implement corresponding steps of the method of the service consumer network element in the foregoing method embodiment. Therefore, beneficial effect in the foregoing method embodiment can also be achieved. For brevity, details are not described herein again.

When the apparatus 2100 is a first network element or a chip in the first network element, the processing module 2120 in the apparatus 2100 may support the apparatus 2100 in performing the actions of the network repository function network element or the service producer network element in the foregoing method examples.

For example, when the first network element is a network repository function network element, the first network element may support the apparatus 2100 in performing step 803 in FIG. 8, step 903 in FIG. 9, step 1003 in FIG. 10, step 1103 in FIG. 11, step 1203 and step 1208 in FIG. 12, step 1304 in FIG. 13, step 1404 in FIG. 14, step 1504 in FIG. 15, step 1704 in FIG. 17, step 1804 in FIG. 18, step 1904 and step 1909 in FIG. 19A, and step 2004 and step 2009 in FIG. 20A. The transceiver module 2110 may support communication between the apparatus 2100 and a service communication proxy (for example, an SCP). For example, the transceiver module 2110 may support the apparatus 2100 in performing step 802, step 804, and step 808 in FIG. 8, step 902 and step 904 in FIG. 9, step 1002 and step 1004 in FIG. 10, step 1102 and step 1104 in FIG. 11, step 1202, step 1204, step 1207, and step 1209 in FIG. 12, step 1303 and step 1305 in FIG. 13, step 1403 and step 1405 in FIG. 14, step 1503 and step 1505 in FIG. 15, step 1703 and step 1705 in FIG. 17, step 1803 and step 1805 in FIG. 18, step 1903, step 1905, step 1908, and step 1910 in FIG. 19A and FIG. 19B, and step 2003, step 2005, step 2008, and step 2010 in FIG. 20A and FIG. 20B.

For example, when the first network element is a service producer network element, the first network element may support the apparatus 2100 in performing step 803 in FIG. 8, step 1006 in FIG. 10, step 1106 in FIG. 11, step 1211 in FIG. 12, step 1307 in FIG. 13, step 1407 in FIG. 14, step 1507 in FIG. 15, step 1604 in FIG. 16, step 1707 in FIG. 17, step 1807 in FIG. 18, step 1912 in FIG. 19B, and step 2012 in FIG. 20B. The transceiver module 2110 may support communication between the apparatus 2100 and a service communication proxy (for example, an SCP). For example, the transceiver module 2110 may support the apparatus 2100 in performing step 805, step 807, and step 808 in FIG. 8, step 1005 and step 1007 in FIG. 10, step 1105 and step 1107 in FIG. 11, step 1210 and step 1212 in FIG. 12, step 1306 and step 1308 in FIG. 13, step 1406 and step 1408 in FIG. 14, step 1506 and step 1508 in FIG. 15, step 1603 and step 1605 in FIG. 16, step 1706 and step 1708 in FIG. 17, step 1806 and step 1808 in FIG. 18, step 1911 and step 1913 in FIG. 19B, and step 2011 and step 2013 in FIG. 20B.

For Example, Details May be as Follows:

In an Implementation, the Apparatus 2100 Further Includes:

the transceiver module 2110 is configured to receive a first service request message from the service communication proxy, where the first service request message is used to request a first service from the first network element, the first service request message includes a first client credentials assertion, the first client credentials assertion is used to authenticate a service consumer network element, and the first client credentials assertion includes a plurality of network function types.

The processing module 2120 is configured to: authenticate the service consumer network element based on the first client credentials assertion; when the service consumer network element is authenticated based on the first client credentials assertion, determine whether a network function type of the processing module matches one or more of the plurality of network function types; and send, by using the transceiver module 2110, a response message for the first service request message to the service communication proxy based on an authentication result.

In some embodiments, the plurality of network function types include a first network function type and a second network function type. The first network function type is the network function type of the first network element, the second network function type is a network function type of a network element providing a second service, and the second service is associated with the first service.

In some embodiments, the second service is used to provide an access token corresponding to the first service, and the access token corresponding to the first service indicates that the service consumer network element has permission to obtain the first service; or the second service is used to provide information about the first network element.

In some embodiments, the first service is used to provide an access token corresponding to the second service, and the access token corresponding to the second service indicates that the service consumer network element has permission to obtain the second service; or the first service is used to provide information about a second service network element.

In some embodiments, the transceiver module 2110 is configured to: receive a second service request message from the service communication proxy, where the second service request message is used to request the first service from the first network element, the second service request message includes a second client credentials assertion, and the second client credentials assertion includes a third network function type; and when the third network function type does not match the network function type of the first network element, send a response message for the second service request message to the service communication proxy, where the response message for the second service request message includes indication information, and the indication information is used to trigger the first service request message.

It should be understood that the apparatus 2100 in this embodiment of this application may correspond to the method of the first network element (for example, the network repository function network element or the service producer network element) in the foregoing method embodiment, for example, the method in FIG. 8. In addition, operations and/or functions of modules in the apparatus 2100 are respectively used to implement corresponding steps of the method of the network repository function network element in the foregoing method embodiment, or the method in FIG. 8. In addition, operations and/or functions of the modules in the apparatus 2100 are respectively used to implement corresponding steps of the method of the service producer network element in the foregoing method embodiment. Therefore, beneficial effect in the foregoing method embodiment can also be achieved. For brevity, details are not described herein again.

Figure 22:
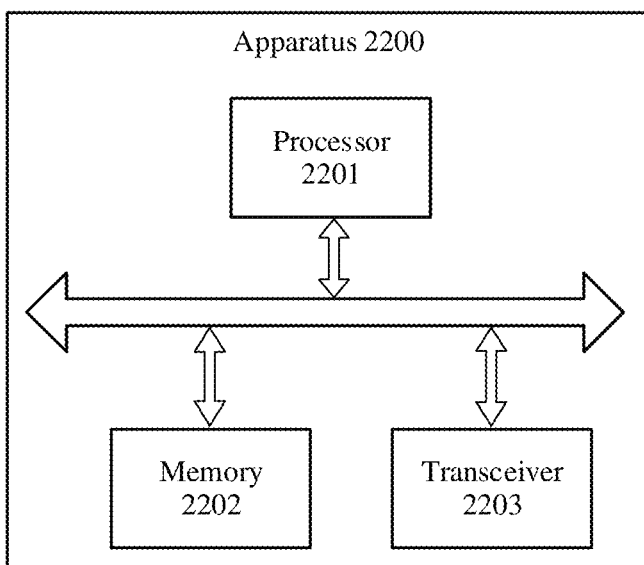
FIG. 22 is a schematic diagram 2 of a structure of a communication apparatus according to an embodiment of this application.

When the processing module 2120 in this embodiment of this application is a processor, and the transceiver module 2110 is a transceiver, the apparatus 2100 in this embodiment of this application may be an apparatus 2200 shown in FIG. 22.

FIG. 22 is a schematic diagram of a structure of the communication apparatus 2200 according to an embodiment of this application. As shown in FIG. 22, the apparatus 2200 includes a processor 2201.

When the apparatus 2200 is a service consumer network element or a chip in the service consumer network element, in a possible implementation, when the processor 2201 is configured to invoke an interface to perform the following action: sending a first service request message to a service communication proxy. The service consumer network element receives a response message for the first service request message from the service communication proxy. The first service request message is used to request a first service from a service producer network element. The first service request message includes a first client credentials assertion. The first client credentials assertion is used to authenticate the service consumer network element. The first client credentials assertion includes a first network function type and a second network function type. The first network function type is a network function type of the service producer network element, the second network function type is a network function type of a network element providing a second service, and the second service is associated with the first service.

It should be understood that the apparatus 2200 may be further configured to perform another step and/or operation on the service consumer network element in the foregoing embodiments. For brevity, details are not described herein again.

When the apparatus 2200 is a first network element or a chip in the first network element, in a possible implementation, the processor 2201 is configured to invoke an interface to perform the following actions: receiving a first service request message from a service communication proxy, where the first service request message is used to request a first service from the first network element, the first service request message includes a first client credentials assertion, the first client credentials assertion is used to authenticate a service consumer network element, and the first client credentials assertion includes a plurality of network function types; authenticating the service consumer network element based on the first client credentials assertion; when the service consumer network element is authenticated based on the first client credentials assertion, determining whether a network function type of the processor matches one or more of the plurality of network function types; and sending, based on an authentication result, a response message for the first service request message to the service communication proxy.

It should be understood that the apparatus 2200 may be further configured to perform another step and/or operation on the first network element in the foregoing embodiments. For brevity, details are not described herein again.

It should be understood that the processor 2201 may invoke the interface to perform the foregoing receiving and sending actions. The invoked interface may be a logical interface or a physical interface. This is not limited. In some embodiments, the physical interface may be implemented by using a transceiver. In some embodiments, the apparatus 2200 further includes a transceiver 2203.

In some embodiments, the apparatus 2200 further includes a memory 2202. The memory 2202 may store program code in the foregoing method embodiments, so that the processor 2201 invokes the program code.

Specifically, if the apparatus 2200 includes the processor 2201, the memory 2202, and the transceiver 2203, the processor 2201, the memory 2202, and the transceiver 2203 communicate with each other through an internal connection path, to transfer a control signal and/or a data signal. In some embodiments, the processor 2201, the memory 2202, and the transceiver 2203 may be implemented by using a chip. The processor 2201, the memory 2202, and the transceiver 2203 may be implemented in a same chip, or may be respectively implemented in different chips, or any two of the functions are combined and implemented in one chip. The memory 2202 may store the program code, and the processor 2201 invokes the program code stored in the memory 2202, to implement a corresponding function of the apparatus 2200.

The methods disclosed in embodiments of this application may be applied to a processor or may be implemented by a processor. The processor may be an integrated circuit chip with a signal processing capability. In an implementation process, the steps in the foregoing method embodiments may be completed by using a hardware integrated logical circuit in the processor, or by using instructions in a form of software. The foregoing processor may be a general-purpose processor, a digital signal processor (digital signal processor, DSP), an application-specific integrated circuit (application-specific integrated circuit, ASIC), a field-programmable gate array (field-programmable gate array, FPGA) or another programmable logic device, a discrete gate or transistor logic device, a discrete hardware component, or may be a system on chip (system on chip, SoC), may be a central processing unit (central processing unit, CPU), may be a network processor (network processor, NP), may be a digital signal processor (digital signal processor, DSP), may be a micro controller unit (micro controller unit, MCU), or may be a programmable logic device (programmable logic device, PLD) or another integrated chip. The processor may implement or perform the methods, the steps, and logical block diagrams that are disclosed in embodiments of this application. The general-purpose processor may be a microprocessor, or the processor may be any processor or the like. The steps of the methods disclosed with reference to embodiments of this application may be directly performed and completed by a hardware decoding processor, or may be performed and completed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM). It should be noted that the memory in the system and the method described in this specification includes but is not limited to these memories and any memory of another proper type.

It should be understood that in embodiments of this "application "numbers" "first", "second", and the like are merely used to distinguish between different objects, for example, to distinguish between different parameter information or messages, and do not constitute a limitation on the scope of embodiments of this application. Embodiments of this application are not limited thereto.

It should be further understood that sequence numbers of the foregoing processes do not mean execution sequences in embodiments of this application. The execution sequences of the processes should be determined based on functions and internal logic of the processes. Numbers or sequence numbers in the foregoing processes are merely for differentiation for ease of description, and should not constitute any limitation on an implementation process of embodiments of this application.

It should also be "understood that" the term "and/or" in this specification describes only an association relationship between associated objects and represents that three relationships may exist. For example, A and/or B may represent the following three cases: Only A exists, both A and B exist, and only B exists. In "addition", the character "/" in this specification "generally" indicates an "or" relationship between the associated objects.

Unless otherwise specified, an expression used in this application similar to "an expression that "an item includes one or more of the following"": A, B, and C" usually means that the item may be any one of the following: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When "an expression is "the item includes at least one of the follownig"": A, B, . . . , and X", in other words, more elements are included in the expression, a case to which the item is applicable may also be obtained according to the foregoing rule.

A person of ordinary skill in the art may be aware that, with reference to the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division. There may be another division manner during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the technology of some approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, wherein the method comprises:

sending, by a service consumer network element, a first service request message to a service communication proxy, wherein the first service request message is used to request a first service from a service producer network element, the first service request message comprises a first client credentials assertion, the first client credentials assertion is used to authenticate the service consumer network element, the first client credentials assertion comprises a first network function type of the service producer network element and a second network function type of a network element configured to provide a second service, wherein the second service is used to provide information about the service producer network element; and receiving, by the service consumer network element, a first response message of the first service request message from the service communication proxy.

2. The method according to claim 1, further comprising:

determining, by the service consumer network element, that the first service request message triggers the service communication proxy to request the second service.

3. The method according to claim 2, wherein the determining, by the service consumer network element, that the first service request message triggers the service communication proxy to request the second service comprises:

determining, by the service consumer network element based on one or more of:

that context of a first terminal device fails to be stored and the first terminal device is associated with the first service;

that context of the first service fails to be stored;

that the service producer network element is part of a first slice and context corresponding to the first slice fails to be stored; or that the service consumer network element is configured to communicate with the service communication proxy for a first time.

4. The method according to claim 1, further comprising: determining, by the service consumer network element, to request that the first service is in an indirect communication mode with delegated discovery (mode D).

5. The method according to claim 1, further comprising: sending, by the service consumer network element, a second service request message to the service communication proxy, wherein the second service request message is used to request the first service, the second service request message comprises a second client credentials assertion, the second client credentials assertion comprises the first network function type, and the second client credentials assertion is used to authenticate the service consumer network element; and receiving, by the service consumer network element, a second response message for the second service request message from the service communication proxy, wherein the second response message for the second service request message comprises indication information; and the sending, by the service consumer network element, the first service request message to the service communication proxy comprises:

sending, by the service consumer network element, the first service request message to the service communication proxy based on the indication information.

6. The method according to claim 5, wherein the indication information comprises a third client credentials assertion, the third client credentials assertion comprises the second network function type, and the third client credentials assertion is used to authenticate the network element providing the second service; and the sending, by the service consumer network element, the first service request message to the service communication proxy based on the indication information comprises:

sending, by the service consumer network element, the first service request message to the service communication proxy, based on the third client credentials assertion, in response to the authentication on the network element providing the second service succeeding.

7. The method according to claim 1, wherein the network element configured to provide the second service is a network repository function network element.

8. The method according to claim 1, wherein the first client credentials assertion further comprises one or more of: an identifier of the service consumer network element, or validity time information, wherein the validity time information represents validity time of the first client credentials assertion.

9. A communication apparatus, comprising: a memory configured to store non-transitory instructions, and a processor configured to execute the non-transitory instructions thereby causing the apparatus to:

send a first service request message to a service communication proxy, wherein the first service request message is used to request a first service from a service producer network element, the first service request message comprises a first client credentials assertion, the first client credentials assertion is used to authenticate the apparatus, the first client credentials assertion comprises a first network function type of the service producer network element and a second network function type of a network element configured to provide a second service, wherein the second service is used to provide information about the service producer network element; and receive a first response message of the first service request message from the service communication proxy.

10. The communication apparatus according to claim 9, wherein the processor is further configured to execute the non-transitory instructions thereby further causing the apparatus to:

determine that the first service request message triggers the service communication proxy to request the second service.

11. The communication apparatus according to claim 9, wherein the processor is further configured to execute the non-transitory instructions thereby further causing the apparatus to:

determine to request that the first service is in an indirect communication mode with delegated discovery (mode D).

12. The communication apparatus according to claim 9, wherein the network element configured to provide the second service is a network repository function network element.

13. The communication apparatus according to claim 9, wherein the first client credentials assertion further comprises one or more of:

an identifier of the communication apparatus, or validity time information, wherein the validity time information represents validity time of the first client credentials assertion.

14. A communication system, comprising:
a service consumer network element; and
a service communication proxy, wherein
the service consumer network element is configured to:

send a first service request message to the service communication proxy, wherein the first service request message is used to request a first service from a service producer network element, the first service request message comprises a first client credentials assertion, the first client credentials assertion is used to authenticate the service consumer network element, the first client credentials assertion comprises a first network function type of the service producer network element and a second network function type of a network element configured to provide a second service, and the second service is associated with the first service;

the service communication proxy is configured to:

receive the first service request message, and send a first response message of the first service request message to the service consumer network element; and the service consumer network element is further configured to:

receive the first response message of the first service request message from the service communication proxy.

15. The system according to claim 14, wherein the service consumer network element is further configured to determine that the first service request message triggers the service communication proxy to request the second service.

16. The system according to claim 14, wherein the service consumer network element is further configured to determine to request that the first service is in an indirect communication mode with delegated discovery (mode D).

17. The system according to claim 14, wherein the service communication proxy is further configured to:

after receiving the first service request message from the service consumer network element, send a second service request message to the network element configured to provide the second service, wherein the second service request message is used to request the second service, and the second service request message comprises the first client credentials assertion; and the network element providing the second service is configured to:

receive the second service request message from the service communication proxy, and authenticate the service consumer network element based on the first client credentials assertion, wherein the network element providing the second service configured to authenticate the service consumer network element based on the first client credentials assertion comprises:

the network element providing the second service being configured to determine whether the network function type of the network element configured to provide the second service matches one or more of the first network function type and the second network function type, and in response to the authentication on the service consumer network element succeeding, the network element providing the second service being configured to send a second response message of the second service request message to the service communication proxy, wherein the second response message of the second service request message indicates to provide the second service.

18. The system according to claim 17, wherein the first client credentials assertion further comprises one or more of:

an identifier of the service consumer network element, or validity time information, wherein the validity time information represents validity time of the first client credentials assertion; and the network element providing the second service is configured to authenticate the service consumer network element based on the first client credentials assertion further comprises one or more of:

verifying whether a signature of the first client credentials assertion succeeds, verifying, based on the validity time information comprised in the first client credentials assertion, whether the first client credentials assertion expires, or verifying whether the identifier of the service consumer network element in the first client credentials assertion is the same as an identifier of a network element in a certificate for signing the first client credentials assertion.

19. The system according to claim 14, wherein the network element configured to provide the second service is a network repository function network element.

20. The system according to claim 14, wherein the second service is used to provide information about the service producer network element.

* * * * *